United States Patent
Ueno et al.

(10) Patent No.: US 8,549,112 B2
(45) Date of Patent: Oct. 1, 2013

(54) COMPUTER-READABLE MEDIUM STORING ACCESS CONTROL PROGRAM, ACCESS CONTROL METHOD, AND ACCESS CONTROL DEVICE

(75) Inventors: Hitoshi Ueno, Kawasaki (JP); Kenichi Abiru, Kawasaki (JP); Makoto Kubota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 371 days.

(21) Appl. No.: 13/011,302

(22) Filed: Jan. 21, 2011

(65) Prior Publication Data
US 2011/0185039 A1  Jul. 28, 2011

(30) Foreign Application Priority Data
Oct. 28, 2010 (JP) .................................. 2010-16270

(51) Int. Cl.
*G06F 15/16* (2006.01)

(52) U.S. Cl.
USPC ........................................................ 709/219

(58) Field of Classification Search
USPC .................... 709/217, 225, 246, 219
See application file for complete search history.

(56) References Cited

U.S. PATENT DOCUMENTS 6,393,478 B1 * 5/2002 Bahlmann ..................... 709/224
2008/0034092 A1 * 2/2008 Kikuchi et al. ............... 709/225

FOREIGN PATENT DOCUMENTS

JP  2004-192044  7/2004

OTHER PUBLICATIONS

Mark, Atwood et al., "OAuth Core 1.0", Dec. 4, 2007, pp. 1-28.

* cited by examiner

*Primary Examiner* — Jerry Dennison
(74) *Attorney, Agent, or Firm* — Fujitsu Patent Center

(57) ABSTRACT

An access control device causes an information processing device to execute access control between a client device and two or more server devices. The device receives an open request for causing the information processing device to open the port of a port number that is a port number to be transmitted to the client device according to completion of one process of a plurality of processes to be executed on a first server device which is one of the two or more server devices. The device generates information for data transfer for opening the port of the port number based on information for identifying the first server device which transmitted the open request, which is included in the received open request. The device transmits the generated information for data transfer to the information processing device.

18 Claims, 44 Drawing Sheets

FIG. 6

| ENTRY IDENTIFICATION INFORMATION | TRANSMISSION SOURCE SERVER NAME | TOKEN TYPE | TRANSFER DESTINATION ADDRESS |
|---|---|---|---|
| A | TOKEN SERVER | RT | 10.25.20.1:10 |
| B | TOKEN SERVER | AT | 10.25.20.2:20 |
| C | AUTHENTICATION SERVER | RT | 10.25.20.3:30 |

| TOKEN VALUE | RECEIVED ADDRESS | TRANSFER DESTINATION ADDRESS |
|---|---|---|
| RT001 | 10.25.20.1:20001 | 10.25.20.1:10 |
| RT001 | 10.25.20.1:20021 | 10.25.20.2:20 |
| RT001 | 10.25.20.1:20011 | 10.25.20.3:30 |

| TOKEN VALUE | RECEIVED ADDRESS | TRANSFER DESTINATION ADDRESS | REGISTERED POINT-IN-TIME |
|---|---|---|---|
| RT001 | 10.25.20.1:20001 | 10.25.20.1:10 | 10:30:00 |

| PARAMETER | VALUE |
|---|---|
| DELETION TIME | 120SEC |
| TABLE MONITORING INTERVAL | 60SEC |

| PARAMETER | VALUE |
|---|---|
| DELETION TIME | 120SEC |
| TABLE MONITORING INTERVAL | 60SEC |
| SERVER MONITORING INTERVAL | 10SEC |

FIG. 38

| RECEPTION-SIDE SRC ADDRESS | RECEIVED ADDRESS | TRANSFER DESTINATION ADDRESS |
|---|---|---|
| NULL | 10.25.20.1:20001 | 10.25.20.1:10 |
| 133.10.45.10 | 10.25.20.1:20023 | 10.25.20.1:10 |

30b

COMPUTER-READABLE MEDIUM STORING ACCESS CONTROL PROGRAM, ACCESS CONTROL METHOD, AND ACCESS CONTROL DEVICE

CROSS-REFERENCE TO RELATED APPLICATIONS

This application is based upon and claims the benefit of priority of the prior Japanese Patent Application No. 2010-016270, filed on Jan. 28, 2010, the entire contents of which are incorporated herein by reference.

FIELD

The embodiments discussed herein are related to data access control technology.

BACKGROUND

A technique is known wherein an access privilege, as to a server in which data and the like managed by a user is stored, is transferred to another (a third party's) application without a user ID and user password being shared. Open Authorization (OAuth) is an example of a protocol that utilizes such a technique.

With OAuth, a token is used for connection confirmation of an application. Here, the token is a unique key (a character string generated at random) to be used for a server confirming the access privilege of an application.

An example of this access privilege transfer processing will briefly be described.

First, a third party's application provides a request token obtained from a token server which issues tokens to the user.

The user informs the server, which provides a service, of providing access privilege as to the request token thereof. Thus, the third party's application may be allowed to access the server which provides a service.

For the sake of further safety, the third party's application may access, after sending an exchange request from the request token to an access token to the token server, the server using the exchanged access token.

Incidentally, a DoS (Denial of Service) attack is known wherein a service is prevented from being provided, by imposing a load on a network device or server being attacked by a malicious application.

A DoS attack includes, but is not restricted to, a Flood attack such as SYN Flooding attack or the like, a reload attack, and so forth.

For example, a SYN Flooding attack is an attack for preventing establishment of a new connection by executing a great amount of processing for suspending establishment of a TCP connection partway through as to a target being attacked to expend memory of the target being attacked, and so forth.

Also, the reload attack is an attack for increasing load of a target being attacked by transmitting a great number of normal requests to the target being attacked.

The above OAuth may include a case where the address (IP address, port number, a combination of an IP address and a port number, or the like) of a server to be accessed at the time of requesting a token server of issuance of a request token, or at the time of requesting a server which provides services of providing of a service is fixedly published. Therefore, the port of this address may be subjected to a DoS attack.

As a method for avoiding a DoS attack, there is known a method for dynamically changing the standby address of each server by disposing a firewall upstream from the server.

For example, there is known a method wherein the access situation of a port number of which the access is allowed is monitored to determine whether or not there is an attack, and in the event that there is an attack, the port number of which the access is allowed is switched, and the switched port number is informed to a client or server.

In general, a server has a function for rewriting the reception port number of this server which receives data from a client. However, installing this function at the server side has a problem in that the processing cost of the server along with rewriting of the port number increases (such as opening/closing of a TCP socket, etc.). Also, there may be cases where it is difficult to install this function at the server side.

Note that the problem of OAuth has been described as an example, but other protocols which perform access privilege transfer have similar problems. Further, other protocols which devise a countermeasure for the DoS attack also have similar problems.

SUMMARY

An access control device causes an information processing device to execute access control between a client device and two or more server devices. The device receives an open request for causing the information processing device to open the port of a port number that is a port number to be transmitted to the client device according to completion of one process of a plurality of processes to be executed on a first server device which is one of the two or more server devices. The device generates information for data transfer for opening the port of the port number based on information for identifying the first server device which transmitted the open request, which is included in the received open request. The device transmits the generated information for data transfer to the information processing device.

The object and advantages of the invention will be realized and attained by at least the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 6 is a diagram illustrating a data structure example of a following server setting table;

FIG. 29 is a diagram illustrating a specific example of a port management table according the fourth embodiment;

FIG. 31 is a diagram illustrating a data structure example of a port management table according to the fifth embodiment;

FIG. 32 is a diagram illustrating a data structure example of a parameter management table according to the fifth embodiment;

FIG. 36 is a diagram illustrating a data structure example of a parameter management table according to the sixth embodiment;

FIG. 38 is a diagram illustrating a data structure example of an address conversion table according to a seventh embodiment;

DESCRIPTION OF EMBODIMENTS

Now, embodiments will be described in detail with reference to the drawings.

First, an access control device according an embodiment will be described, and then the embodiment will be described in a more specific manner.

First Embodiment

Figure 1:
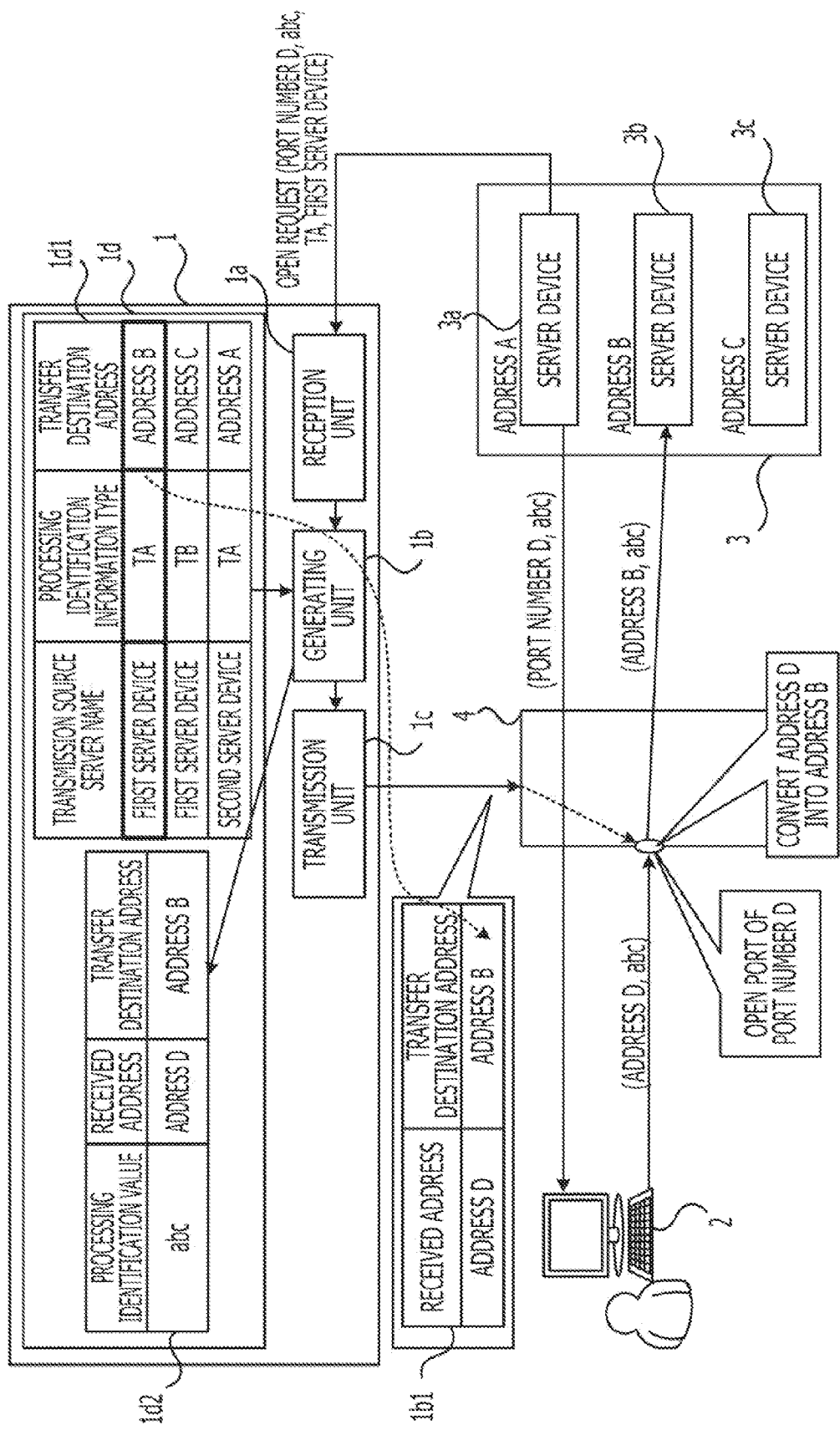
FIG. 1 is a diagram illustrating the outline of an access control device according to a first embodiment.

FIG. 1 is a diagram illustrating the outline of an access control device according to a first embodiment.

An access control device (computer) 1 according to the first embodiment controls access as to multiple server devices included in a server device group 3 from a client device 2. A server device 3a, a server device 3b, and a server device 3c included in the server device group 3 are each servers which execute different processing. The servers each have a different address (combination of an IP address and a port number).

In FIG. 1, the address of the server device 3a is "address A". The address of the server device 3b is "address B". The address of the server device 3c is "address C".

In FIG. 1, the access control device 1 controls opening/closing of the port of an information processing device 4 provided upstream to the server device group 3.

Here, client device 2 is not restricted to a particular device as long as the device requests the server device group 3 for processing, and examples thereof include a terminal device that a user operates, and an application server having an application for performing processing according to the user's request. FIG. 1 illustrates the client device 2 which the user operates as one example.

The client device 2 illustrated in FIG. 1 is notified of, for example, a port number "D" dynamically determined by the server device 3a executing prescribed processing (e.g., later-described token issuing processing, authentication processing, etc.) according to the request of the client device 2, for access to the information processing device 4 which responded thereto. This port number "D" may be generated by the server device 3a, or may be generated by the access control device 1 to be transmitted to the server device 3a.

One of the servers of the server device 3a, server device 3b, and server device 3c executes the next processing by the client device 2 accessing this port number "D".

The information processing device 4 is provided for the sake of suppressing a DoS attack, which prevents the processing of the server device 3a, server device 3b, and server device 3c, or the like.

The access control device 1 suppresses a DoS attack against the server device group 3 by dynamically changing a port which the information processing device 4 opens.

The access control device 1 includes reception unit 1a, generating unit 1b, and transmission unit 1c.

The reception unit is receives a port open request of the information processing device 4 from one of the server device 3a, server device 3b, and server device 3c.

This open request is a request for causing the information processing device 4 to open the port of the port number transmitted to the client device 2.

Note that timing for the server device 3a, server device 3b, and server device 3c transmitting an open request is not restricted to particular timing. FIG. 1 illustrates, as an example, a case wherein the server device (first server device) 3a completes prescribed processing, and transmits an open request to the access control device 1 after informing the client device 2 of the port number "D" for access to the information processing device 4.

This open request includes the port number, and information for identifying the server device serving as a transmission source which transmitted the open request (server identification information). Examples of the server identification information include a server name, and the IP address of a server.

The open request illustrated in FIG. 1 includes the port number "D" informed to the client device 2 beforehand, and a server name "first server device".

Here, the open request further includes information for identifying a series of processing (series processing identification information).

The series of processing are not restricted to particular ones, and examples thereof include processing for obtaining an identifier indicating that the user has been authorized for connection confirmation of the client device 2, and processing for obtaining a session identifier for access to the server device group 3.

The series processing identification information is included in the open request, whereby different processing content may be identified even when open requests are from the same server device. Accordingly, the access control device 1 may select a server device serving as a different transfer destination according to the processing content.

The open request illustrated in FIG. 1 includes, as an example of the series processing identification information, a token A (TA) issued as a result of certain processing A (not illustrated) that the server device 3a executed. Additionally, the server device 3a may further perform processing B different from the processing A. In this case, the server device 3a may issue a token B (TB) as a result of execution of the processing B (not illustrated).

Also, the open request includes "abc" as an example of a processing identification value indicating the value of the series processing identification information. This processing identification value may be used at the time of generating unit 1b generating later-described information for data transfer 1b1.

The client device 2 generates an access request for accessing the address with the destination as the port number "D" (hereafter, referred to as "address D") based on the port number "D" informed from the server device 3a to access the information processing device 4.

Note that in the event that "address D" has directly been informed from the server device 3a, the information processing device 4 may be accessed using this "address D".

The generating unit 1b generates information for data transfer 1b1 wherein based on the server name and port number which transmitted the open request included in the received open request, the port of the port number is opened, and the data accessed to the opened port is transferred to the second server device which is one of the server devices to be accessed next to the server device 3a.

This information for data transfer 1b1 may be generated as follows for example.

The generating unit 1b determines a server which the client device 2 transfers data accessed to the port of the port number "D" according to a response based on the server name "first server device" included in the open request, from the server device group 3.

Also, the generating unit 1b generates the received address "address D" of the information processing device 4 based on the port number "D" included in the open request.

Subsequently, the generating unit 1b generates the information for data transfer 1b1 including the generated received address "address D", and the address (transfer address) of the second server device (server device 3b in the present embodiment) where the client device 2 transfers the accessed data to the port of the port number "D".

The transfer destination address may be determined, for example, by referencing storage unit 1d.

The storage unit 1d stores server setting information 1d1 beforehand in which at least one server name of the server device group 3, series processing identification information type, and a transfer destination address are correlated. The address of the second server device may readily be determined by determining and providing this server setting information 1d1 beforehand.

Note that, with the present embodiment, the storage unit 1d has been provided in the access control device 1, but may be provided outside of the access control device 1.

The generating unit 1b searches for the entry of the server setting information 1d1 matching the server name "first server device" and the series processing identification information type "TA" included in the open request, and subsequently obtains the address "address B" of the server device 3b included in the matched entry.

The transmission unit 1c transmits the information for data transfer 1b1 generated by the generating unit 1b to the information processing device 4.

In FIG. 1, the information processing device 4 opens the port of the port number "D" in accordance with the information for data transfer 1b1.

Subsequently, the information processing device 4 transfers the data accessed to the opened port to the address "address B" of the server device 3b. Specifically, the information processing device 4 converts the destination "address D" of the received address into the address "address B" of the server device 3b, and subsequently transfers the data to the address "address B" of the server device 3b. Thus, the server device 3b may receive this data, and the processing may continuously be executed.

Note that the information processing device 4 informs the server device group 3 of only a request accessed to the port of the port number "D", and prevents a request accessed to a port other than that port from being informed.

In this way, the access control device 1 generates the information for data transfer 1b1 in which the port to be opened is dynamically changed according the server name and port number included in the open request, and transmits this to the information processing device 4, whereby the port number to be opened may dynamically be changed. Thus, access from a device of which the port number for access has not been informed to this port number may be prevented.

Also, the access control device 1 is disposed, whereby addition of a port number change function to the server device group 3 side may be omitted for example. Accordingly, for example, even in the event that it is difficult to add the port number change function to the server device group 3 side due to operation of the server device group 3 having already been started, or the like, enhancement of the security of the server device group 3 may readily be realized.

Alternatively, a possibility that the load of the server device group 3 may be reduced by preventing the DoS attack from being received may be enhanced by informing the server device group 3 of only a request accessed to the port of the opened port number, and preventing a request accessed to a port other than that port from being informed.

Incidentally, the access control device 1 according to the present embodiment further has a function for shutting off (closing) the port opened by the information processing device 4.

In the event of realizing this function, with the present embodiment, the reception unit is also serves as shutoff request reception unit. The generating unit 1*b* also serves as port shutoff information generating unit. The transmission unit 1*c* also serves as port shutoff information transmission unit.

Also, in the event of realizing this function, it is desirable for the generating unit 1*b* to generate management information 1*d*2 for managing a port to be opened based on the port number included in the open request, and the address of the server device 3*b* stored in the server setting information 1*d*1. This management information 1*d*2 is generated, thereby facilitating determination of the opened port.

Further, in the event that the processing identification value is included in the open request, it is desirable to generate management information 1*d*2 including this processing identification value. The processing identification value is included in the open request, thereby enabling determination of the port opened in increments of processes, and thereby enabling shutoff of the port in increments of processes.

The management information 1*d*2 illustrated in FIG. 1 includes the processing identification value "abc" included in the open request, the same received address "address D" and the same transfer destination address "address B" as the received address of the information for data transfer 1*b*1.

In the event of having generated the management information 1*d*2, the generating unit 1*b* stores this in the storage unit 1*d*.

Hereafter, processing for shutting off the opened port (shutoff processing) will be described.

Figure 2:
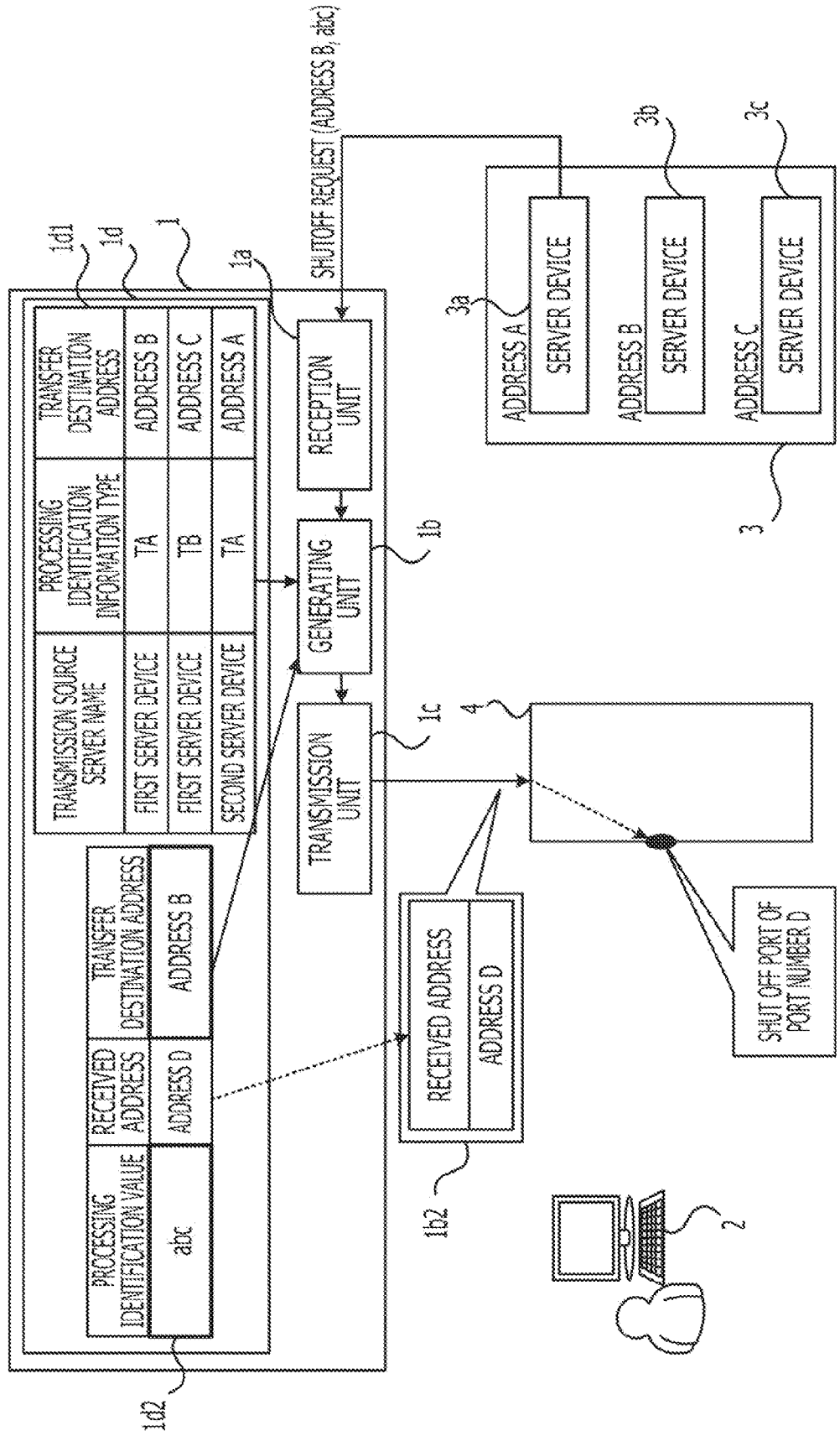
FIG. 2 is a diagram for describing port shutoff processing according to the first embodiment.

FIG. 2 is a diagram for describing port shutoff processing according to the first embodiment.

The reception unit is receives a shutoff request of the opened port.

FIG. 2 illustrates, as an example, a case where a shutoff request has been received from the server device 3*b*.

With regard to the information included in this shutoff request, though the content thereof is not restricted to particular content as long as the access control device 1 may determine the opened port from the content, for example, there may be exemplified (1) The address of the server device 3*b*, (2) Processing identification value, and (3) A combination between the address of the server device 3*b* and the processing identification value.

In the case of the above (1), a port to be shut off may be determined in increments of addresses. For example, in the event that the number of opened ports is one, the opened port may be determined from the address of the server device 3*b*. Also, in the case of the above (2), a port to be shut off may be determined in increments of a series of processes. Thus, for example, even in the event that the reception unit is has received multiple open requests having a different processing identification value from the server device 3*a* to open ports, a port to be shut off may be determined. Also, in the case of the above (3), a port to be shut off may be determined in increments of combinations between an address and a series of process. Thus, either case of the above (1) and (2) may be handled.

With the present embodiment, in the case of the above (3), specifically, a shutoff request includes the address "address B" of the server device 3*b*, and the processing identification value "abc".

Timing for the server device 3*b* transmitting a shutoff request is not restricted to particular timing, but it is desirable to respond to the client device 2 after completing processing as to the request of the client device 2, and also transmit a shutoff request to the client device 2. Thus, the port may rapidly be shut off.

Also, in addition, the timing for the server device 3*b* transmitting a shutoff request may be timing at the time of processing at this server device 3*b* being completed, timing after prescribed time elapse since reception of the data transmitted from the client device 2, or the like.

The generating unit 1*b* generates information for port shutoff 1*b*2 for shutting off the opened port based on the address "address B" and processing identification value "abc" included in the shutoff request.

This information for port shutoff 1*b*2 may be generated using the management information 1*d*2.

Specifically, the generating unit 1*b* obtains the entry of the management information 1*d*2 including the address "address B" and processing identification value "abc" included in the shutoff request, and subsequently generates the information for port shutoff 1*b*2 including the received address of this entry.

Note that, in the event of the management information 1*d*2 illustrated in FIG. 1, the information for port shutoff 1*b*2 may be generated even in the event of using only the address "address B" included in the shutoff request. Also, the information for port shutoff 1*b*2 may be generated even in the event of using only the processing identification value "abc" included in the shutoff request.

The transmission unit 1*c* transmits the information for port shutoff 1*b*2 generated by the generating unit 1*b* to the information processing device 4.

Thus, the information processing device 4 determines the opened port number "D" by the received address "D" included in the information for port shutoff 1*b*2, and shuts off this port. In this way, the port is shut off, whereby a possibility that the load of the server device group 3 may be reduced by preventing the DoS attack from being received may be enhanced.

Further, the time while the port is opened may be reduced by the access control device 1 receiving a shutoff request at the above timing. Thus, the possibility that the load of the server device group 3 will be reduced by preventing the DoS attack may further be enhanced.

Note that the reception unit 1*a*, generating unit 1*b*, and transmission unit is may be realized by a function of a CPU (Central Processing Unit) included in the access control device 1. Also, the storage unit 1*d* may be realized by a data storage region included in RAM (Random Access Memory), HDD (Hard Disk Drive), or the like included in the access control device 1.

Note that, with the present embodiment, a case has been described as an example wherein a different server executes a different process, and a transfer destination address is set to a different server.

However, the arrangement is not restricted to this, and for example, the same server may execute a different process. In this case, the transfer destination address becomes a different port number of the same server.

In this case, the server device 3a transmits an open request including information for identifying processing for adding a port number to the server identification information (hereafter, referred to as "same server identification information"), to the access control device 1.

Subsequently, the access control device 1 determines the transfer destination address based on the same server identification information included in the open request.

The access control device 1 may be used for access privilege transfer processing, for example.

Hereafter, the present embodiment will be described in a more specific manner by referencing an example wherein the disclosure access control device has been applied to the access privilege transfer processing.

Second Embodiment

Figure 3:
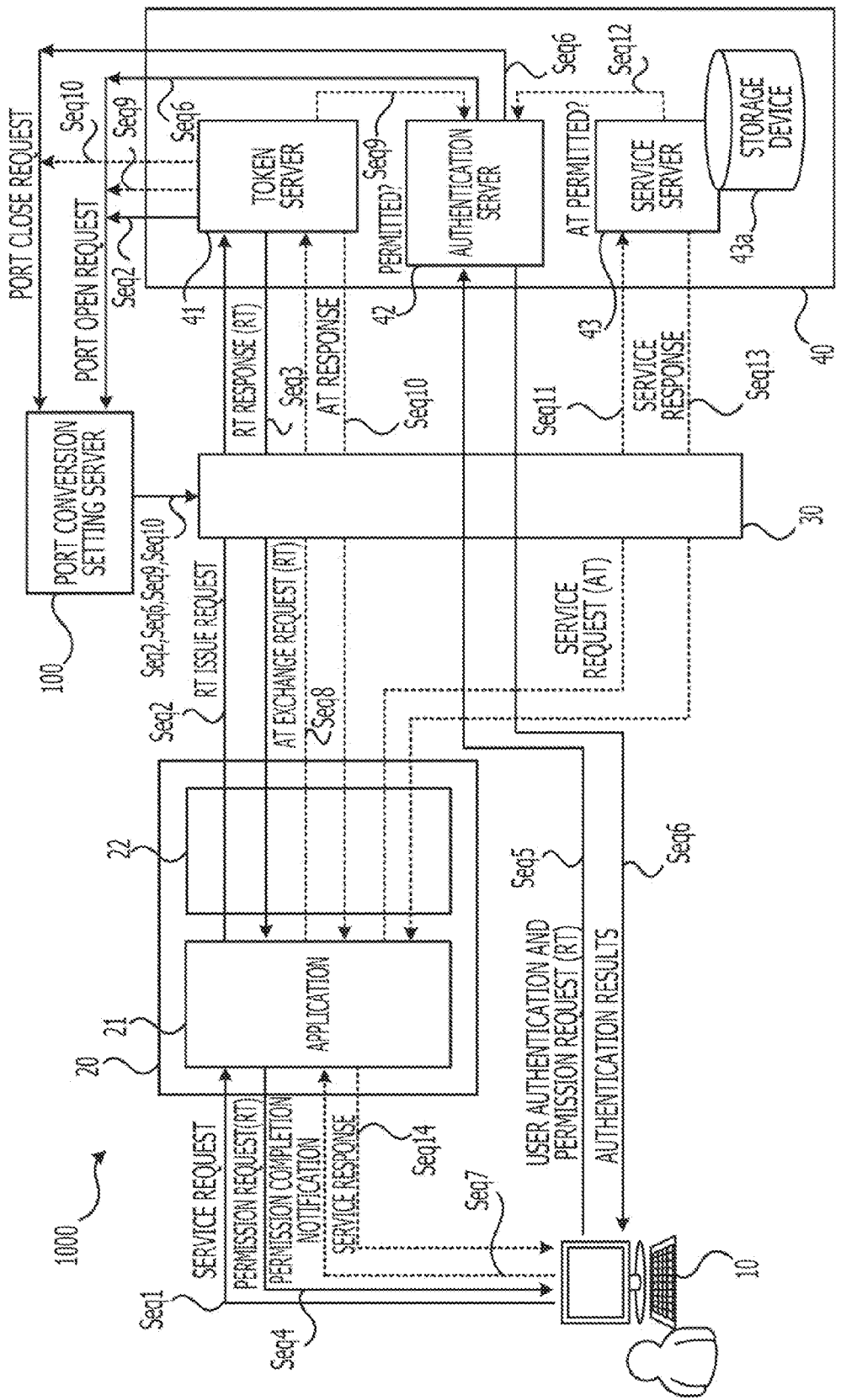
FIG. 3 is a diagram illustrating a system according to a second embodiment.

FIG. 3 is a diagram illustrating a system according to a second embodiment.

A system 1000 includes a client device 10, an application server 20, a DoS countermeasure device 30, a service center 40, and a port conversion setting server (access control device) 100.

The client device 10 and application server 20 are mutually connected via a network.

The DoS countermeasure device 30 is provided upstream to the service center 40.

Between the client device 10 and DoS countermeasure device 30, and between the application server 20 and DoS countermeasure device 30 are connected via a network.

Also, between the DoS countermeasure device 30 and service center 40 are connected via the network.

The client device 10 and the application server 20 may access the service center 40 via the DoS countermeasure device 30.

Further, the port conversion setting server 100 is provided, which connects the service center 40 and the DoS countermeasure device 30.

Note that the service center 40 includes a storage device 43a which stores personal information and so forth. This storage device 43a is protected by security using the user's credential (user ID, user password, etc.).

Now, there is a case where the user who operates the client device 10 intends to cause an application 21 (of a third party) included in the application server 20 to use personal information and the like stored in the storage device 43a.

However, when using the personal information and the like stored in the storage device 43a, if the user entrusts the user's credential to the application 21, the user's security is compromised. Specifically, the application 21 may access the storage device 43a without the user's permission. Also, if the user password to access the storage device 43a is changed, the user password needs to be changed by the number of times equivalent to the number of applications connected to the storage device 43a.

On the other hand, the system 1000 is a system which allows the access privilege owned by the user as to the storage device 43a to be transferred to the application 21 without disclosing the user's credential. Also, the user may confirm the authority to transfer to the application 21 beforehand.

Hereafter, the function of each device will briefly be described.

The client device 10 includes a Web browser capable of processing the redirect instruction from the application server 20.

The user who operates the client device 10 owns a right to access the service center 40.

The application server 20 is a server including the application 21 serving as an access privilege transfer destination. The type of the application 21 is not restricted to a particular type, but examples thereof include an application to append various types of information to map data, and an application to subject photo data to various types of processing.

Also, the application server 20 includes an access library 22.

The access library 22 is a library into which the API (Application Program Interface) of the service server 43 is implemented.

The API and address (e.g., URL (Uniform Resource Locator), etc.) of the service server 43 are opened to the application 21 and the user beforehand. The application 21 may be prepared for the access privilege being transferred thereto by the access library 22 being implemented into the application server 20.

The DoS countermeasure device 30 is a device for suppressing the service center 40 from receiving a Flood attack such as a SYN Flooding attack, UDP Flooding attack, Ping Flooding attack, or the like, and a DoS attack such as a reload attack or the like.

This DoS countermeasure device 30 monitors a request addressed to each server included in the service center 40 in a packet level.

Also, the DoS countermeasure device 30 includes multiple ports, and opens/closes the port of the port number informed from the port conversion setting server 100.

Also, the DoS countermeasure device 30 has an NAPT (Network Address Port Translation) function, and mutually converts an IP address (local address) available for only between the DoS countermeasure device 30 and the inside (within the organization) of the service center 40, and an address (global address) on a network in a transparent manner.

Specifically, the DoS countermeasure device 30 converts a destination address included in a packet accessed to the port opened by notification from the port conversion setting server 100 into a transfer destination address within the service center 40 stored beforehand, and transfers data to the converted transfer destination address. Note that the destination address mentioned here includes a combination between the IP address of a destination and the port number. Also, the transfer destination address includes a combination between the IP address of a transfer destination and the port number.

Hereinafter, the term "address" means a combination between the IP address and the port number. In the event of referring to the IP address alone, this is individually referred to as "IP address".

Note that the DoS countermeasure device 30 may include a load-distribution function, a bandwidth control and cryptographic function, a UTM (Unified Threat Management) function, and so forth.

Also, the DoS countermeasure device 30 deletes, in response to the notification from the port conversion setting server 100, the stored destination address, and the transfer destination address corresponding to this destination address.

The service center 40 is provided to, for example, a data center or the like, and includes multiple servers. The service center 40 according to the present embodiment includes a token server 41, an authentication server 42, and a service server 43.

The token server 41 issues various types of tokens such as a request token (RT), an access token (AT), and so forth, for connection confirmation of the application along with the access privilege transfer processing.

Tokens are unique keys (character string generated at random) to be used for the authentication server 42 and the service server 43 confirming the access privilege of the application 21. These tokens are unauthenticated tokens at the time of issuance.

Here, the request tokens are identifiers indicating that the user has been authorized. The access tokens are session identifiers for access to the service server 43.

Also, upon receiving a request for confirming validity of the token from the authentication server 42 or service server 43, the token server 41 confirms the validity of the token, and responds the result thereof.

The authentication server 42 authenticates an unauthenticated request token in response to the confirmation request of the unauthenticated request token transmitted from the client device 10 by the user's operations.

In more detail, the authentication server 42 authenticates, in response to an authentication request transmitted from the client device 10 by the user's operations, the user ID and user password, thereby confirming the validity of the user. Subsequently, upon the validity being confirmed, an unauthenticated request token is authorized. Note that the authentication method is not restricted to the authentication method employing the user ID and user password.

After the access privilege transfer processing, in response to a service data providing request from the application 21 to which the access privilege has been transferred, the service server 43a accesses the storage device 43a to provide various types of service data. Examples of the service data included in the storage device 43 include, but are not restricted to, schedule data owned by the user.

The port conversion setting server 100 transmits a request for opening the port of the port number informed to the client device 10 or application 21 from the token server 41 and authentication server 42, to the DoS countermeasure device 30. Also, in the event that data access to the opened port has been made, the transfer destination address for transferring this data is transmitted to the DoS countermeasure device 30.

Also, in the event that authentication completion has been informed from the authentication server 42, or in the event that service completion has been informed from the service server 43, the port conversion setting server 100 transmits a request for shutting off the port of the port number informed at the time of opening the port, to the DoS countermeasure device 30.

Next, the access privilege transfer processing of the system 1000 will be described.

As preprocessing, the application server 20 accesses the service server 43 to implement the access library 22 beforehand.

The access privilege transfer processing is briefly classified into an authentication phase and a data access phase. FIG. 3 illustrates the flow of the processing of the authentication phase using a solid line, and illustrates the flow of the processing of the data access phase using a dotted line.

[Sequence Seq1] In order to take advantage of the service of the application 21, the client device 10 transmits a service request to the application server 20 via a Web browser by the user's operations.

[Sequence Seq2] The application 21 transmits a request token request to the token server 41 included in the service center 40. Note that the DoS countermeasure device 30 has closed all of the ports other than the port corresponding to the request token request.

The token server 41 issues a request token. Further, the token server 41 determines the port number to be opened by the DoS countermeasure device 30 so that the client device 10 may access the authentication server 42.

The token server 41 transmits a request for opening the port of the determined port number (hereafter, referred to as "port open request") to the port conversion setting server 100. This port open request includes the token type and token value of the issued request token, and the determined port number, and the transmission source server name.

The port conversion setting server 100 generates the received address (including the port number) of the DoS countermeasure device 30 to be opened based on the port open request, and transmits this to the DoS countermeasure device 30. Thus, the DoS countermeasure device 30 opens the port specified by the received address. Also, the port conversion setting server 100 transmits the address of the authentication server 42 to the DoS countermeasure device 30 as the transfer destination address (including the port number) in the event that access to the opened port has been made. Note that, FIG. 3 illustrates the transmission of data from the port conversion setting server 100 to the DoS countermeasure device 30 using one arrow for convenience of space.

The DoS countermeasure device 30 stores the address of the authentication server 42 in a manner correlated with the received address of the opened port.

[Sequence Seq3] The token server 41 stores the issued request token and the determined port number in a message to respond this (RT response). Note that, in FIG. 3, (RT) indicates that a request token is stored in a message to be transmitted or responded. This is also true for the following. Also, the port of the DoS countermeasure device 30 through which a response is passed is not restricted to a particular port.

[Sequence Seq4] The application 21 transmits a permission request storing the request token to the client device 10.

[Sequence Seq5] The user is informed through the Web browser implemented in the client device 10 that a permission request has been transmitted from the application server 20. According to the user's operations, the client device 10 transmits a permission request which stores the user ID and user password with the destination address as the opened port.

The DoS countermeasure device 30 converts the destination address of the permission request received at the opened port into the address of the authentication server 42 stored in a correlated manner, and transfers to the authentication server 42.

The authentication server 42 accepts login to authenticate the user ID and user password included in the permission request. At this time, in the event that the authentication has succeeded, the authentication server 42 determines the port number to be opened by the DoS countermeasure device 30 at the time of the token server 41 issuing an access token. Subsequently, the authentication server 42 transmits a port open request of the determined port to the port conversion setting server 100.

The port conversion setting server 100 generates the received address of the DoS countermeasure device 30 to be opened based on the port open request, and transmits this to the DoS countermeasure device 30. Thus, the DoS countermeasure device 30 opens the port specified by the received address. Also, the port conversion setting server 100 transmits the address (including the port number) of the token server 41 as the transfer destination address in the event that access to the opened port has been made, to the DoS countermeasure device 30.

The DoS countermeasure device 30 stores the address of the token server 41 in a manner correlated with the received address of the opened port.

[Sequence Seq6] The authentication server 42 responds the authentication result corresponding to the permission request (authentication success or authentication failure). In the case of authentication success, the authentication server 42 stores notification to the effect that authentication has succeeded, and the determined port number in a message, and responds to this. On the other hand, in the case of authentication failure, the authentication server 42 stores notification to the effect that authentication has failed in a message, and responds to this. Note that the port of the DoS countermeasure device 30 through which a response is passed is not restricted to a particular port.

The authentication server 42 transmits a request for shutting off the port used for transfer of the permission request (hereafter, referred to as "port close request") to the port conversion setting server 100. The port conversion setting server 100 determines the port used for authentication, and transmits to the DoS countermeasure device 30 so as to shut off the port thereof. Thus, the DoS countermeasure device 30 shuts off the port used for authentication.

Up to this point is the authentication phase. In the case of authentication failure, for example, notification to the effect that authentication has failed is displayed, for example, on the monitor of the client device 10, and the authentication request from the client device 10 is accepted again. In the case of authentication success, the following data access phase is executed.

[Sequence Seq7] The client device 10 which has received authentication success informs the application server 20 of completion of the permission processing by the user's operations.

[Sequence Seq8] The application 21 stores the request token, and transmits an access token exchange request with the destination address as the opened port.

The DoS countermeasure device 30 converts the destination address of the access token exchange request received at the opened port into the address of the token server 41 stored in a correlated manner, and transfers this to the token server 41.

[Sequence Seq9] The token server 41 inquires of the authentication server 42 whether or not an access permission setting as to the access token exchange request has been made by the user.

In the event that no access permission setting has been made, the token server 41 generates an access token. Further, the token server 41 determines the port number to be opened by the DoS countermeasure device 30 at the time of the service server 43 providing a service. Subsequently, the token sever 41 transmits a port open request of the determined port to the port conversion setting server 100. This port open request includes the token type and token value of the issued access token, and the determined port number, and the transmission source server name.

The port conversion setting server 100 generates an address to be opened based on the port open request, and transmits this to the DoS countermeasure device 30. Thus, the DoS countermeasure device 30 opens the port specified by the address. Also, the port conversion setting server 100 transmits the address of the service server 43 to the DoS countermeasure device 30 as the transfer destination address in the event that access to the opened port has been made.

The DoS countermeasure device 30 stores the address of the service server 43 in a manner correlated with the received address of the opened port.

[Sequence Seq10] The token server 41 stores the generated access token and the determined port number in a message, and responds this (AT response). Note that the port of the DoS countermeasure device 30 through which a response is passed is not restricted to a particular port.

The token server 41 transmits a port close request of the port used for transfer of the access token exchange request to the port conversion setting server 100. The port conversion setting server 100 determines the port used for the access token exchange request, and transmits to the DoS countermeasure device 30 so as to shut off the port thereof. Thus, the DoS countermeasure device 30 shuts off the port used for transfer of the access token exchange request.

[Sequence Seq11] The application 21 transmits a service request in which the access token is stored with the destination address as the opened port.

The DoS countermeasure device 30 converts the destination address of the received service request into the address of the service server 43 stored in a correlated manner, and transfers to the service server 43.

[Sequence Seq12] The service server 43 confirms the access privilege set to the access token (originally, request token) stored in the service request.

[Sequence Seq13] In the event that access privilege has been set, the service server 43 responds in accordance with the authority thereof (type of resource, period, etc.).

[Sequence Seq14] The application 21 performs processing according to need, and responds to the client device 10 with the processing results. Thus, the client device 10 may receive service processed by the application 21. For example, a case will be described as an example wherein the application 21 is a mapping application.

The client device 10 causes the application 21 to access the service server 43 to obtain the user's schedule data within the storage device 43a, and subsequently causes the application 21 to subject the obtained schedule data and the display of a map to MashUp to create a recommended visiting path, and to transmit to the client device 10.

Note that, though not illustrated in the drawing, the service server 43 may transmit a port close request of the port used for transfer of the service request by the DoS countermeasure device 30 to the port conversion setting server 100. The port conversion setting server 100 may determine the port used from the service request, and may transmit to the DoS countermeasure device 30 so as to shut off the port thereof. Thus, the DoS countermeasure device 30 may shut off the port used for transfer of the service request.

According to such processing, the user may transfer the access privilege as to the service server 43 to the application 21 without informing the application 21 of the own user ID and user password.

Also, the port conversion setting server 100 causes the DoS countermeasure device 30 to open the port of the same port number as the port number informed from the token server 41 and authentication server 42 to the client device 10 or application 21. Also, the port conversion setting server 100 transmits the transfer destination address of each server to the DoS countermeasure device 30 so as to transfer data to the transfer destination address.

Thus, the service center 40 may perform processing without being conscious of the port number. Specifically, the port number may dynamically be changed without implementing a port conversion function at the service center 40 side. Accordingly, enhancement of security may readily be realized. Also, server processing costs (open/close of a TCP socket, etc.) along with rewriting of the port number may be reduced, and the server load within the service center 40 may be reduced.

Hereafter, the configuration and functions of the port conversion setting sever 100 will be described. Subsequently, description will be made in detail regarding the processing of the port conversion setting server 100, token server 41, authentication server 42, and service server 43 along with opening/closing of a port.

Figure 4:
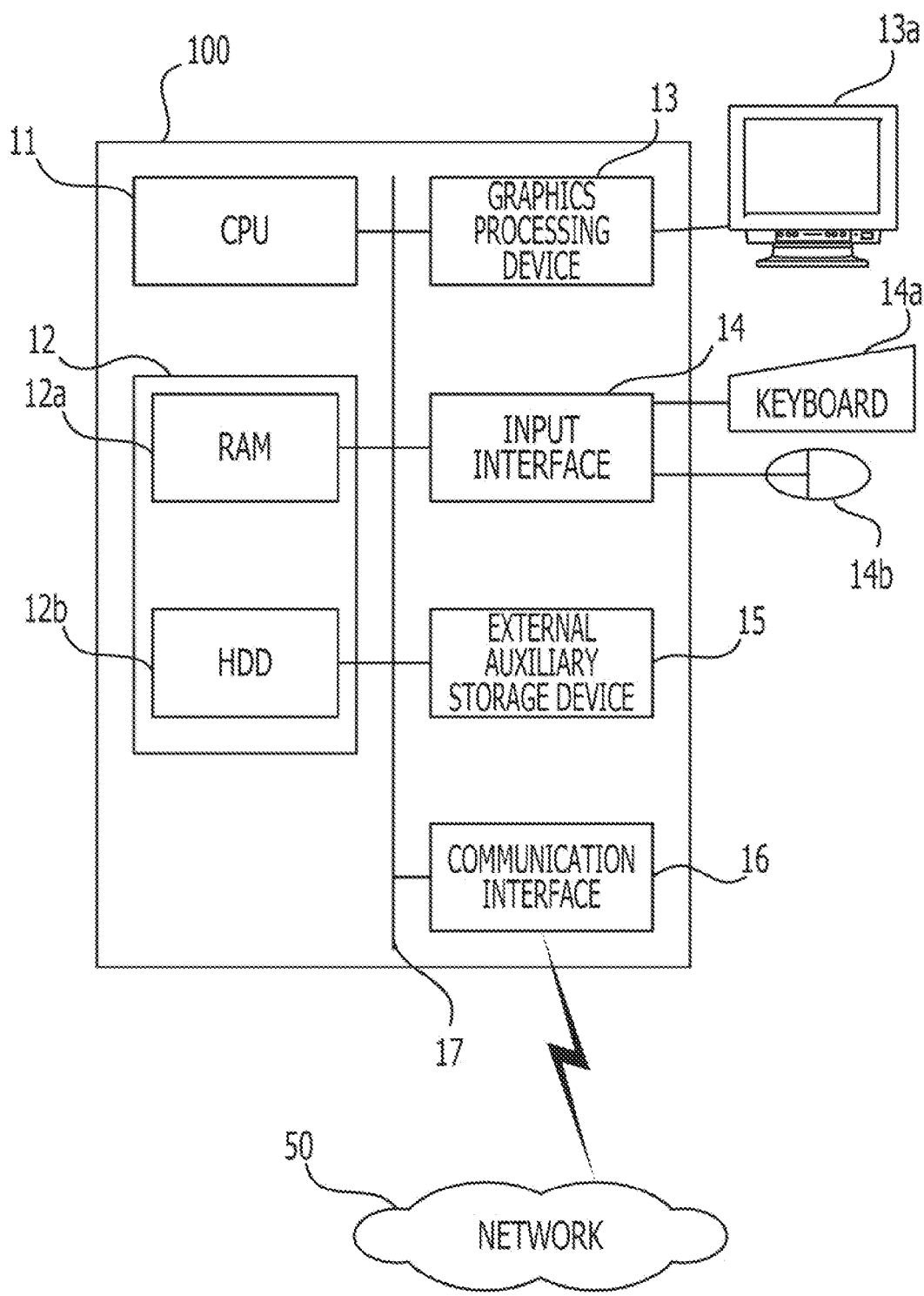
FIG. 4 is a diagram illustrating a hardware configuration example of a port conversion setting server.

FIG. 4 is a diagram illustrating a hardware configuration example of the port conversion setting server.

With the port conversion setting server 100, the entire device is controlled by a CPU 11. The CPU 11 is connected with a storage unit 12, a graphics processing device 13, an input interface 14, an external auxiliary storage device 15, and a communication interface 16 via a bus 17.

The storage unit 12 includes RAM 12a, and an HDD (hard disk drive) 12b.

At least a part of an OS (Operating System) program and an application program to be executed by the CPU 11 is temporarily stored in the RAM 12a. Also, various types of data along with the processing by the CPU 11 are stored in the RAM 12a. The OS and application programs are stored in the HDD 12b. Also, program files are stored in the HDD 12b.

The graphics processing device 13 is connected with a monitor 13a. The graphics processing device 13 displays an image on the screen of the monitor 13a in accordance with the command from the CPU 11. The input interface 14 is connected with a keyboard 14a and a mouse 14b. The input interface 14 transmits a signal transmitted from the keyboard 14a or mouse 14b to the CPU 11 via the bus 17.

The external auxiliary storage device 15 reads information written into a recording medium, or writes information into a recording medium. Examples of a recording medium readable and writable at the external auxiliary storage device 15 include magnetic recording devices, optical discs, magneto-optical recording media, and semiconductor memory. Examples of magnetic recording devices include flexible disks (FD), and magnetic tapes. Examples of optical discs include Blu-ray Discs, DVD (Digital Versatile Discs), DVD-RAM (Random Access Memory), CD-ROM (Compact Disc Read Only Memory), and CD-R (Recordable)/RW (ReWritable). Examples of magneto-optical recording media include MO (Magneto-Optical disks).

The communication interface 16 is connected to a network 50. The communication interface 16 performs transmission/reception of data with another computer via the network 50.

According to the above hardware configuration, the processing functions of the present embodiment may be realized. The following functions are provided to the inside of the port conversion setting server 100 having such a hardware configuration.

Figure 5:
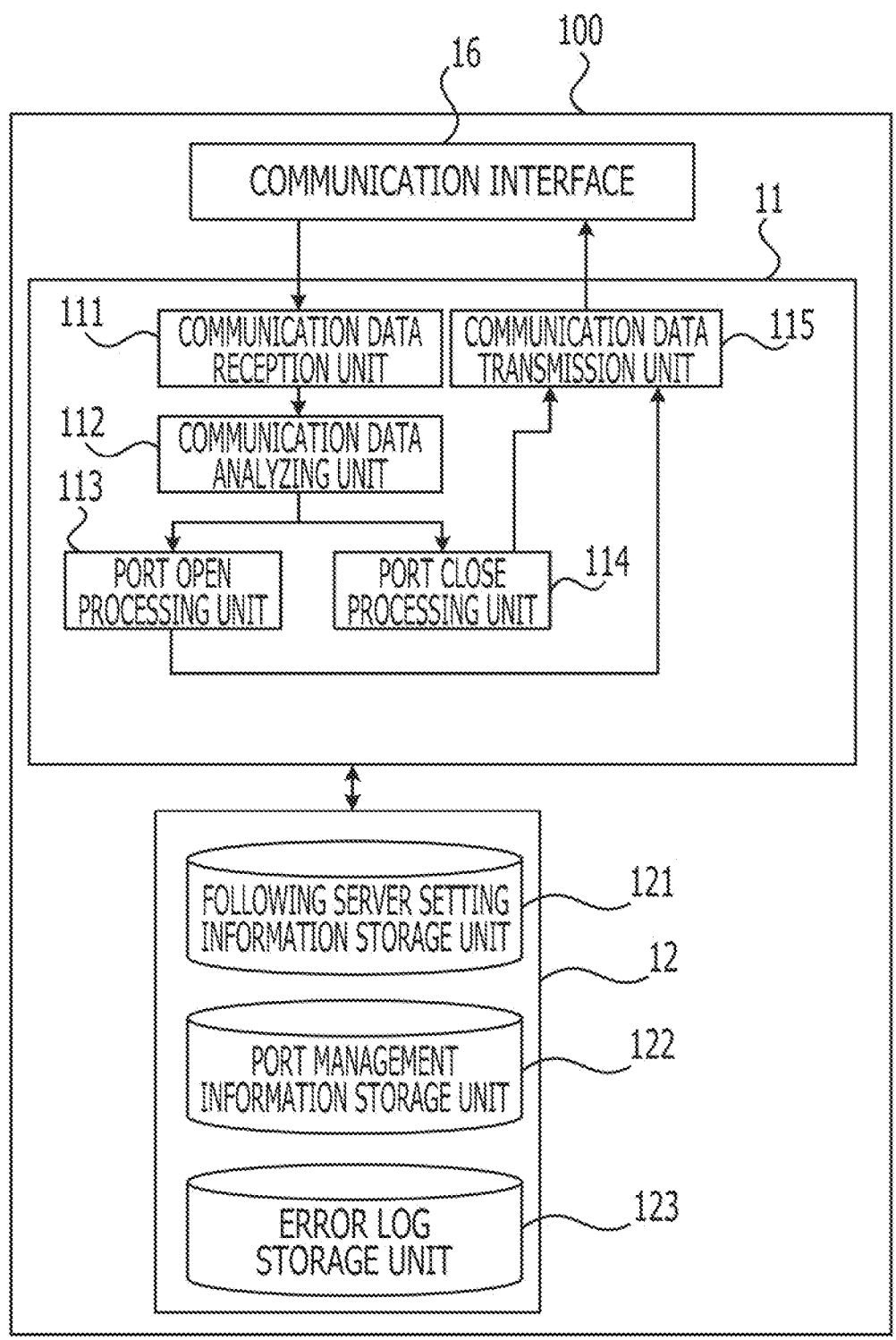
FIG. 5 is a block diagram illustrating the function of the port conversion setting server according to the second embodiment.

FIG. 5 is a block diagram illustrating the functions of the port conversion setting server according to the second embodiment.

The storage unit 12 includes a following server setting information storage unit 121, a port management information storage unit 122, and an error log storage unit 123.

The transfer destination address of the server to be accessed based on the type of server and the type of token is stored (set) beforehand in the following server setting information storage unit 121.

Information for managing a port to be opened is temporarily stored in the port management information storage unit 122. This information is used at the time of port shutoff.

An error log is stored in the error log storage unit 123.

The CPU 11 executes each function as a communication data reception unit 111, a communication data analyzing unit 112, a port open processing unit 113, a port close processing unit 114, and a communication data transmission unit 115.

The communication data reception unit 111 receives a message from each server within the service center 40 via the communication interface 16.

The communication data analyzing unit 112 analyzes a request included in the message received at the communication data reception unit 111. Subsequently, in the event that this request is a port open request, the communication data analyzing unit 112 requests port open processing from the port open processing unit 113. In the event that this request is a port close request, the communication data analyzing unit 112 requests port close processing from the port close processing unit 114.

Here, the port open request includes information for identifying a server serving as a transmission source (transmission source server name in the present embodiment), a token type, a token value, and a port number. Also, the port close request includes the IP address of the transmission source server, and a token value.

Upon receiving a port open processing request from the communication data analyzing unit 112, the port open processing unit 113 obtains a transfer destination address with reference to the following server setting information storage unit 121. Note that a transfer destination address obtaining method will be described later.

Also, the port open processing unit 113 generates a received address based on the obtained transfer destination address, and the port number included in the port open request. Subsequently, the port open processing unit 113 generates data for address conversion including the obtained transfer destination address and the generated received address. The head packet of this data for address conversion may be appended with information for identifying that this data is data for address conversion. The port open processing unit 113 transmits the generated data for address conversion to the communication data transmission unit 115.

Further, the port open processing unit 113 stores the received address and transfer destination address included in the generated data for address conversion in the port management information storage unit 122 in a manner correlated with the received token value.

Upon receiving a port close processing request from the communication data analyzing unit 112, the port close processing unit 114 obtains an entry having a token value matching the token value included in the message with reference to the port management information storage unit 122. Note that an entry obtaining method will be described later.

Subsequently, the port close processing unit 114 which obtains the entry generates data for port shutoff including the received address included in the obtained entry. The head packet of this data for port shutoff is appended with information for identifying that this data is data for port shutoff. The port close processing unit 114 transmits the generated data for port shutoff to the communication data transmission unit 115.

Also, the port close processing unit 114 deletes the obtained entry from the port management information storage unit 122.

The communication data transmission unit 115 transmits the data for address conversion transmitted from the port open processing unit 113, and the data for port shutoff transmitted from the port close processing unit 114 to the DoS countermeasure device 30 via the communication interface 16.

Next, following server setting information stored in the following server setting information storage unit 121 will be described. With the following server setting information storage unit 121, following server setting information is stored in a table format.

FIG. 6 is a diagram illustrating a data structure example of a following server setting table.

The fields of entry identification information, a transmission source server name, a token type, and a transfer destination address are provided to a following sever setting table 121a, pieces of information arrayed in the horizontal direction of each field are mutually correlated.

Information for identifying an entry is set to an entry identification information field. With the example in FIG. 6, "A" is set to the entry of the first row. "B" is set to the entry of the second row. "C" is set to the entry of the third row.

Information for identifying a server serving as a transmission source is set to a transmission source server name field. Note that the information of this filed corresponds to the transmission source server name included in the port open request.

Information for identifying the token type which the port conversion setting server 100 received from the transmission source server is set to a token type field. "RT" is set in the event that the token type is a request token. "AT" is set in the event that the token type is an access token.

The IP address and port number of a transfer destination server to be transferred to the DoS countermeasure device 30 are set to a transfer destination address field in the event that a request has been received from the client device 10 or application server 20. With the example in FIG. 6, the IP address "10.25.20.1" and port number "10" of the token server 41 are set to the entry "A". The IP address "10.25.20.2" and port number "20" of the token server 41 are set to the entry "B". The IP address "10.25.20.3" and port number "30" of the authentication server 42 are set to the entry "C".

In this way, even if the transmission source servers are the same, when the token types differ, the transfer destination addresses differ.

The address to be set to a transfer destination address field is the address of a server in accordance with the sequence of the access privilege transfer processing. Specifically, as illustrated in FIG. 3, processing following the token server 41 issuing a request token is the authentication processing of the authentication server 42, so the address of the authentication server 42 is set to a transfer destination address field. Also, processing following the token server 41 issuing an access token is providing of a service of the service server 43, so the address of the service server 43 is set to a transfer destination address field. Also, processing following the authentication server 42 performing the authentication processing is the access token issuing processing of the token server 41, so the address of the token server 41 is set to a transfer destination address field.

In this way, a table in which a transfer destination address to be accessed along with the flow of the access transfer processing is prepared is set beforehand, whereby the transfer destination address may readily be determined.

Next, user port management information stored in the port management information storage unit 122 will be described. With the port management information storage unit 122, the user port management information is stored in a table format.

Figure 7:
FIG. 7 is a diagram illustrating a data structure example of a port management table according to the second embodiment.

FIG. 7 is a diagram illustrating a data structure example of the port management table according to the second embodiment.

With a port management table 122a, the fields of a token value, a received address, and a transfer destination address are provided, and pieces of information arrayed in the horizontal direction of each field are mutually correlated.

Information for identifying the token value of a received token is stored in a token value field.

A received address generated in the port open processing is stored in a received address field.

The address of a transfer destination server at the time of access to the port of a port number stored in a received address filed from the client device 10 or application 21 is stored in a transfer destination address field.

Hereafter, the processing of each device will be described in detail.

First, the processing (port conversion setting processing) of the port conversion setting server 100 will be described.

Port Conversion Setting Processing

Figure 8:
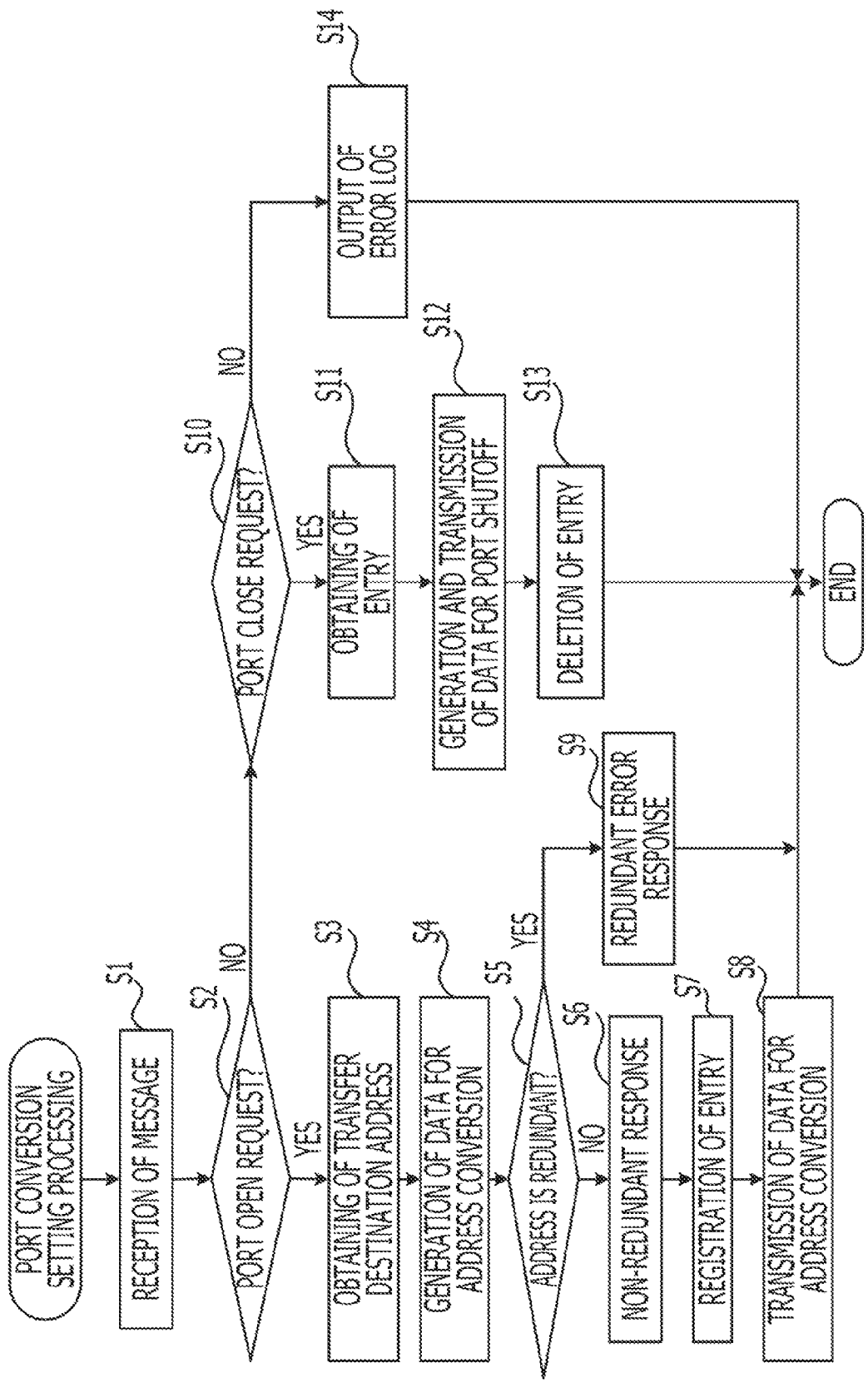
FIG. 8 is a flowchart illustrating port conversion setting processing according to the second embodiment.

FIG. 8 is a flowchart illustrating the port conversion setting processing according to the second embodiment.

[Step S1] The communication data reception unit 111 receives a message. Subsequently, the flow proceeds to step S2.

[Step S2] The communication data analyzing unit 112 determines whether or not the received message is a port open request. In the event that the received message is a port open request (Yes in step S2), the flow proceeds to step S3. In the event that the received message is not a port open request (No in step S2), the flow proceeds to step S10.

[Step S3] The port open processing unit 113 takes the transmission source server name and token type included in the message as keywords, and searches for the entry of the following server setting table 121a matching the keywords. Subsequently, the port open processing unit 113 obtains the transfer destination address of the matched entry. Subsequently, the flow proceeds to step S4.

[Step S4] The port open processing unit 113 generates data for address conversion. Subsequently, the flow proceeds to step S5.

[Step S5] The port open processing unit 113 references the port management table 122a to determine whether or not the received address of the data for address conversion that has been generated is redundant. In the event that the received address is non-redundant (No in step S5), the flow proceeds to step S6. In the event that the received address is redundant (Yes in step S5), the flow proceeds to step S9.

[Step S6] The port open processing unit 113 responds to the server which transmitted a port open request with a message to the effect that the received address is not redundant (hereafter, referred to as "non-redundant"). Subsequently, the flow proceeds to step S7.

[Step S7] The port open processing unit 113 registers the received address and transfer destination address included in the data for address conversion generated in step S4 on the port management table 122a in a manner correlated with the token value included in the received message. Subsequently, the flow proceeds to step S8.

[Step S8] The port open processing unit 113 transmits the data for address conversion to the DoS countermeasure device 30 via the communication data transmission unit 115. Subsequently, the port conversion setting processing is ended.

[Step S9] The port open processing unit 113 responds to the server which transmitted the port open request with an address redundant error. Subsequently, the port conversion setting processing is ended.

Note that the processing sequence of step S6 through step S8 is not restricted to particular sequence, and for example, the processing in step S7 may be performed before the processing in step S6.

[Step S10] The communication data analyzing unit 112 determines whether or not the received message is a port close request. In the event that the received message is a port close request (Yes in step S10), the flow proceeds to step S11. In the event that the received message is not a port close request (No in step S10), the flow proceeds to step S14.

[Step S11] The port close processing unit 114 references the port management table 122a to obtain the entry including a token matching the token included in the message. Subsequently, the flow proceeds to step S12.

[Step S12] The port close processing unit 114 generates data for port shutoff including the received address included in the obtained entry. Subsequently, the port close processing unit 114 transmits the generated data for port shutoff to the DoS countermeasure device 30 via the communication data transmission unit 115. Subsequently, the flow proceeds to step S13.

[Step S13] The port open processing unit 113 deletes the entry obtained in step S11 from the port management table 122a. Subsequently, the port conversion setting processing is ended.

[Step S14] The communication data analyzing unit 112 stores the received message in the error log storage unit 123 as an error log. Subsequently, the port conversion setting processing is ended.

Request Token Issuing Processing

Next, the request token issuing processing of the token server 41 will be described.

Figure 9:
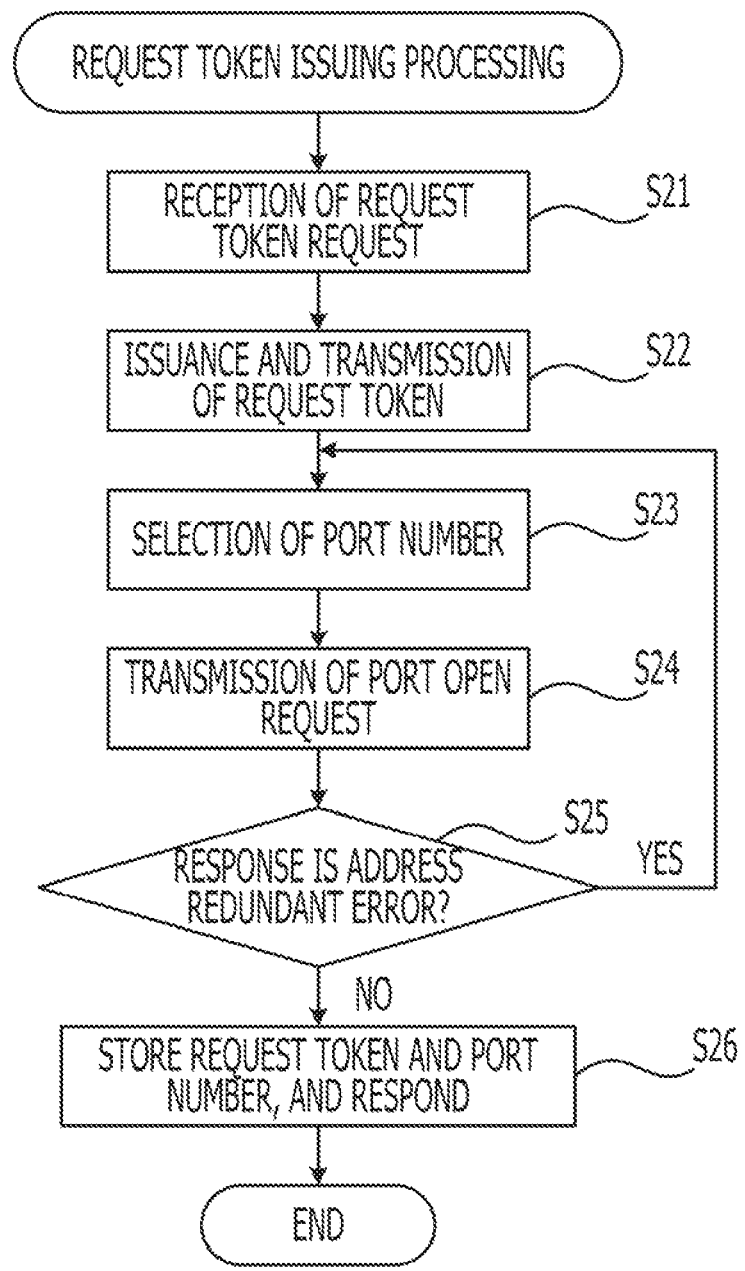
FIG. 9 is a flowchart illustrating request token issuing processing according to the second embodiment.

FIG. 9 is a flowchart illustrating the request token issuing processing according to the second embodiment.

[Step S21] Upon the token server 41 receiving a request token request from the client device 10, the flow proceeds to step S22.

[Step S22] The token server 41 issues a request token, and transmits to the application 21. Subsequently, the flow proceeds to step S23.

[Step S23] The token server 41 selects a port number at random. Subsequently, the flow proceeds to step S24. Note that in the event of an address redundant error, i.e., in the event that the flow has proceeded from step S25, the token server 41 selects a port number again. How to select a port number in this case is not restricted in particular, so a port number may be selected again randomly, a port number obtained by adding a prescribed value (e.g., 1) to the last selected port number may be selected, or the like.

[Step S24] The token server 41 transmits a port open request to the port conversion setting server 100 with the token type and token value of the issued request token, the selected port number, and the transmission source server name of the token server 41 as arguments. Subsequently, the token server 41 awaits a response from the port conversion setting server 100. Upon receiving a response from the port conversion setting server 100, the flow proceeds to step S25.

[Step S25] The token server 41 determines whether or not the response from the port conversion setting server 100 is an address redundant error. In the event that the response is an address redundant error (Yes in step S25), the flow proceeds to step S23. On the other hand, in the event that the response is not an address redundant error (No in step S25), the flow proceeds to step S26.

[Step S26] The token server 41 stores the request token and the determined port number in a message, and responds to the client device 10 with the message. Subsequently, the token server 41 ends the processing.

Authentication Processing

Next, the authentication processing of the authentication server 42 will be described.

Figure 10:
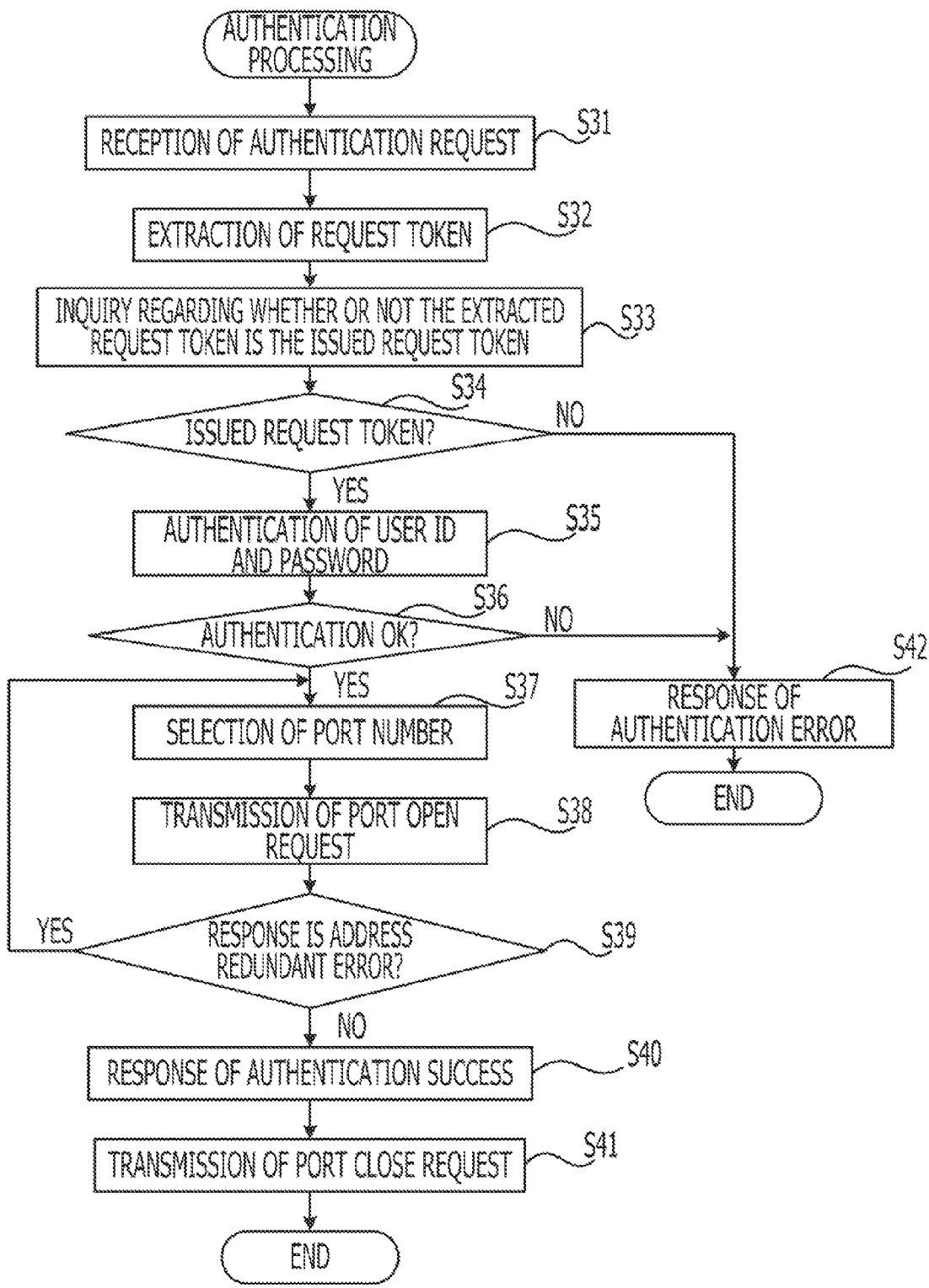
FIG. 10 is a flowchart illustrating authentication processing according to the second embodiment.

FIG. 10 is a flowchart illustrating the authentication processing according to the second embodiment.

[Step S31] The authentication server 42 receives an authentication request from the client device 10. Subsequently, the flow proceeds to step S32.

[Step S32] The authentication server 42 extracts the request token included in the authentication request. Subsequently, the flow proceeds to step S33.

[Step S33] The authentication server 42 inquires of the token server 41 whether or not the extracted request token is the request token issued by the token server. Upon the authentication server 42 receiving a response from the token server 41, the flow proceeds to step S34.

[Step S34] The authentication server 42 determines according to a response from the token server 41 whether or not the extracted request token is the request token issued by the token server 41. In the event that the extracted request token is the request token issued by the token server 41 (Yes in step S34), the flow proceeds to step S35. In the event that the extracted request token is not the request token issued by the token server 41 (No in step S34), the flow proceeds to step S42.

[Step S35] The authentication server 42 authorizes whether or not the user ID and user password included in the authentication request is valid.

[Step S36] As an authentication result by the authentication server 42, in the event that the user ID and user password is an authorized user ID and user password (Yes in step S36), the flow proceeds to step S37. In the event that the user ID and user password is an unauthorized user ID and user password (No in step S36), the flow proceeds to step S42.

[Step S37] The authentication server 42 selects a port number at random. Subsequently, the flow proceeds to step S38. Note that in the event of an address redundant error, i.e., in the event that the flow has proceeded from step S39, the authentication server 42 selects a port number again. How to select a port number in this case is not restricted in particular, so a port number may be selected again randomly, a port number obtained by adding a prescribed value (e.g., 1) to the last selected port number may be selected, or the like.

[Step S38] The authentication server 42 transmits a port open request to the port conversion setting server 100 with the token type and token value of the request token, the selected port number, and the transmission source server name of the authentication server 42 as arguments. Subsequently, the token server 41 awaits a response from the port conversion setting server 100. Upon the authentication server 42 receiving a response from the port conversion setting server 100, the flow proceeds to step S39.

[Step S39] The authentication server 42 determines whether or not the response from the port conversion setting server 100 is an address redundant error. In the event that the response is an address redundant error (Yes in step S39), the flow proceeds to step S37. On the other hand, in the event that the response is not an address redundant error (No in step S39), the flow proceeds to step S40.

[Step S40] The authentication server 42 responds authentication success storing the port number. Subsequently, the flow proceeds to step S41.

[Step S41] The authentication server 42 transmits a port close request with the token value and transmission source address as arguments to the port conversion setting server 100. Subsequently, the authentication server 42 ends the authentication processing.

[Step S42] The authentication server 42 responds to the client device 10 with an authentication error. Subsequently, the authentication server 42 ends the authentication processing.

Access Token Issuing Processing

Next, the access token issuing processing of the token server 41 will be described.

Figure 11:
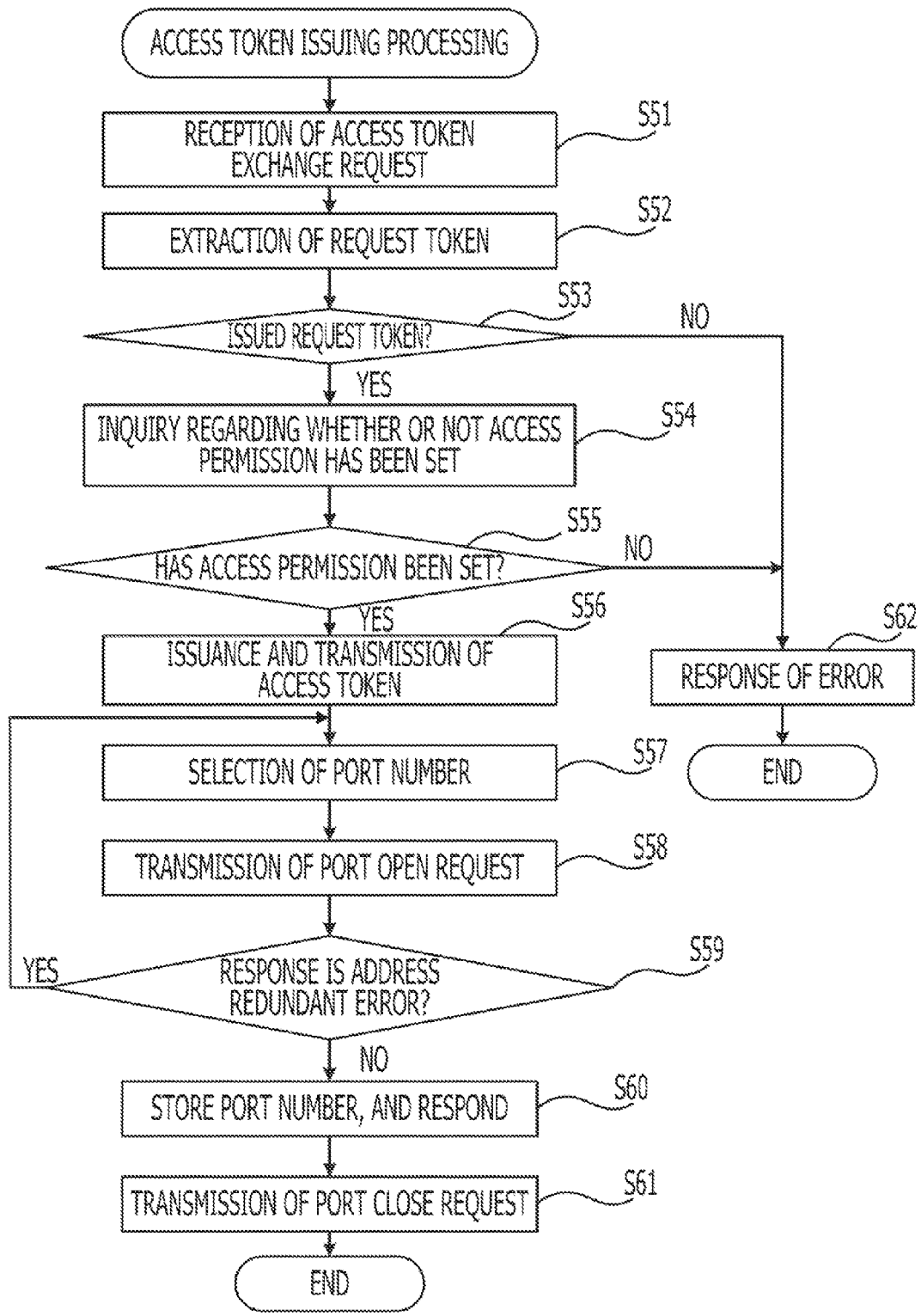
FIG. 11 is a flowchart illustrating access token issuing processing according the second embodiment.

FIG. 11 is a flowchart illustrating the access token issuing processing according to the second embodiment.

[Step S51] The token server 41 receives an access token exchange request from the client device 10. Subsequently, the flow proceeds to step S52.

[Step S52] The token server 41 extracts the request token from the received request. Subsequently, the flow proceeds to step S53.

[Step S53] The token server 41 determines whether or not the extracted request token is the request token issued by the token server 41. In the event that the extracted request token is the request token issued by the token server 41 (Yes in step S53), the flow proceeds to step S54. In the event that the extracted request token is not the request token issued by the token server 41 (No in step S53), the flow proceeds to step S62.

[Step S54] The token server 41 inquires of the authentication server 42 whether or not the user has set access permission as to the extracted request token. Upon the token server 41 receiving a response from the authentication server 42, the flow proceeds to step S55.

[Step S55] As an inquiry result, in the event of the token server 41 receiving notification to the effect that the user has set access permission (Yes in step S55), the flow proceeds to step S56. In the event of receiving notification to the effect that the user has not set access permission (No in step S55), the flow proceeds to step S62.

[Step S56] The token server 41 issues an access token, and transmits this to the client device 10. Subsequently, the flow proceeds to step S57.

[Step S57] The token server 41 selects a port number at random. Subsequently, the flow proceeds to step S58. Note that in the event of an address redundant error, i.e., in the event that the flow has proceeded from step S59, the token server 41 selects a port number again. How to select a port number in this case is not restricted in particular, so a port number may be selected again randomly, a port number obtained by adding a prescribed value (e.g., 1) to the last selected port number may be selected, or the like.

[Step S58] The token server 41 transmits a port open request to the port conversion setting server 100 with the token value, port number, and transmission source server name as arguments. Subsequently, the token server 41 awaits a response from the port conversion setting server 100. Upon the token server 41 receiving a response from the port conversion setting server 100, the flow proceeds to step S59.

[Step S59] The token server 41 determines whether or not the response from the port conversion setting server 100 is an address redundant error. In the event that the response is an address redundant error (Yes in step S59), the flow proceeds to step S57. On the other hand, in the event that the response is not an address redundant error (No in step S59), the flow proceeds to step S60.

[Step S60] The token server 41 stores the port number in a message, and responds to an access token exchange request with the message. Subsequently, the flow proceeds to step S61.

[Step S61] The token server 41 transmits a port close request to the port conversion setting server 100 with the token value, and transmission source address as arguments. Subsequently, the token server 41 ends the access token issuing processing.

[Step S62] The token server 41 responds to the client device 10 with an error. Subsequently, the token server 41 ends the access token issuing processing.

Next, the processing of the service server 43 will be described.

Figure 12:
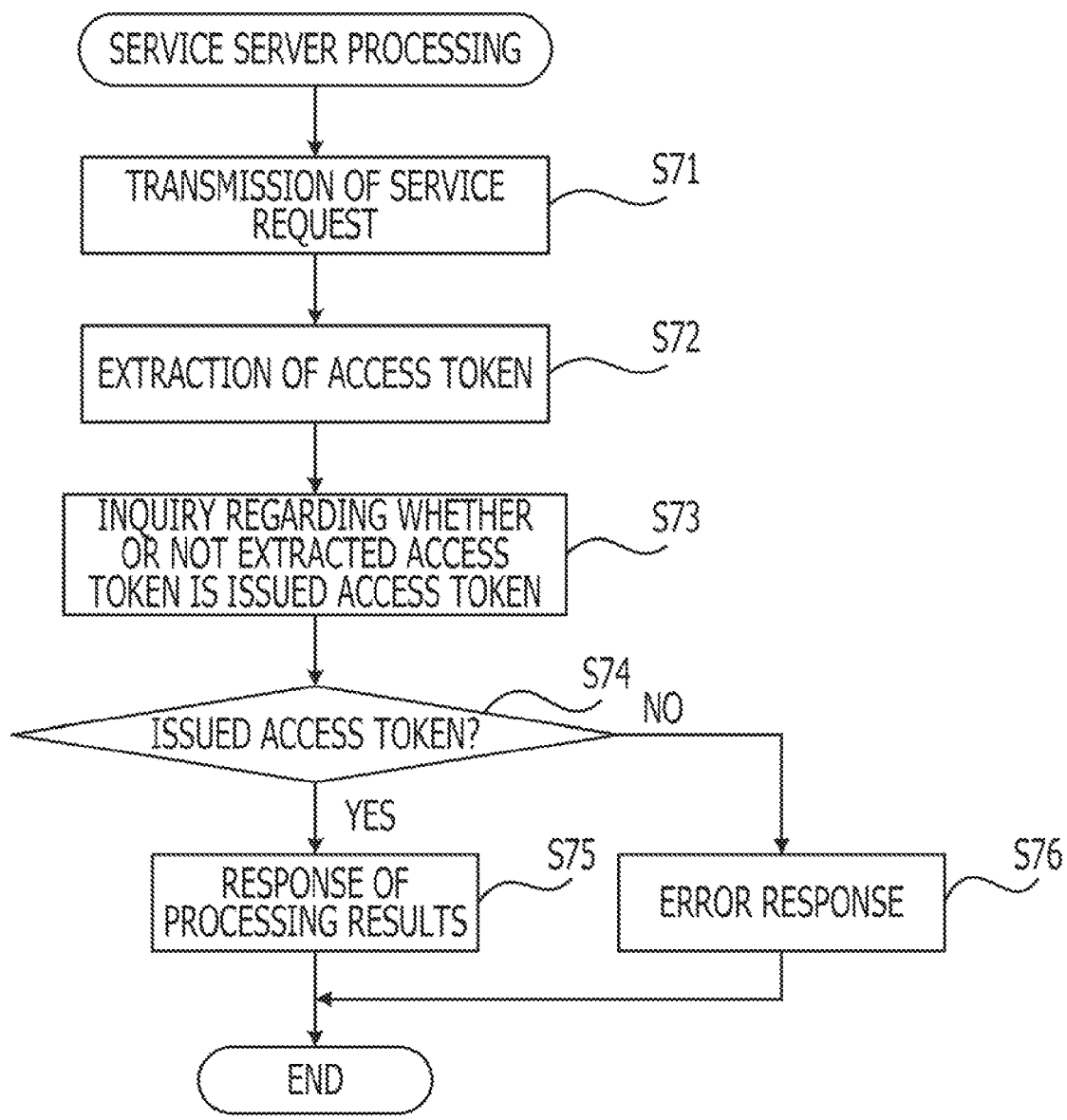
FIG. 12 is a flowchart illustrating the processing of a service server.

FIG. 12 is a flowchart illustrating the processing the service server.

[Step S71] Upon the service server 43 receiving a service request from the application 21, the flow proceeds to step S72.

[Step S72] The service server 43 extracts the access token included in the service request. Subsequently, the flow proceeds to step S73.

[Step S73] The service server 43 inquires of the token server 41 whether or not the extracted access token is the access token issued by the token server 41.

[Step S74] The service server 43 determines according to a response from the token server 41 whether or not the extracted access token is the access token issued by the token server 41. In the event that the extracted access token is the access token issued by the token server 41 (Yes in step S74), the flow proceeds to step S75. In the event that the extracted access token is not the access token issued by the token server 41 (No in step S74), the flow proceeds to step S76.

[Step S75] The service server 43 responds to the application 21 with the result of the service processing.

[Step S76] The service server 43 responds to the application 21 with an error.

Next, a specific example of the entire processing of the system 1000 will be described using the following server setting table 121a illustrated in FIG. 6.

FIG. 13 and FIG. 15 through FIG. 18 are diagrams illustrating a specific example of the processing of the system according to the second embodiment. Note that, with the FIG. 13 and FIG. 15 through FIG. 18, on the convenience of space, a combination between the IP address and port number of the token server 41 "10.25.20.3:30" is represented with "IPa:30". A combination between the IP address and port number of the authentication server 42 "10.25.20.1:10" is represented with "IPb:10". A combination between the IP address and port number of the service server 43 "10.25.20.2:20" is represented with "IPc:20".

Also, a received address "10.25.20.3:20011" is represented with "IPa:20011". A received address "10.25.20.1:20001" is represented with "IPb:20001". A received address "10.25.20.2:20021" is represented with "IPc:20021".

Also, with the present specific example, before the access privilege transfer processing is started, each field of the port management table 122a is blank.

Hereafter, sequences the same as the sequences described in FIG. 3 will be denoted with the same sequence number. Also, "a" or "b" appended after a sequence number indicates that this is a sequence obtained by the processing of the sequence thereof being subdivided.

Figure 13:
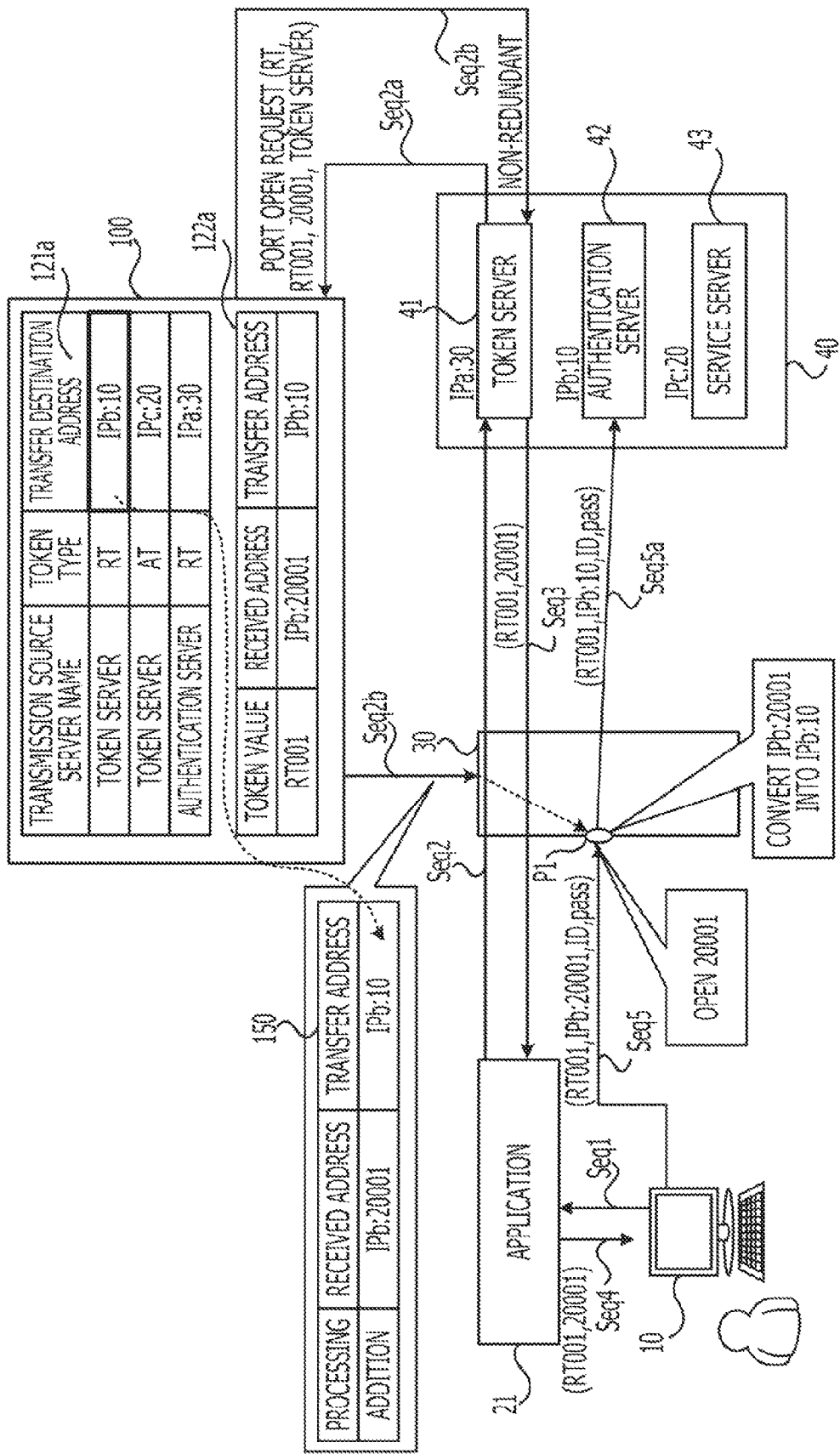
FIG. 13 is a diagram illustrating a specific example of the processing of the system according to the second embodiment.

[Sequence Seq1] As illustrated in FIG. 13, the client device 10 transmits a service request to the application 21.

[Sequence Seq2] The application 21 which has received the service request from the client device 10 transmits a request token request to the token server 41.

The token server 41 which received the request token request issues the request token of a token value "RT001", and transmits this to the application 21. Next, the token server 41 selects a port number accessible from the application 21 at random. With the present specific example, the port number is assumed to be "20001".

[Sequence Seq2a] The token server 41 transmits a port open request to the port conversion setting server 100 with the token type "RT" and token value "RT001" of the issued token, port number "20001", and transmission source server name "token server" as arguments. Subsequently, the token server 41 awaits a response.

[Sequence Seq2b] The port conversion setting server 100 which received the port open request takes the transmission source server name "token server" and token type "RT" included in the message as keywords, and searches for the entry of the following server setting table 121a matching the keywords. Subsequently, the port conversion setting server 100 obtains the transfer destination address "10.25.20.1:10" of the matched entry of the first row.

Next, the port conversion setting server 100 generates a received address "10.25.20.1:20001" from the obtained transfer address "10.25.20.1:10" and the notified port number "20001". Subsequently, the port conversion setting server 100 generates data for address conversion 150 including the received address "10.25.20.1:20001" and the transfer destination address "10.25.20.1:10".

Subsequently, the port conversion setting server 100 references the port management table 122a to determine whether or not the generated received address is redundant with the received address of already generated data for address conversion. With the present specific example, each filed is blank, and is non-redundant, so the port conversion setting server 100 transmits the data for address conversion 150 to the DoS countermeasure device 30. Thus, the DoS countermeasure device 30 opens the port P1 of the port number "20001". Also, the DoS countermeasure device 30 stores the received address "10.25.20.1:20001" and the transfer destination address "10.25.20.1:10" in a correlated manner. The DoS countermeasure device 30 stores information, for example, in a table format.

Figure 14:
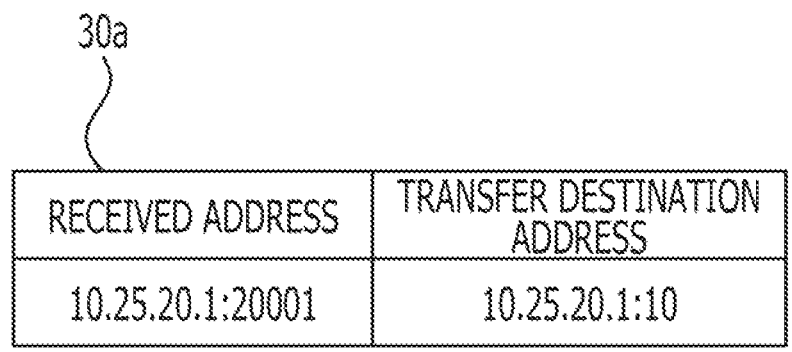
FIG. 14 is a diagram illustrating a data structure example of an address conversion table according to the second embodiment.

FIG. 14 is a diagram illustrating a data structure example of the address conversion table according to the second embodiment.

The fields of a received address and a transfer destination address are provided to an address conversion table 30a included in the DoS countermeasure device 30, and pieces of information arrayed in the horizontal direction of each field are mutually correlated.

The received address included in the data for address conversion is stored in the received address field.

The transfer destination address included in the data for address conversion is stored in the transfer destination address field.

Description will be continued by returning to FIG. 13 again.

Also, the port conversion setting server 100 sets an entry in which the received address "10.25.20.1:20001" and the transfer destination address "10.25.20.1:10" are correlated with the token value "RT001" to the port management table 122a.

Also, the port conversion setting server 100 responds to the token server 41 with "non-redundant".

[Sequence Seq3] The token server 41 which has obtained the response stores, since the response is not an address redundant error, the token value "RT001" and the port number "20001" of the request token in a message, and responds to the application 21 with the message.

[Sequence Seq4] The application 21 which has received the response transmits a permission request storing the token value "RT001" and the port number "20001" of the received request token to the client device 10.

[Sequence Seq5] The client device 10 transmits a packet to the address "10.25.20.1:20001" of the specified port number "20001" for setting access permission. This packet stores the token value "RT001" of the request token, user ID, and user password.

[Sequence Seq5a] The DoS countermeasure device 30 which has received this data at the port number "20001" references the address conversion table 30a. Subsequently, the DoS countermeasure device 30 converts the destination address "10.25.20.1:20001" of the received packet into the transfer destination address "10.25.20.1:10" stored in a correlated manner, and transfers this. As a result thereof, the packet is received at the authentication server 42.

Figure 15:
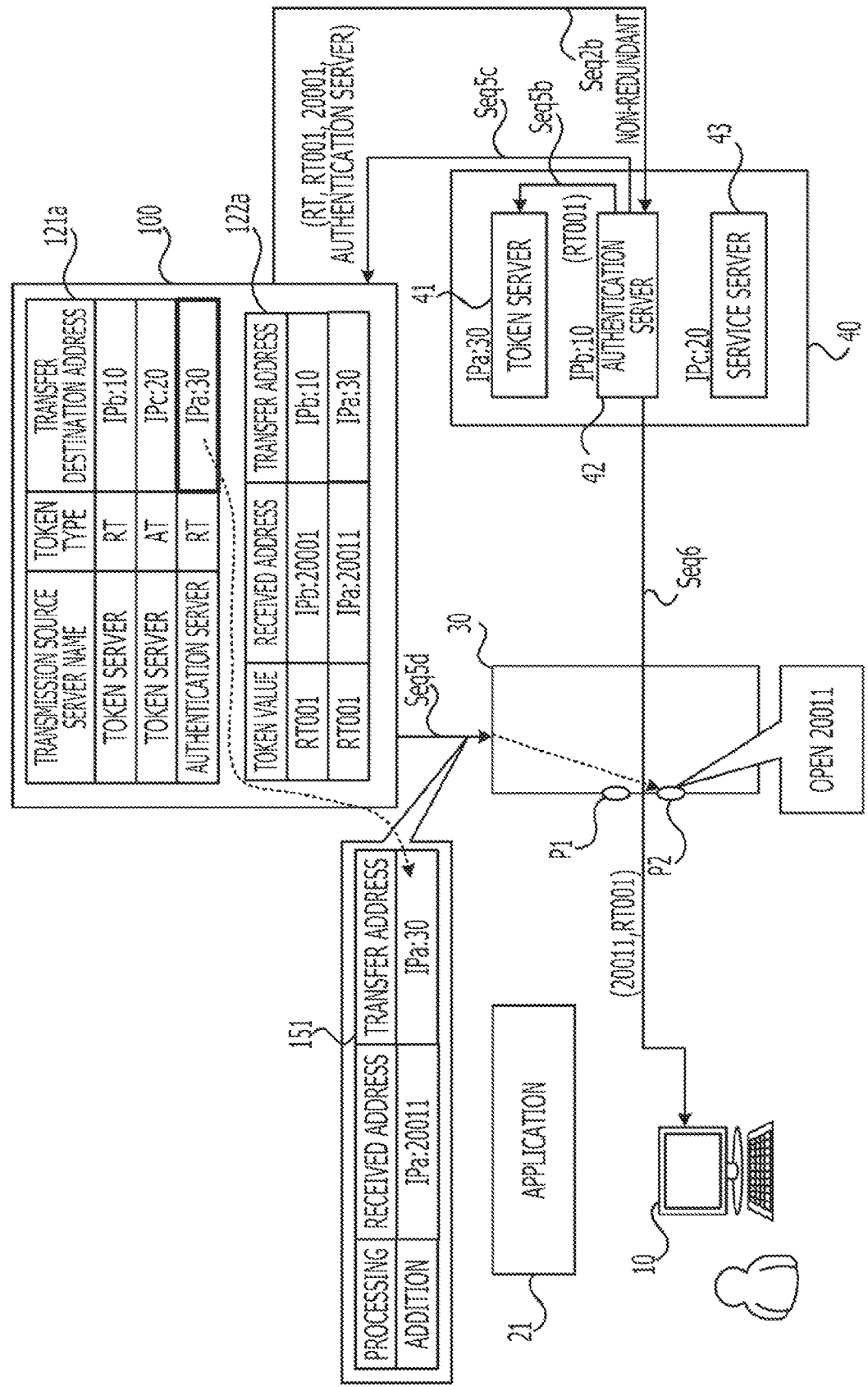
FIG. 15 is a diagram illustrating a specific example of the processing of the system according to the second embodiment.

[Sequence Seq5b] As illustrated in FIG. 15, the authentication server 42 extracts the token value "RT001" of the request token from the received packet, and inquires of the token server 41 whether or not the request token is the request token issued by the token server 41. With the present specific example, this request token is the request token issued by the token server 41 in the sequence Seq2, so the sequence proceeds to the next.

Next, the authentication server 42 performs authentication of the user ID and user password. With the present specific example, the user is an authorized user, so a port number is selected at random. With the present specific example, "20011" is selected.

[Sequence Seq5c] Further, the authentication server 42 transmits a port open request to the port conversion setting server 100 with the token type "RT", token value "RT001", port number "20011", and transmission source server name "authentication server" as arguments, and awaits a response.

[Sequence Seq5d] The port conversion setting server 100 which has received the port open request takes the transmission source server name "authentication server" and the token type "RT" as keywords to search for the entry of the following server setting table 121a matching the keywords. Subsequently, the port conversion setting server 100 obtains the transfer destination address "10.25.20.3:30" of the matched entry of the third row.

Next, the port conversion setting server 100 generates a received address "10.25.20.3:20011" from the transfer destination address "10.25.20.3:30" and the notified port number "20011". Subsequently, the port conversion setting server 100 generates data for address conversion 151 including the received address "10.25.20.3:20011" and the transfer destination address "10.25.20.3:30".

Subsequently, the port conversion setting server 100 references the port management table 122a to determine whether or not the generated received address is redundant with an already generated received address.

With the present specific example, the generated received address is not redundant, so the port conversion setting server 100 transmits the data for address conversion 151 to the DoS countermeasure device 30. Thus, the DoS countermeasure device 30 opens the port P2 of the port number "20011". Also, the DoS countermeasure device 30 stores the received address "10.25.20.3:20011" and the transfer destination address "10.25.20.3:30" in the address conversion table 30a in a correlated manner.

Also, the port conversion setting server 100 sets the entry in which the received address "10.25.20.3:20011" and the transfer destination address "10.25.20.3:30" are correlated with the token value "RT001" to the port management table 122a. Also, the port conversion setting server 100 responds to the authentication server 42 with "non-redundant".

[Sequence Seq6] The authentication server 42 which has obtained the response responds to the client device 10 with authentication success storing the token value "RT001" and port number "20011" of the request token authenticated by the authentication server 42 since the response is not an address redundant error.

Figure 16:
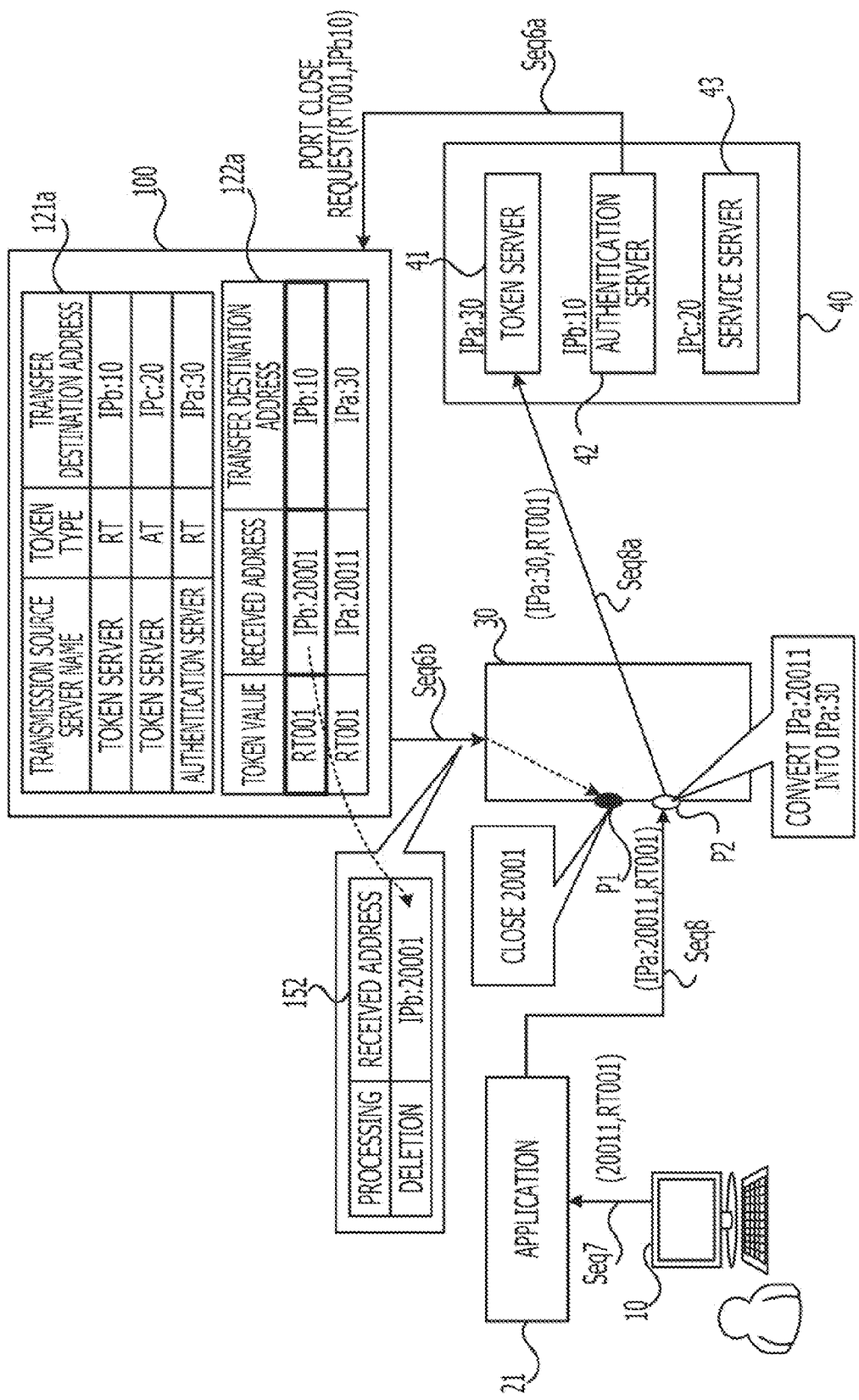
FIG. 16 is a diagram illustrating a specific example of the processing of the system according to the second embodiment.

[Sequence Seq6a] After the response to the client device 10, as illustrated in FIG. 16, the authentication server 42 transmits a port close request to the port conversion setting server 100 with the token value "RT001" and transmission source address "10.25.20.1:10" as arguments.

[Sequence Seq6b] The port conversion setting server 100 which has received the port close request takes the token value "RT001" and transmission source address "10.25.20.1:10" as keywords to search for an entry of the port management table 122a matching the keywords. Subsequently, the port conversion setting server 100 obtains the matched entry of the first row.

Subsequently, the port conversion setting server 100 generates data for port shutoff 152 including the received address "10.25.20.1:20001". Subsequently, the port conversion setting server 100 transmits the generated data for port shutoff to the DoS countermeasure device 30. Thus, the DoS countermeasure device 30 shuts off the port P1 of the port number "20001". Also, the port conversion setting server 100 deletes the entry of the first row.

[Sequence Seq7] The client device 10 which has received the authentication success responds to the application 21 with permission completion with the token value "RT001" and port number "20011" as arguments.

[Sequence Seq8] The application 21 which has received the response transmits an access token exchange request storing the token value "RT001" to the address "10.25.20.3:20011" of the specified port number "20011".

[Sequence Seq8a] The DoS countermeasure device 30 which has received the access token exchange request at the port number "20011" references the address conversion table 30a. Subsequently, the DoS countermeasure device 30 converts the destination address "10.25.20.3:20011" of the received packet into the transfer destination address "10.25.20.3:30" stored in a correlated manner, and transfers this. As a result thereof, the packet is received at the token server 41.

The token server 41 which has received the access token exchange request extracts the token value "RT001" of the request token from the request message, and determines whether or not the extracted request token is the request token issued by the token server 41. With the present specific example, the extracted request token is the request token issued by the token server 41 in the sequence Seq2, so the sequence proceeds to the next.

Figure 17:
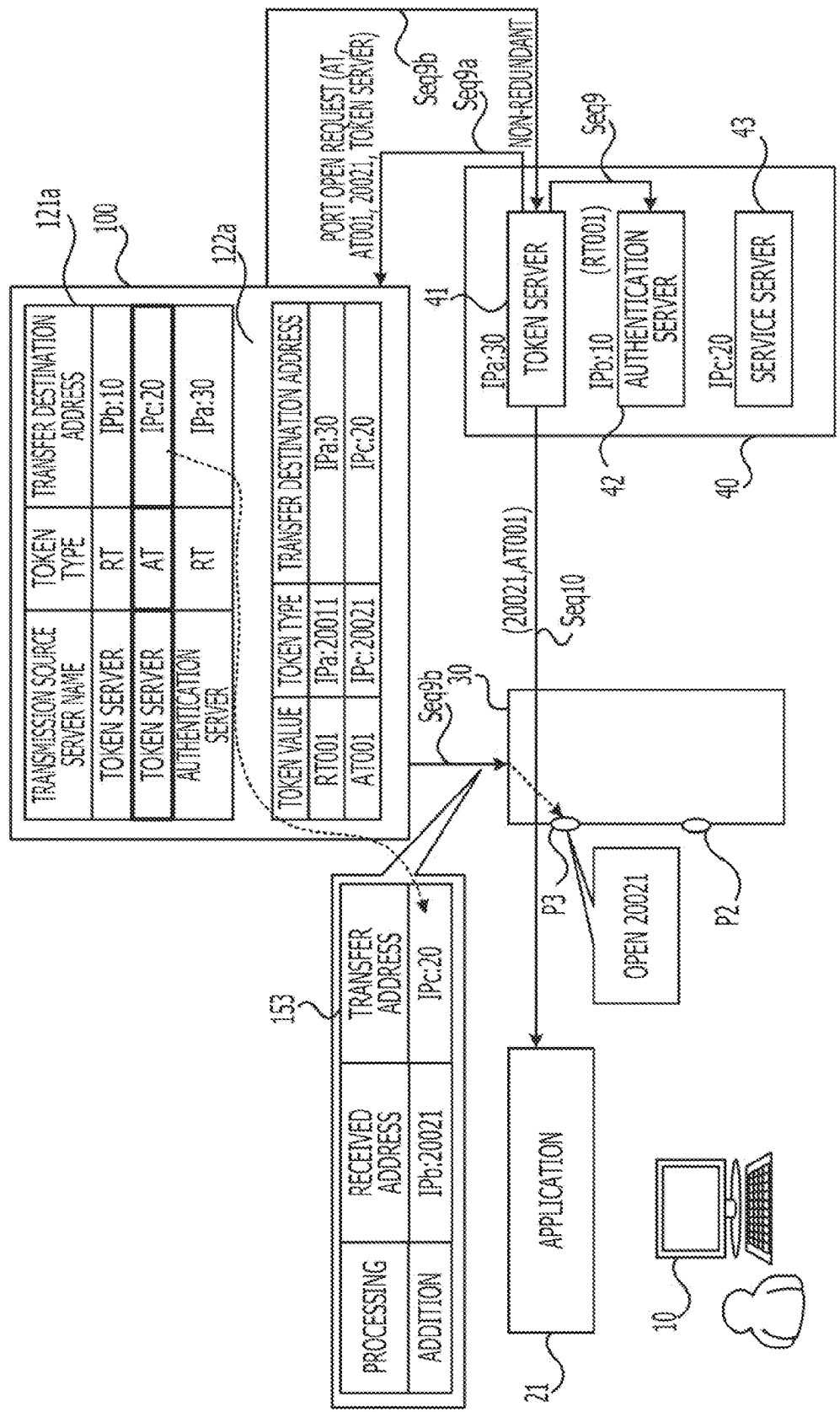
FIG. 17 is a diagram illustrating a specific example of the processing of the system according to the second embodiment.

[Sequence Seq9] As illustrated in FIG. 17, the token server 41 inquires of the authentication server 42 whether or not the user has set access permission as to the request token of the token value "RT001". With the present specific example, access permission has been set, so the token server 41 proceeds to the next.

[Sequence Seq9a] Next, the token server 41 issues the access token of a token value "AT001", and transmits this to the client device 10. Subsequently, the token server 41 selects a port number at random. With the present specific example, "20021" is selected. Further, the token server 41 transmits a port open request to the port conversion setting server 100 with the token type "AT", token value "AT001", port number "20021", and transmission source server name "token server" as arguments, and awaits a response.

[Sequence Seq9b] The port conversion setting server 100 which has received the port open request takes the transmission source server name "token server" and token type "AT" as keywords to search for the entry of the following server setting table 121a matching the keywords. Subsequently, the port conversion setting server 100 obtains the transfer destination address "10.25.20.2:20" of the matched entry of the second row.

Next, the port conversion setting server 100 generates data for address conversion 153 including the received address "10.25.20.2:20021" and transfer destination address "10.25.20.2:20" from the transfer destination address "10.25.20.2:20" and notified port number "20021". Subsequently, the port conversion setting server 100 references the port management table 122a to determine whether or not the received address is redundant.

With the present specific example, the received address is not redundant, so the port conversion setting server 100 transmits the data for address conversion 153 that has been generated to the DoS countermeasure device 30. Thus, the DoS countermeasure device 30 opens the port P3 of the port number "20021". Also, the DoS countermeasure device 30 stores the received address "10.25.20.2:20021" and the transfer destination address "10.25.20.2:20" in the address conversion table 30a in a correlated manner.

Also, the port conversion setting server 100 sets the entry in which the received address "10.25.20.2:20021" and the transfer destination address "10.25.20.2:20" are correlated with the token value "AT001" to the port management table 122a.

Also, the port conversion setting server 100 responds to the token server 41 with "non-redundant".

[Sequence Seq10] The token server 41 which has obtained the response stores the access token of the token value "AT001" and port number "20021" in a response message, and responds to the application 21 with the response message since the response is not an address redundant error.

Figure 18:
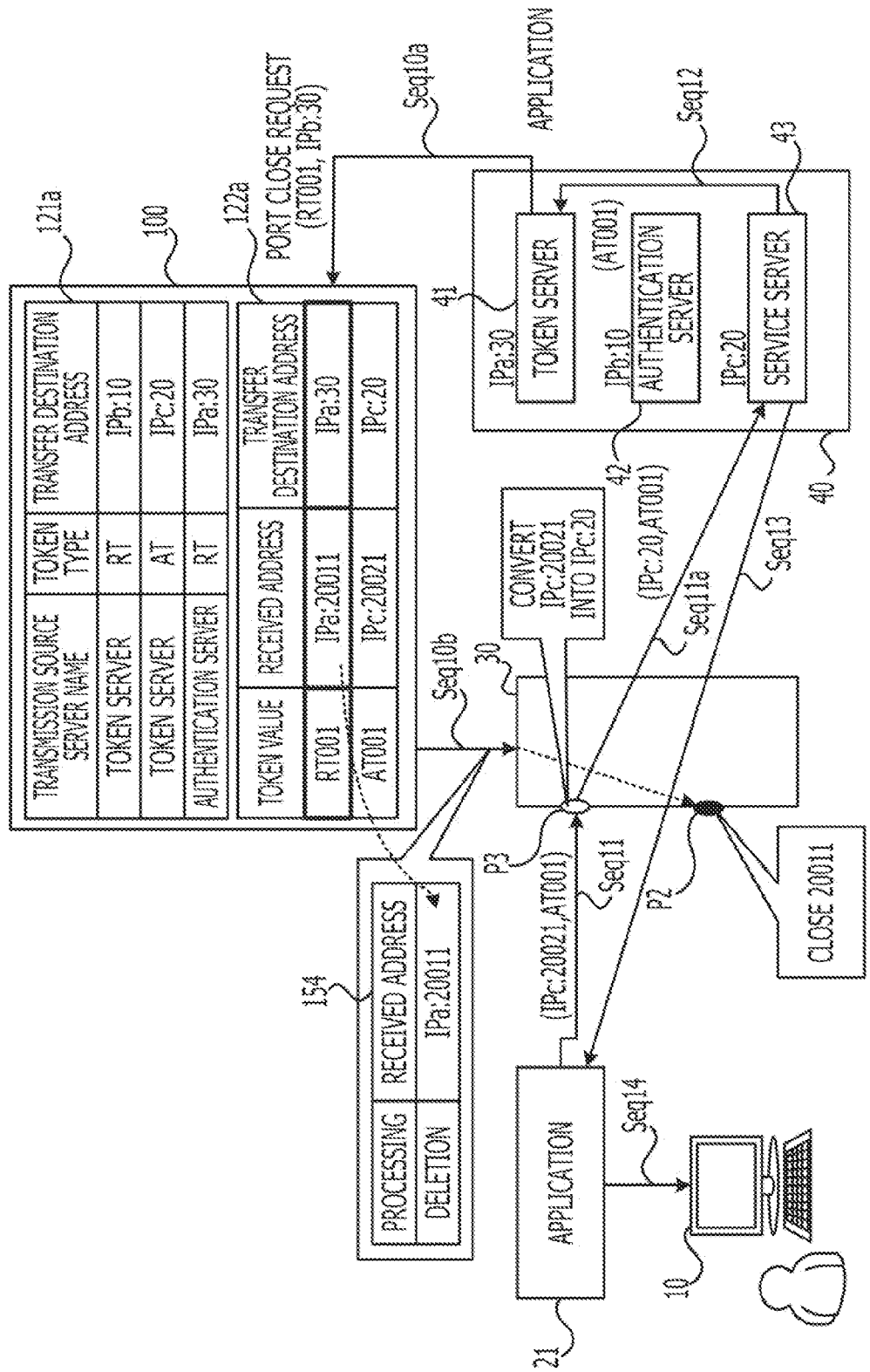
FIG. 18 is a diagram illustrating a specific example of the processing of the system according to the second embodiment.

[Sequence Seq10a] After the response to the client device 10, as illustrated in FIG. 18, the token server 41 transmits a port close request to the port conversion setting server 100 with the token value "RT001" and transmission source address "10.25.20.3:30" as arguments.

[Sequence Seq10b] The port conversion setting server 100 which has received the port close request takes the token value "RT001" and transmission source address "10.25.20.3:30" as keywords to search for an entry of the port management table 122a matching the keywords. Subsequently, the port conversion setting server 100 obtains the matched entry of the first row.

The port conversion setting server 100 generates data for port shutoff 154 including the received address "10.25.20.3:20011".

Subsequently, the port conversion setting server 100 transmits this data for port shutoff 154 to the DoS countermeasure device 30. Thus, the DoS countermeasure device 30 shuts off the port P2 of the port number "20011". Also, the port conversion setting server 100 deletes the entry of the first row.

[Sequence Seq11] The application 21 which has obtained the access token of the token value "AT001" transmits a service request to the address "10.25.20.2:20021" of the specified port number "20021".

[Sequence Seq11a] The DoS countermeasure device 30 which has received this data at the port number "20021" references the address conversion table 30a. Subsequently, the DoS countermeasure device 30 converts the address "10.25.20.2:20021" of the received packet into the transfer destination address "10.25.20.2:20" stored in a correlated manner, and transfers this. As a result thereof, the packet is received at the service server 43.

[Sequence Seq12] The service server 43 extracts the access token from the service request. Subsequently, the service server 43 inquires of the token server 41 whether or not the extracted access token is the access token issued by the token server 41. With the present specific example, the extracted access token is the access token issued by the token server 41 in the sequence Seq9a, so the sequence proceeds to the next.

[Sequence Seq13] The service server 43 performs service processing corresponding to the service request, and responds to the application 21 with the service results.

[Sequence Seq14] The application 21 performs processing according to need, and responds the client device 10 with the processing results.

Note that though description will be omitted below, even at the time of service completion, processing for shutting off the port P3 used for the service processing is performed. This processing may be performed in the same way as the above-mentioned way.

As described above, with the system 1000 according to the present embodiment, an arrangement has been made wherein the token server 41 and the authentication server 42 transmit a port open request to the port conversion setting server 100. Subsequently, the port conversion setting server 100 generates data for address conversion, and transmits this to the DoS countermeasure device 30. Subsequently, the DoS countermeasure device 30 opens the port of the received address included in the data for address conversion.

Thus, the port number may dynamically be changed without implementing the port conversion function at the service center 40 side. Accordingly, server processing costs (open/close of a TCP socket, etc.) incurred within the service center 40 due to rewriting of the port number may be reduced. Also, even in the event that it is difficult to implement the port conversion function to the service center 40 side, enhancement of the security of the service center 40 may readily be realized.

Also, dynamically changing the port number may prevent a malicious application from determining an opened port. Thus, attack to an opened port may be prevented, and an unsuitable situation due to the DoS attack, such as unavailable service, system down, or the like, may be prevented.

Also, the port conversion setting server 100 is configured to receive a port open request including a token type, a token value, in addition to a port number. Thus, the port conversion setting server 100 may determine a suitable transfer destination server according to a token type.

Also, the port conversion setting server 100 is configured to include the following server setting table 121a. Thus, a transfer destination server may readily be determined.

Also, the port conversion setting server 100 is configured to generate an entry of the port management table 122a at the time of receiving a port open request. Thus, a port to be shut off may readily be determined at the time of receiving a port close request.

Subsequently, in response to a port close request, the port conversion setting server 100 is configured to reference the port management table 122a to generate and transmit data for port shutoff. Thus, the DoS countermeasure device 30 may shut off an opened port.

Further, an arrangement is made wherein opening/shutting off of a port is performed in accordance with the sequence of access privilege transfer, and time for opening the port is reduced. Specifically, a server which has completed processing is configured to transmit a port close request to the port conversion setting server 100 at the point of the processing being completed. That is to say, a port close request is arranged to be transmitted to the port conversion setting server 100 at the point of responding with authentication success or failure as to an authentication request, or at the point of responding to an access token exchange request.

Subsequently, the port conversion setting server 100 is configured to transmit data for port shutoff for shutting off a port used for this processing to the DoS countermeasure device. Subsequently, the DoS countermeasure device 30 is configured to shut off the port of the port number included in the data for port shutoff.

Thus, attack to an opened port may be prevented, and an unsuitable situation due to the DoS attack, such as unavailable service, system down, or the like, may be prevented.

Also, the port conversion setting server 100 is configured to receive a port close request including a token value, in addition to a port number. Thus, port shutoff may be performed in increments of tokens (in increments of processes).

Specifically, the system 1000 includes an application other than the application 21, so let us consider a case where the user also performs the access privilege transfer processing regarding this application.

In this case, the token server 41 performs the request token issuing processing more than once, and the port conversion setting server 100 receives a port open request more than once.

As a result of the port conversion setting server 100 performing the above processing in accordance with a request, such as the port management table 122a illustrated in FIG. 7, multiple entries having the same received address, the same transfer destination address, and a different token value are registered. In such a case, even in the event that a port close request has been received, the port conversion setting server 100 may determine a port to be shut off based on a token value stored in the port management table 122a. In this way, the port conversion setting server 100 may open/close a port of the DoS countermeasure device 30 according to multiple port open requests or multiple port close requests from multiple client devices or multiple applications.

Third Embodiment

Next, a system according to a third embodiment will be described.

Hereafter, with regard to the system according to the third embodiment, description will primarily be made regarding different points as to the above system 1000 according to the second embodiment, and description of items which are the same or equivalent will be omitted.

The system according to the third embodiment differs from the second embodiment in that the port number of a server to be accessed next is determined by a port conversion setting server.

Figure 19:
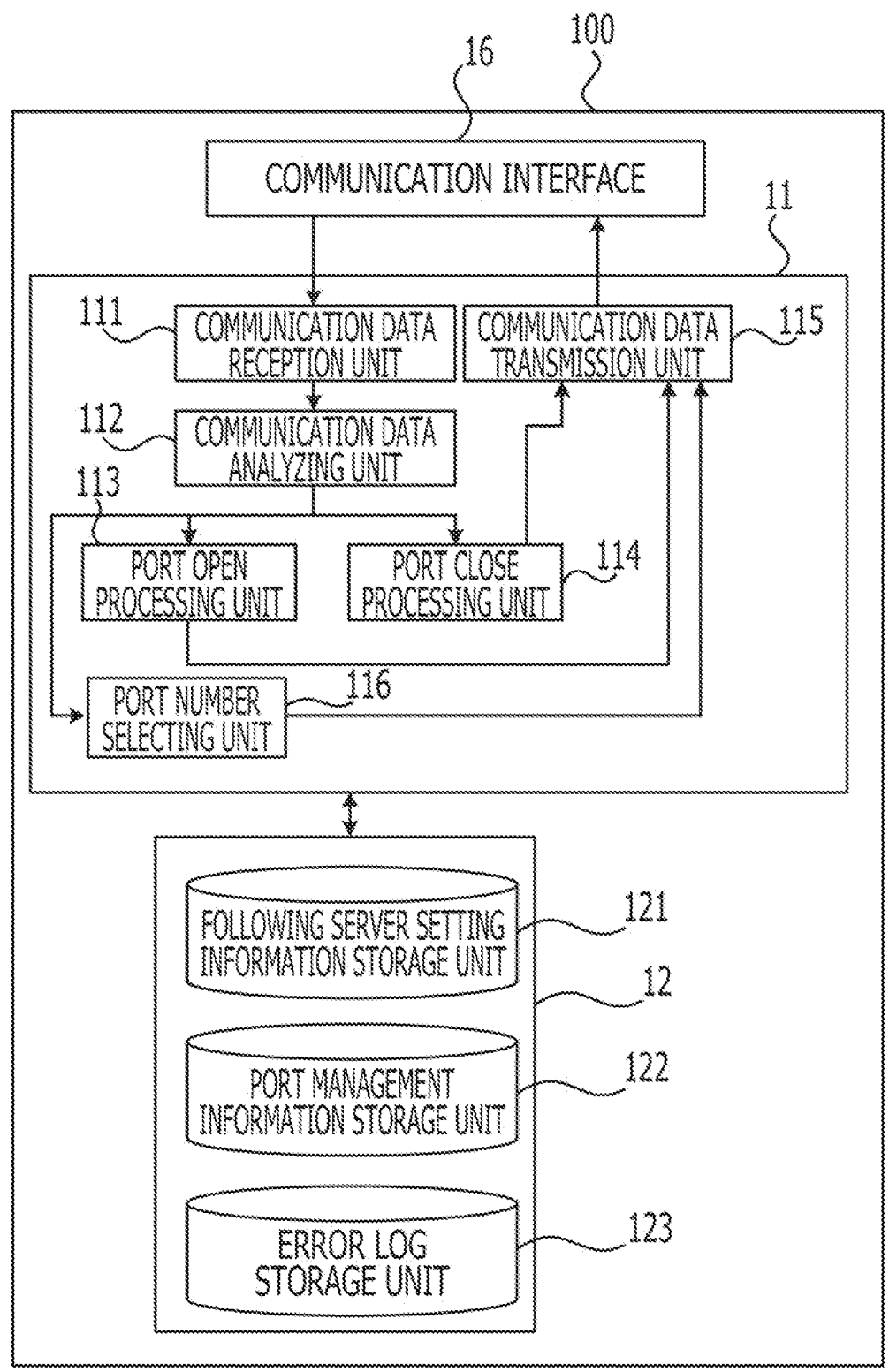
FIG. 19 is a block diagram illustrating the function of a port conversion setting server according to a third embodiment.

FIG. 19 is a block diagram illustrating the functions of a port conversion setting server according to the third embodiment.

A port conversion setting server 100a according to the third embodiment further includes a port number selecting unit 116.

The communication data analyzing unit 112 analyzes a request included in a message received by the communication data reception unit 111. Subsequently, in the event that this request is a port number notification request, port number selection processing is requested from the port number selecting unit 116.

Upon receiving a port number selection processing request, the port number selecting unit 116 takes the transmission source server name and token type included in the received message as keywords to search for the entry of the following server setting table 121a matching the keywords. Subsequently, the port number selecting unit 116 obtains the transfer destination address of the matched entry.

Also, the port number selecting unit 116 selects a port number. The port number selecting unit 116 generates a received address based on the transfer destination address, and the selected port number. The generated received address is taken as a keyword, and an entry in the port management table 122a matching the keyword is searched for. Subsequently, in the event that there is a matched entry, the port number selecting unit 116 performs selection of a port number again. In the event that there is no matched entry, the port number selecting unit 116 transmits the selected port number to the communication data transmission unit 115.

Upon receiving the port number from the port number selecting unit 116, the communication data transmission unit 115 transmits the received port number to the server which is a port number notification request source.

Next, port conversion setting processing according to the third embodiment will be described.

Figure 20:
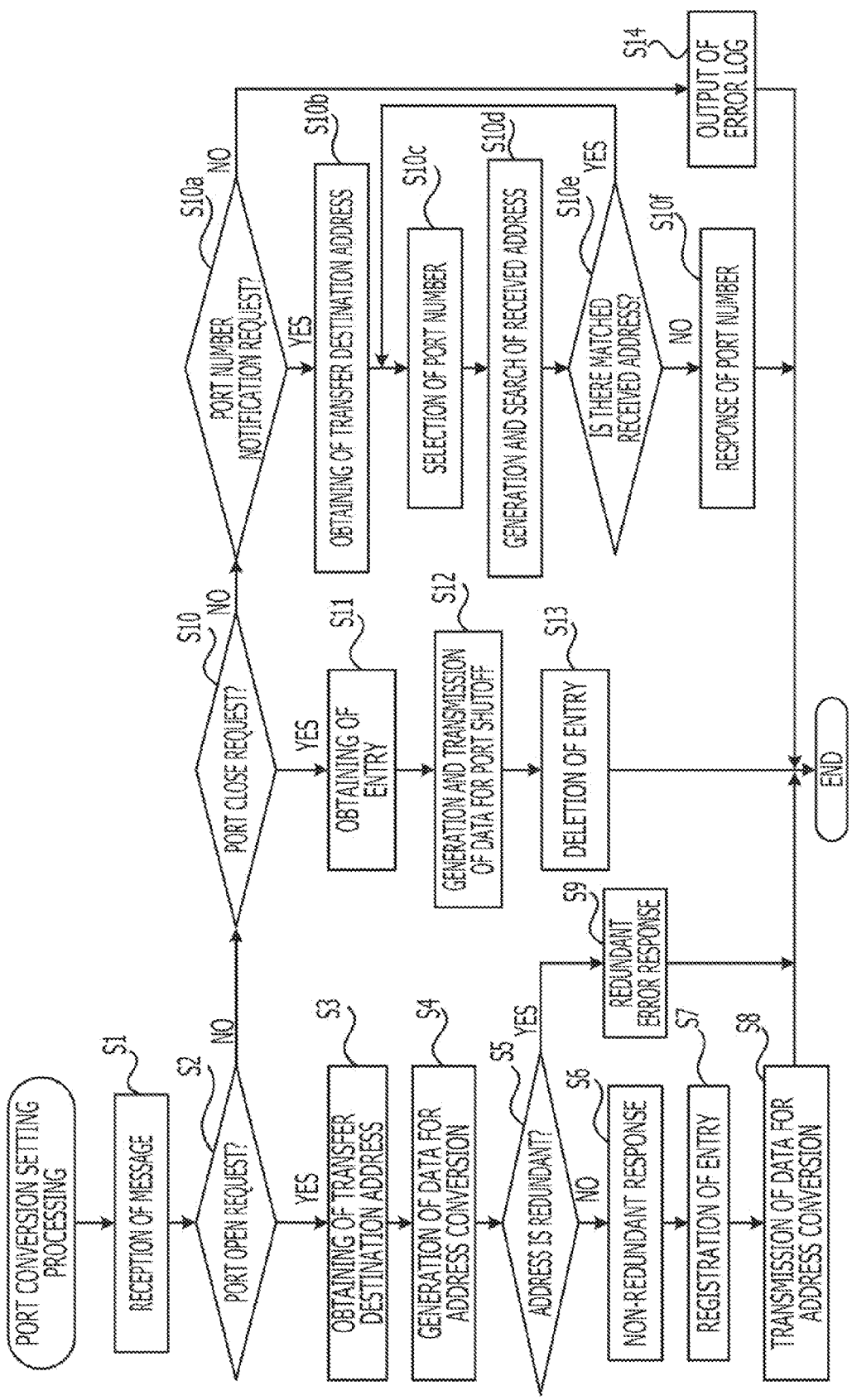
FIG. 20 is a flowchart illustrating port conversion setting processing according to the third embodiment.

FIG. 20 is a flowchart illustrating the port conversion setting processing according to the third embodiment.

[Step S10] The communication data analyzing unit 112 determines whether or not the received message is a port close request. In the event that the received message is a port close request (Yes in step S10), the flow proceeds to step S11. In the event that the received message is not a port close request (No in step S10), the flow proceeds to step S10a.

[Step S10a] The communication data analyzing unit 112 determines whether or not the received message is a port number notification request. In the event that the received message is a port number notification request (Yes in step S10a), the flow proceeds to step S10b. In the event that the received message is not a port number notification request (No in step S10a), the flow proceeds to step S14.

[Step S10b] The port number selecting unit 116 takes the transmission source server name and token type included in the received message as a keyword to search for an entry in the following server setting table 121a matching the keywords. Subsequently, the port number selecting unit 116 obtains the transfer destination address of the matched entry. Subsequently, the flow proceeds to step S10c.

[Step S10c] The port number selecting unit 116 selects a port number at random. Subsequently, the flow proceeds to step S10d. Note that in the event that the port number selecting unit 116 has proceeded from step S10e, the port number selecting unit 116 selects a port number again. How to select a port number in this case is not restricted in particular, so a port number may be selected again randomly, a port number obtained by adding a prescribed value (e.g., 1) to the last selected port number may be selected, or the like.

[Step S10d] The port number selecting unit 116 generates a received address based on the transfer destination address and the selected port number. Subsequently, the port number selecting unit 116 takes the generated received address as a keyword to search for an entry of the port management table 122a matching the keyword.

[Step S10e] The port number selecting unit 116 determines whether or not there is a received address matching the keyword. In the event that there is a received address matching the keyword (Yes in step S10e), the flow proceeds to step S10c. In the event that there is no received address matching the keyword (No in step S10e), the flow proceeds to step S10f.

[Step S10f] The port number selecting unit 116 transmits the port number selected in step S10c to the communication data transmission unit 115. Upon receiving the port number from the port number selecting unit 116, the communication data transmission unit 115 responds to the server of the port number notification request source. Subsequently, the port conversion setting processing is ended.

Next, request token issuing processing according to the third embodiment will be described.

Figure 21:
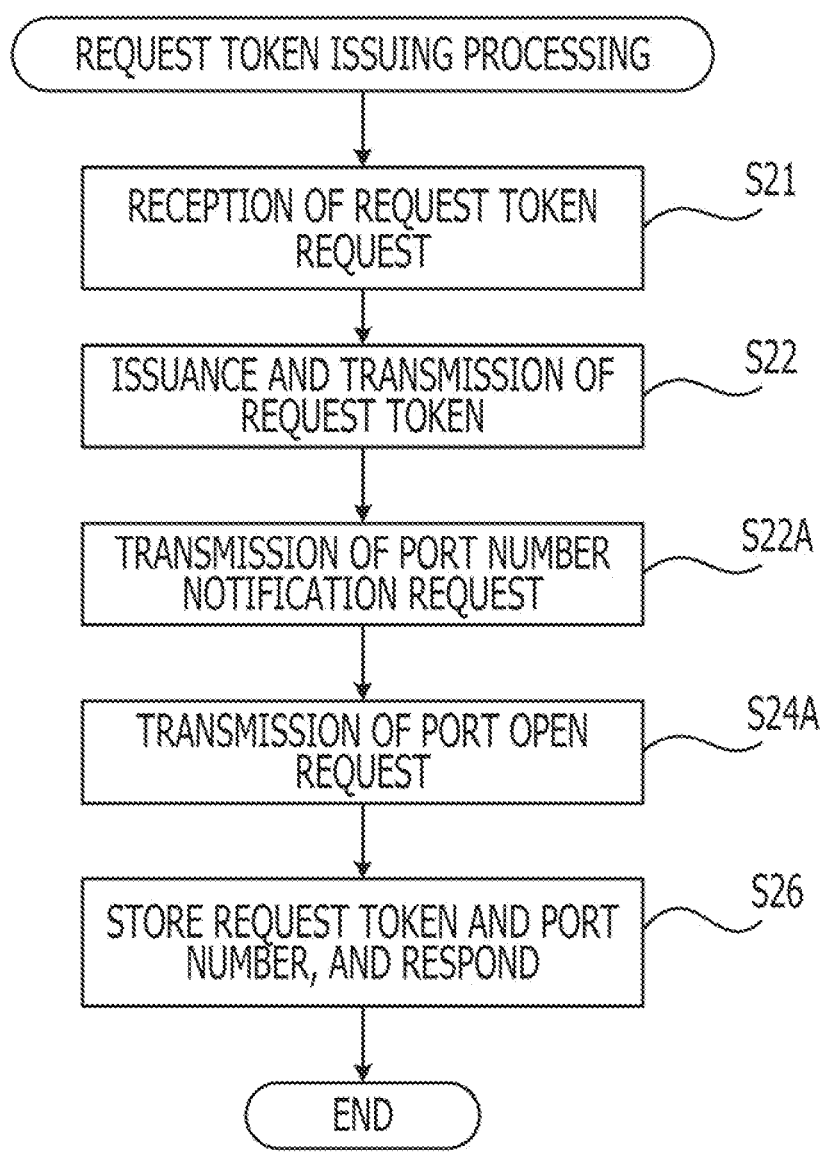
FIG. 21 is a flowchart for describing request token issuing processing according the third embodiment.

FIG. 21 is a flowchart for describing the request token issuing processing according to the third embodiment.

[Step S22] The token server 41 issues a request token, and transmits this to the application 21. Subsequently, the flow proceeds to step S22a.

[Step S22a] The token server 41 transmits a port number notification request to a port conversion setting server 100a. Upon receiving a response from the port conversion setting server 100a, the flow proceeds to step S24a.

[Step S24a] The token server 41 transmits a port open request to the port conversion setting server 100a with the port number included in the response message, the token type and token value of the issued request token, and the transmission source server name of the token server 41 as arguments. Subsequently, the token server 41 awaits a response from the port conversion setting server 100a. Upon receiving a response from the port conversion setting server 100a, the flow proceeds to step S26.

Next, authentication processing of the authentication server 42 according to the third embodiment will be described.

Figure 22:
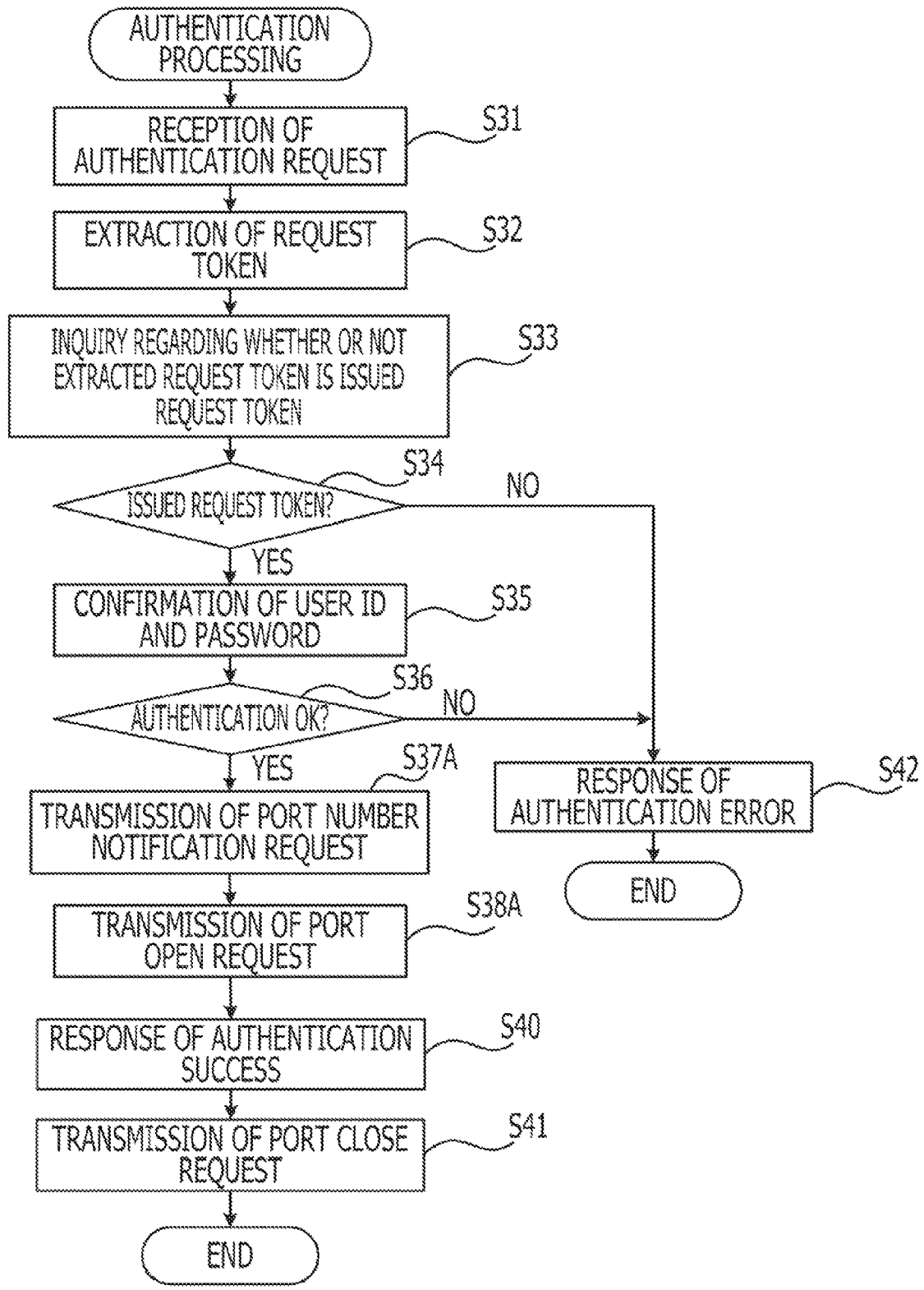
FIG. 22 is a flowchart illustrating authentication processing according to the third embodiment.

FIG. 22 is a flowchart illustrating the authentication processing according to the third embodiment.

[Step S36] As a result of the authentication by the authentication server 42, in the event of the authorized user ID and user password (Yes in step S36), the flow proceeds to step S37a. In the event of the unauthorized user ID and user password (No in step S36), the flow proceeds to step S42.

[Step S37a] The authentication server 42 transmits a port number notification request to the port conversion setting server 100. Subsequently, upon receiving a response from the port conversion setting server 100a, the flow proceeds to step S38a.

[Step S38a] The authentication server 42 transmits a port open request to the port conversion setting server 100a with the port number included in the response message, the token type and token value of the request token, and the transmission source server name of the authentication server 42 as arguments. Subsequently, the authentication server 42 awaits a response from the port conversion setting server 100a. Upon receiving a response from the port conversion setting server 100a, the flow proceeds to step S40.

Next, access token issuing processing according to the third embodiment will be described.

Figure 23:
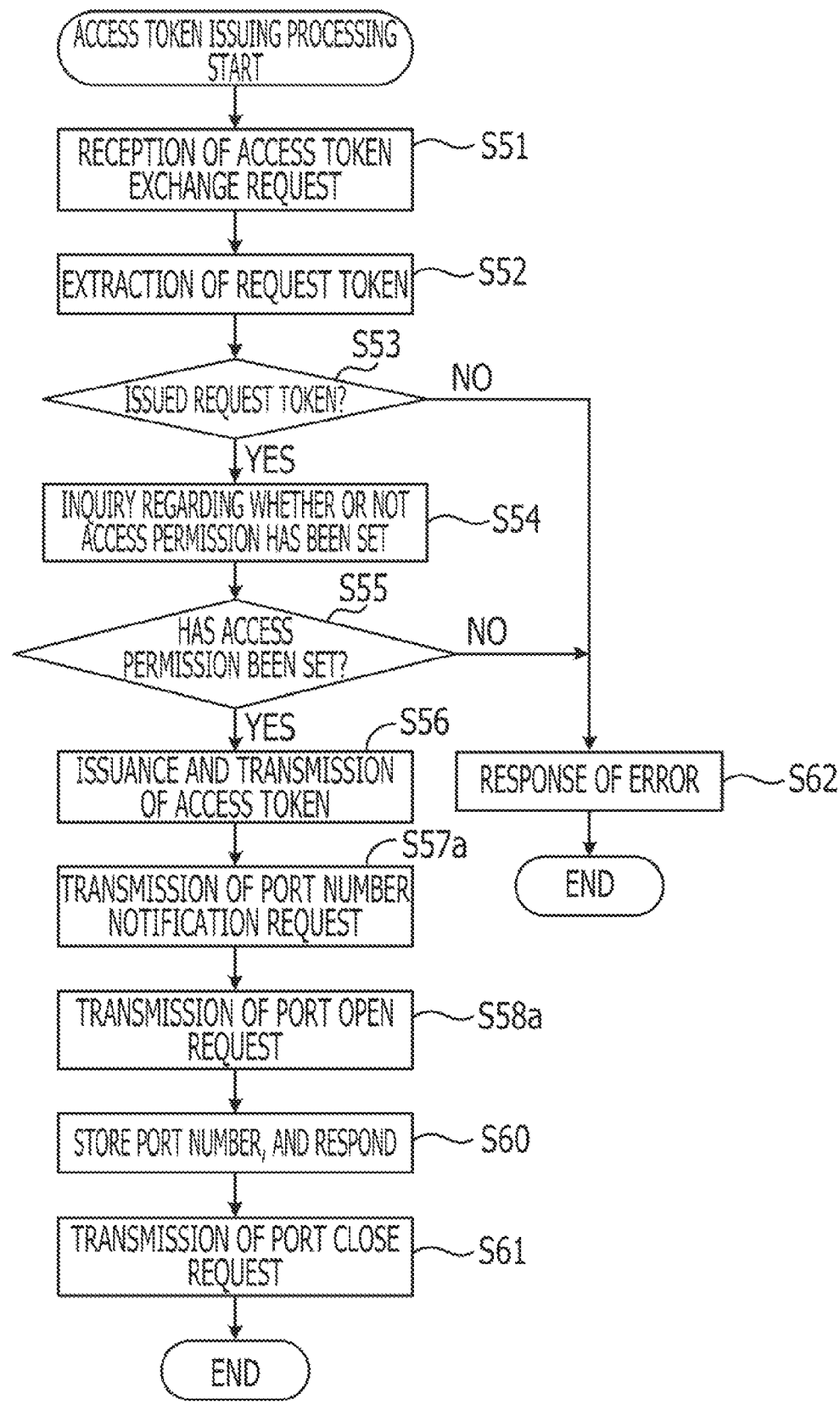
FIG. 23 is a flowchart illustrating access token issuing processing according to the third embodiment.

FIG. 23 is a flowchart illustrating the access token issuing processing according to the third embodiment.

[Step S56] The token server 41 issues an access token, and transmits this to the client device 10. Subsequently, the flow proceeds to step S57a.

[Step S57a] The token server 41 transmits a port number notification request to the port conversion setting server 100a. Subsequently, upon receiving a response from the port conversion setting server 100a, the flow proceeds to step S58a.

[Step S58a] The token server 41 transmits a port open request to the port conversion setting server 100a with the port number included in the response message, the token type and token value of the access token, and the transmission source server name of the token server 41 as arguments. Subsequently, the token server 41 awaits a response from the port conversion setting server 100a. Upon receiving a response from the port conversion setting server 100a, the flow proceeds to step S60.

Next, a specific example of the entire processing of the system according to the third embodiment will be described.

Hereafter, description will primarily be made regarding different portions as to the second embodiment, and description will be omitted regarding similar portions.

[Sequence Seq2] The application 21 which has received a service request from the client device 10 transmits a request token request to the token server 41.

The token server 41 which has received the request token request issues a request token of the token value "RT001", and transmits this to the application 21.

Next, the token server 41 requests a port number from the port conversion setting server 100a with the token type "RT" and transmission source server name "token server" as arguments.

The port conversion setting server 100a which has received the port number notification request searches the following server setting table 121a with the token type "RT", and transmission source sever name "token server" as keywords, and obtains the transfer destination address "10.25.20.1:10".

Next, the port conversion setting server 100a selects a port number at random. With the present specific example, the port number "20001" is selected. The port conversion setting server 100a generates a received address "10.25.20.1:20001" from the transfer destination address and port number. Subsequently, the port conversion setting server 100a references the port management table 122a to confirm whether or not there is a received address matching the generated received address. In the event that there is no matched received address, the port conversion setting server 100a responds the selected port number "20001".

The token server 41 which has received the response transmits a port open request to the port conversion setting server 100a with the token type "RT", token value "RT001", port number "20001", and transmission source server name "token server" as arguments, and awaits a response.

Hereafter, the processing is the same as with the system 1000 according to the second embodiment other than processing for the authentication server 42 and token server 41 transmitting a port number notification request to the port conversion setting server 100a.

With the system according to the third embodiment, the same advantages as with the system 1000 according to the second embodiment are obtained.

Subsequently, with the system according to the third embodiment, the port conversion setting server 100a is configured to determine a port number, which eliminates, with the request token issuing processing, authentication processing, and access token issuing processing, the necessity for processing at the time of a port number being redundant, and accordingly, simplification of the processing may further be realized.

Fourth Embodiment

Next, a system according to a fourth embodiment will be described.

Hereafter, with regard to the system according to the fourth embodiment, description will primarily be made regarding different points as to the above system according to the third embodiment, and description of items which are the same or equivalent will be omitted.

Figure 24:
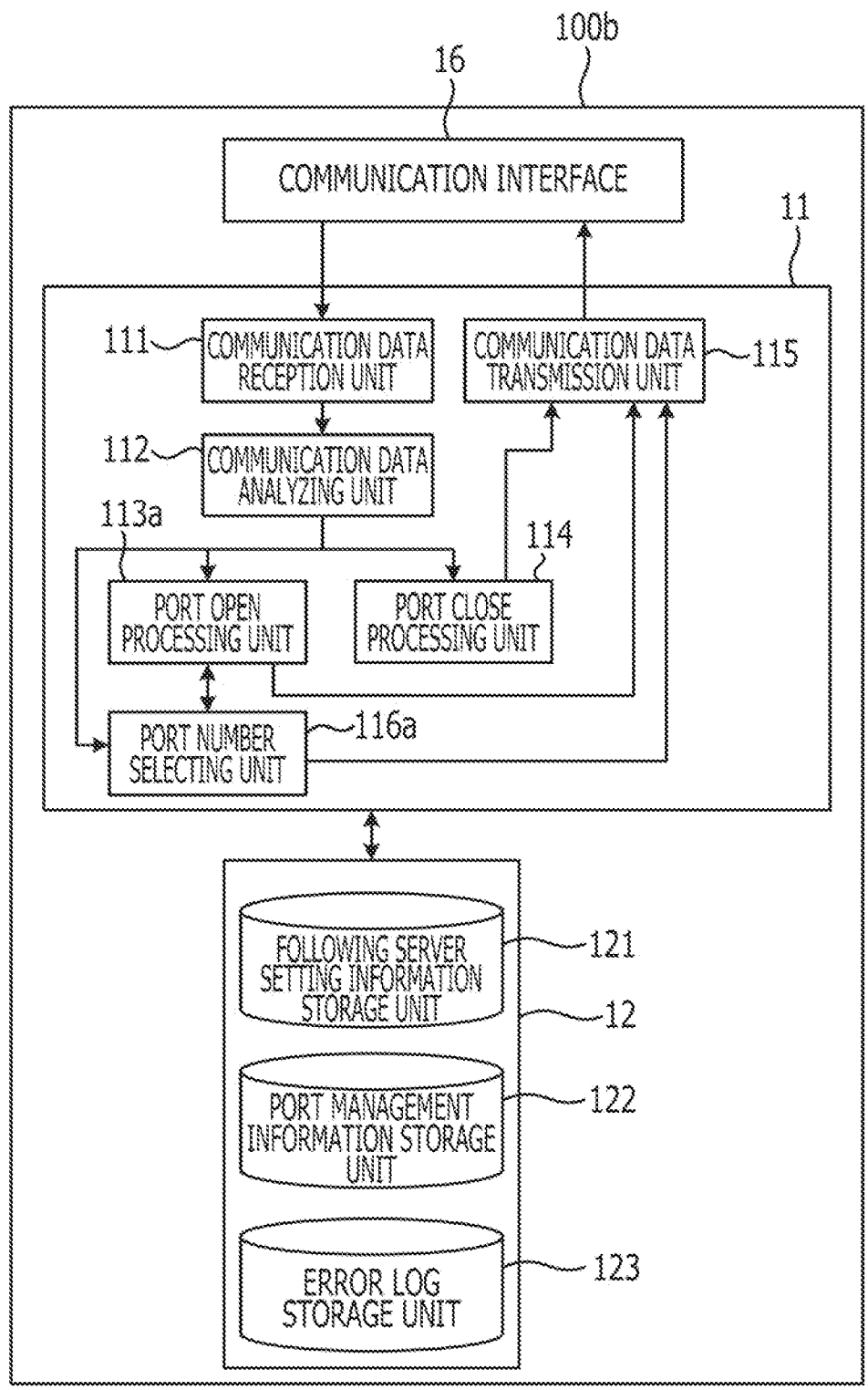
FIG. 24 is a block diagram illustrating the function of a port conversion setting server according to a fourth embodiment.

FIG. 24 is a block diagram illustrating the functions of a port conversion setting server according to the fourth embodiment.

The system according to the fourth embodiment differs from the system according to the third embodiment in that when a port conversion setting server 100b receives a port number notification request from each server, a port number to be opened in the following sequence is selected and opened beforehand.

This port number notification request is transmitted to the port conversion setting server 100b by the token server 41 at the time of the request token issuing processing. Subsequently, at the time of authentication processing and access token issuing processing, a port has already been opened, so processing for inquiring the opened port number is performed.

When complementing description, the authentication server 42 and token server 41 transmit no port open request to the port conversion setting server 100b at the time of authentication processing and access token issuing processing.

The port conversion setting server 100b includes a port open processing unit 113a and a port number selecting unit 116a.

Upon receiving a request for port open processing, the port open processing unit 113a according to the present embodiment searches the entries of the following server setting table 121a. Subsequently, the port open processing unit 113a obtains the transfer destination addresses of all of matched entries.

Also, the port open processing unit 113a requests selection of a port number from the port number selecting unit 116a. Subsequently, the port open processing unit 113a generates a received address based on the selected port number and obtained transfer destination address. Subsequently, the port open processing unit 113a generates data for address conversion including the obtained transfer destination address and generated received address.

Also, the port open processing unit 113a stores the received addresses and transfer destination addresses included in all of the generated data for address conversion in the port management table 122a in a manner correlated with the received token.

Further, the port open processing unit 113a responds to the token server 41 with the port number. Specifically, the port open processing unit 113a searches for a matched entry of the following server setting table 121a with the token type and transmission source server name included in the port open request as keywords. Subsequently, the port open processing unit 113a obtains the transfer destination address of a matched entry. Next, the port open processing unit 113a references the port management table 122a to respond the token server 41 with the port number of the received address as to the transfer destination address.

Upon receiving a request for port number selection processing from the port open processing unit 113a, the port number selecting unit 116a selects a port number at random. Subsequently, the port number selecting unit 116a informs the port open processing unit 113a of the selected port number.

Also, upon receiving a request for port number selection processing from the communication data analyzing unit 112, the port number selecting unit 116a takes the transmission source server name and token type included in the received message as keywords to search for the entry of the following server setting table 121a matching the keywords. Subsequently, the port number selecting unit 116a obtains the transfer destination address of a matched entry. Subsequently, the port number selecting unit 116a searches for an entry of the port management table 122a with the obtained transfer destination address as a keyword. Subsequently, the port number selecting unit 116a transmits the port number of the received address of a matched entry to the communication data transmission unit 115.

Upon receiving a port number from the port number selecting unit 116a, the communication data transmission unit 115 transmits this to the server of the port number notification request source.

Figure 25:
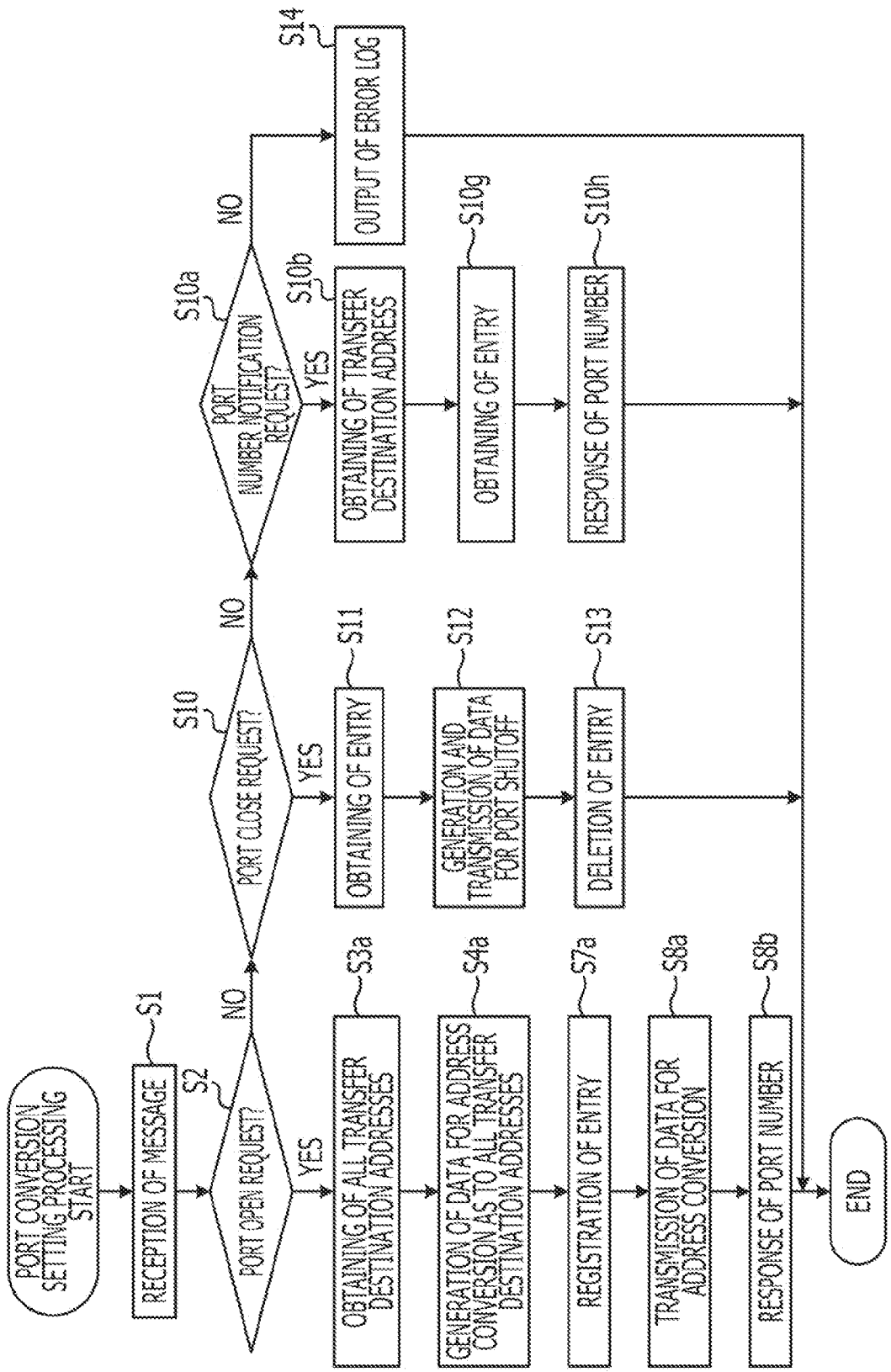
FIG. 25 is a flowchart illustrating port conversion setting processing according to the fourth embodiment.

FIG. 25 is a flowchart illustrating port conversion setting processing according to the fourth embodiment.

With the port conversion setting processing according to the fourth embodiment, processing at the time of receiving a port open request, and processing at the time of receiving a port number notification request differ. Hereafter, description will be made in order.

[Step S2] The communication data analyzing unit 112 determines whether or not the received message is a port open request. In the event that the received message is a port open request (Yes in step S2), the flow proceeds to step S3a. In the event that the received message is not a port open request (No in step S2), the flow proceeds to step S10.

[Step S3a] The port open processing unit 113a searches for the entries of the following server setting table 121a. Subsequently, the port open processing unit 113a obtains the transfer destination addresses of all of matched entries. Subsequently, the flow proceeds to step S4a.

[Step S4a] The port open processing unit 113a generates data for address conversion as to all of the obtained transfer destination addresses. Subsequently, the flow proceeds to step S7a.

[Step S7a] The port open processing unit 113a stores the received addresses and transfer destination addresses included in all of the data for address conversion generated in step S4a in the port management table 122a in a manner correlated with the received token. Subsequently, the flow proceeds to step S8a.

[Step S8a] The port open processing unit 113a transmits all of the data for address conversion to the DoS countermeasure device 30 via the communication data transmission unit 115. Thus, the DoS countermeasure device 30 opens the ports of the received addresses included in all of the notified data for address conversion. Subsequently, the flow proceeds to step S8b.

[Step S8b] The port open processing unit 113a responds to the token server 41 with the port number. Subsequently, the port conversion setting processing is ended.

Next, processing at the time of receiving a port number notification request will be described.

[Step S10b] The port number selecting unit 116a searches the following server setting table 121a with the transmission source server name and token type included in the received message as keywords, and obtains a transfer destination address. Subsequently, the flow proceeds to step S10g.

[Step S10g] The port number selecting unit 116a searches the port management table 122a with the token and transfer destination address included in the message as keywords. Subsequently, the port number selecting unit 116a obtains an entry matching the keywords. Subsequently, the flow proceeds to step S10h.

[Step S10h] The port number selecting unit 116a transmits the port number set to the received address field of the obtained entry to the communication data transmission unit 115. Upon receiving the port number from the port number selecting unit 116a, the communication data transmission unit 115 responds to the server of the port number notification request source. Subsequently, the port conversion setting processing is ended.

Next, request token issuing processing according to the fourth embodiment will be described.

Figure 26:
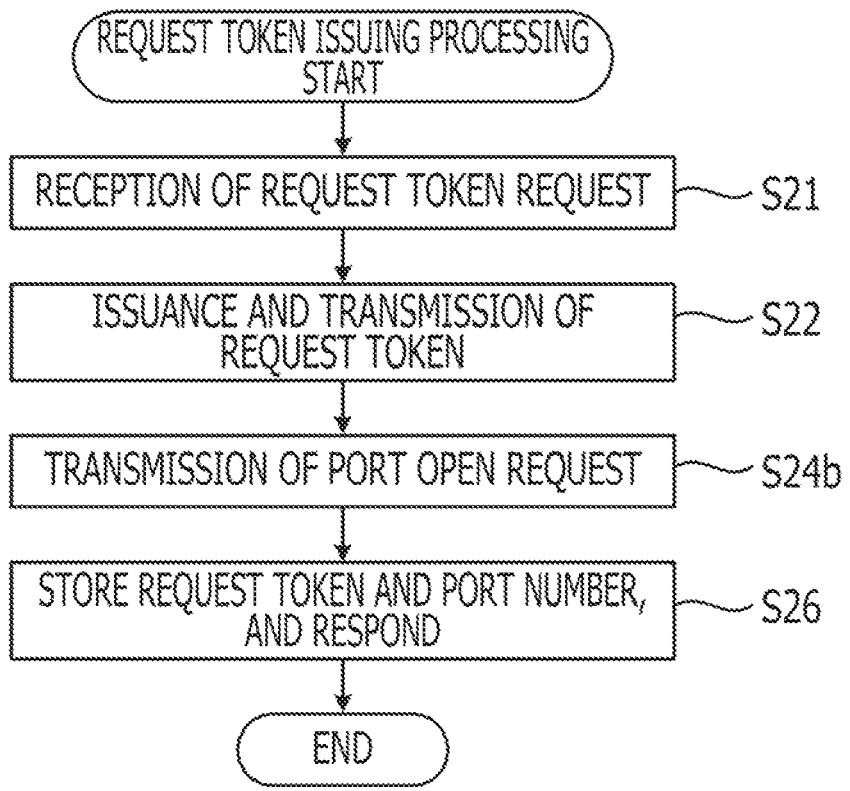
FIG. 26 is a flowchart for describing request token issuing processing according the fourth embodiment.

FIG. 26 is a flowchart for describing the request token issuing processing according to the fourth embodiment.

[Step S22] The token server 41 issues a request token, and transmits this to the application 21. Subsequently, the flow proceeds to step S24b.

[Step S24b] The token server 41 transmits a port open request to the port conversion setting server 100b with the token type, token value, and transmission source server name as arguments. Subsequently, the token server 41 awaits a response from the port conversion setting server 100b. Upon receiving a response from the port conversion setting server 100b, the flow proceeds to step S26.

In this way, with the present embodiment, the port number is selected in the port open processing, and accordingly, a port number notification request may be omitted in the request token issuing processing.

Next, authentication processing of the authentication server 42 according to the fourth embodiment will be described.

Figure 27:
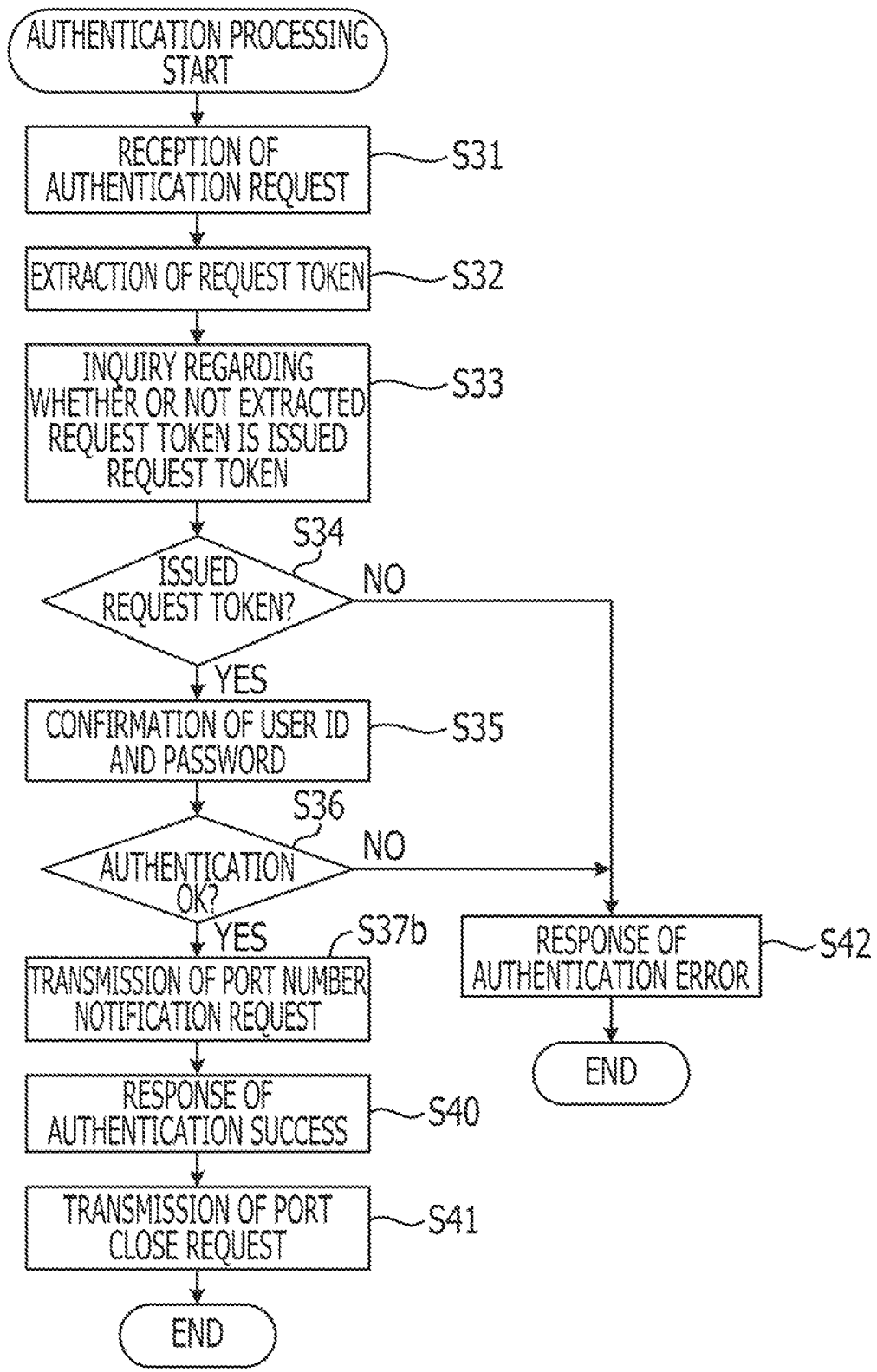
FIG. 27 is a flowchart illustrating authentication processing according to the fourth embodiment.

FIG. 27 is a flowchart illustrating the authentication processing according to the fourth embodiment.

[Step S36] As an authentication result by the authentication server 42, in the event that the user ID and user password is an authorized user ID and user password (Yes in step S36), the flow proceeds to step S37b. In the event that the user ID and user password is an unauthorized user ID and user password (No in step S36), the flow proceeds to step S42.

[Step S37b] The authentication server 42 transmits a port number notification request to the port conversion setting server 100a with the token type, token value, and transmission source server name as arguments. Subsequently, upon receiving a response from the port conversion setting server 100b, the flow proceeds to step S40.

In this way, with the present embodiment, the port has already been opened, so a port open request may be omitted in the authentication processing.

Next, access token issuing processing according to the fourth embodiment will be described.

Figure 28:
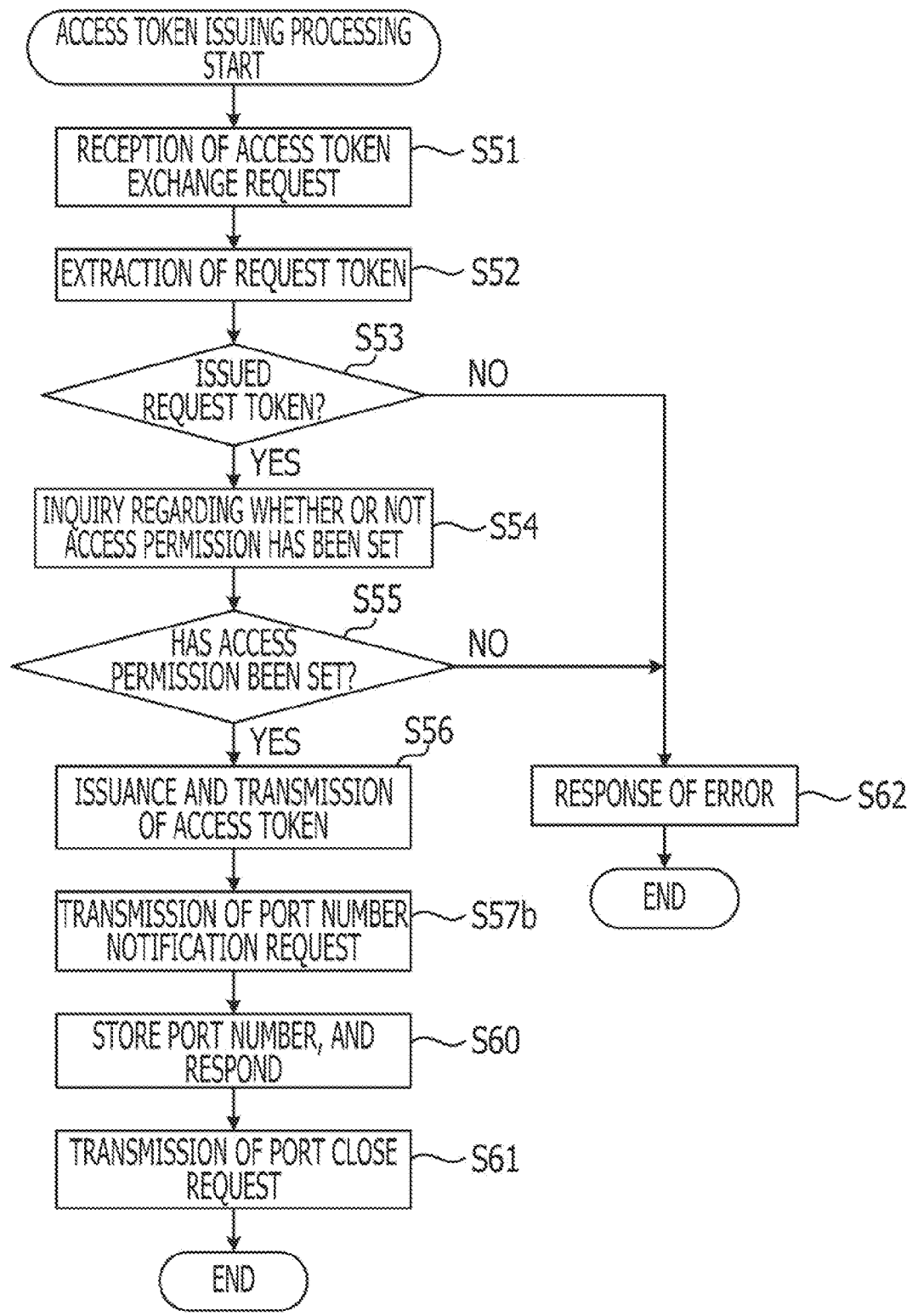
FIG. 28 is a flowchart illustrating access token issuing processing according to the fourth embodiment.

FIG. 28 is a flowchart illustrating the access token issuing processing according to the fourth embodiment.

[Step S56] The token server 41 issues an access token, and transmits this to the client device 10. Subsequently, the flow proceeds to step S57b.

[Step S57b] The token server 41 transmits a port number notification request to the port conversion setting server 100b with the token type, token value, and transmission source server name as arguments. Subsequently, upon receiving a response from the port conversion setting server 100b, the flow proceeds to step S60.

In this way, with the present embodiment, the port has already been opened, so a port open request may be omitted in the access token issuing processing.

Next, a specific example of the entire processing of the system according to the fourth embodiment will be described.

Hereafter, the same sequence as the sequence described in FIG. 3 is denoted with the same sequence number.

[Sequence Seq1] The client device 10 transmits a service request to the application 21.

[Sequence Seq2] The application 21 which has received the service request from the client device 10 transmits a request token request to the token server 41.

The token server 41 which has received the request token request issues a request token of the token value "RT001", and transmits this to the application 21.

Next, the token server 41 transmits a port open request to the port conversion setting server 100a with the token type "RT", token value "RT001", and transmission source server name "token server" as arguments, and awaits a response.

The port conversion setting server 100b which has received the port open request searches the following server setting table 121a to obtain all of the transfer destination addresses "10.25.20.1:10", "10.25.20.2:20", and "10.25.20.3:30" stored in the following server setting table.

Next, the port conversion setting server 100b selects a port number at random, and generates data for address conversion corresponding to a transfer destination address.

With the present specific example, the port conversion setting server 100b selects the port numbers "20001, 20021, 20011". Subsequently, the port conversion setting server 100b generates (1) received address "10.25.10.1:20001", transfer destination address "10.25.10.1:10", (2) received address "10.25.20.2:20021", transfer destination address "10.25.20.2:20", and (3) received address "10.25.20.3:20011", transfer destination address "10.25.20.3:30". Subsequently, the port conversion setting server 100b generates data for address conversion including the above (1), data for address conversion including the above (2), and data for address conversion including the above (3).

Subsequently, the port conversion setting server 100b transmits the generated data for address conversion to the DoS countermeasure device 30. Thus, the DoS countermeasure device 30 opens the ports of the port numbers of the received addresses. Also, the DoS countermeasure device 30 stores each combination between the received address and the transfer destination address of the above (1), (2), and (3) in the address conversion table 30a.

Also, the port conversion setting server 100b registers entries which correlate the above (1) through (3) with the token value "RT001" on the port management table 122a.

FIG. 29 is a diagram illustrating the port management table of a specific example according to the fourth embodiment.

Further, the port conversion setting server 100b responds to the token server 41 with the selected port number. The port number to respond at this time is selected as follows.

First, the token type "RT", and transmission source server name "token server" are taken as keywords to search for entries of the following server setting table 121a matching the keywords. Subsequently, the transfer destination address "10.25.20.1:10" of the matching entry is obtained.

Next, the port conversion setting server 100b references the port management table 122a illustrated in FIG. 29 to obtain the port number "20001" of the received address corresponding to the transfer destination address "10.25.20.1:10". The port conversion setting server 100b selects the obtained port number as the port number to respond to the token server 41.

[Sequence Seq3] The token server 41 which has obtained the response stores the token value "RT001" and port number "20001" of the request token in a response message, and responds to the application 21 with the response message.

[Sequence Seq4] The application 21 which has received the response transmits a permission request to the client device 10 with the token value "RT001" and port number "20001" of the received request token as keywords.

[Sequence Seq5] The client device 10 transmits a packet in which the token value "RT001", user ID, and user password of the received request token are stored to the address "10.25.20.1:20001" of the specified port number "20001" for the sake of setting access permission.

The DoS countermeasure device 30 which has received this data at the port number "20001" references the address conversion table 30a. Subsequently, the DoS countermeasure device 30 converts the destination address "10.25.20.1:20001" of the received packet into the transfer destination address "10.25.20.1:10" stored in a correlated manner, and transfers this. As a result thereof, the packet is received at the authentication server 42.

The authentication server 42 extracts the token value "RT001" of the request token from the received packet, and inquires of the token server 41 whether or not the received request token is the request token issued by the token server 41. With the present specific example, the received request token is the request token issued by the token server 41 in sequence Seq2, so the sequence proceeds to the next.

Next, the authentication server 42 performs authentication of the user ID and user password. With the present specific example, the user is an authorized user, so the authentication server 42 transmits a port number notification request to the port conversion setting server 100b with the token value "RT001", token type "RT", and transmission source server name "authentication server" as arguments.

The port conversion setting server 100b which has received the port number notification request takes the transmission source server name "authentication server" and token type "RT" as keywords and searches for an entry of the following server setting table 121a with matching the keywords. Subsequently, the port conversion setting server 100b obtains a matched transfer destination address "10.25.20.3:30".

Next, the port conversion setting server 100b takes the token value "RT001" and the transfer destination address "10.25.20.3:30" as keywords to search for entries of the port management table 122a illustrated in FIG. 28 matching the keywords. Subsequently, the port conversion setting server 100b responds the port number "20011" of the received address of the matched entry of the third row.

[Sequence Seq6] The authentication server 42 which has obtained the response responds to the client device 10 with authentication success that is a response message storing the token value "RT001" and port number "20011" of the request token.

After the response to the client device 10, the authentication server 42 transmits a port close request to the port conversion setting server 100b with the token value "RT001" and transmission source address "10.25.20.1:10" as arguments.

The port conversion setting server 100b which has received the port close request takes the token value "RT001" and the transmission source address "10.25.20.1:10" as keywords to search for entries of the port management table 122a illustrated in FIG. 29 matching the keywords. Subsequently, the port conversion setting server 100b obtains the matched entry of the first row.

Subsequently, the port conversion setting server 100b generates data for port shutoff having the received address "10.25.20.1:20001". Subsequently, the port conversion setting server 100b transmits the generated data for port shutoff to the DoS countermeasure device 30. Thus, the DoS countermeasure device 30 shuts off the port P1 of the port number "20001".

[Sequence Seq7] The client device 10 which has received the authentication success responds to the application 21 of permission completion with the token value "RT001" and port number "20011" as arguments.

[Sequence Seq8] The application 21 which has received the response transmits an access token exchange request storing the token value "RT001" to the address "10.25.20.3:20011" of the received packet.

The DoS countermeasure device 30 which has received the access token exchange request at the port number "20011" references the address conversion table 30a. Subsequently, the DoS countermeasure device 30 converts the destination address "10.25.20.3:20011" of the received packet into the transfer destination address "10.25.20.3:30" stored in a correlated manner, and transfers this. As a result thereof, the packet is received at the token server 41.

The token server 41 which has received the access token exchange request extracts the token value "RT001" of the request from the request message to determine whether or not the received request token is the request token issued by the token server 41. With the present specific example, the received request token is the request token issued by the token server 41 in the sequence Seq2, so the sequence proceeds to the next.

[Sequence Seq9] The token server 41 inquires of the authentication server 42 whether or not the received request token has been authenticated. With the present specific example, the received request token has been authenticated, so the sequence proceeds to the next.

Next, the token server 41 issues the access token of the token value "AT001", and transmits this to the client device 10. Subsequently, the token server 41 transmits a port number notification request to the port conversion setting server 100b with the token type "AT", token value "RT001", and transmission source server name "token server" as arguments, and awaits a response.

The port conversion setting server 100b which has received the port number notification request searches the following server setting table 121a with the transmission source server name "token server" and token type "AT" as keywords, and obtains the transfer destination address "10.25.20.2:20".

Next, the port conversion setting server 100b takes the token value "RT001" and transfer destination address "10.25.20.2:20" as keywords to search for an entry in the port management table 122a illustrated in FIG. 28 matching the keywords. Subsequently, the port conversion setting server 100b responds the port number "20021" of the received address of the matched entry of the second row.

[Sequence Seq10] The token server 41 which has obtained the response stores the access token of the token value "AT001", and the port number "20021" in a response message, and responds to the client device 10 with the response message.

After the response to the client device 10, the token server 41 transmits a port close request to the port conversion setting server 100b with the token value "RT001" and the transmission source address "10.25.20.3:30" as arguments.

The port conversion setting server 100b which has received the port close request takes the token value "RT001" and transmission source address "10.25.20.3:30" as keywords to search for an entry in the port management table 122a illustrated in FIG. 28 matching the keywords. Subsequently, the port conversion setting server 100b obtains the matched entry of the third row.

The port conversion setting server 100b generates data for port shutoff having the received address "10.25.20.3:20011".

Subsequently, the port conversion setting server 100b transmits this data for port shutoff to the DoS countermeasure device 30. Thus, the DoS countermeasure device 30 shuts off the port P2 of the port number "20011".

[Sequence Seq11] The application 21 which has obtained the access token of the token value "AT001" transmits a service request to the address "10.25.20.2:20021" of the specified port number "20021".

The DoS countermeasure device 30 which has received the service request at the port number "20021" references the address conversion table 30a. Subsequently, the DoS countermeasure device 30 converts the address "10.25.20.2:20021" of the received packet into the transfer destination address "10.25.20.2:20" stored in a correlated manner, and transfers this. As a result thereof, the packet is received at the service server 43.

[Sequence Seq12] The service server 43 extracts the access token from the service request. Subsequently, the service server 43 inquires of the token server 41 whether or not the extracted access token is the access token issued by the token server 41. With the present specific example, the extracted access token is the access token issued by the token server 41 in the sequence Seq9a, so the sequence proceeds to the next.

[Sequence Seq13] The service server 43 performs service processing corresponding to the service request, and responds to the application 21 with the service results.

[Sequence Seq14] The application 21 performs proceeding according to need, and responds to the client device 10 with the processing results.

With the system according to the present fourth embodiment, the same advantages as with the third embodiment are obtained.

Subsequently, with the system according to the present fourth embodiment, further, time necessary for selection of a port number and setting of a port may be reduced.

Fifth Embodiment

Next, a system according to a fifth embodiment will be described.

Hereafter, with regard to the system according to the fifth embodiment, description will primarily be made regarding different points as to the above system according to the second embodiment, and description of items which are the same or equivalent will be omitted.

Figure 30:
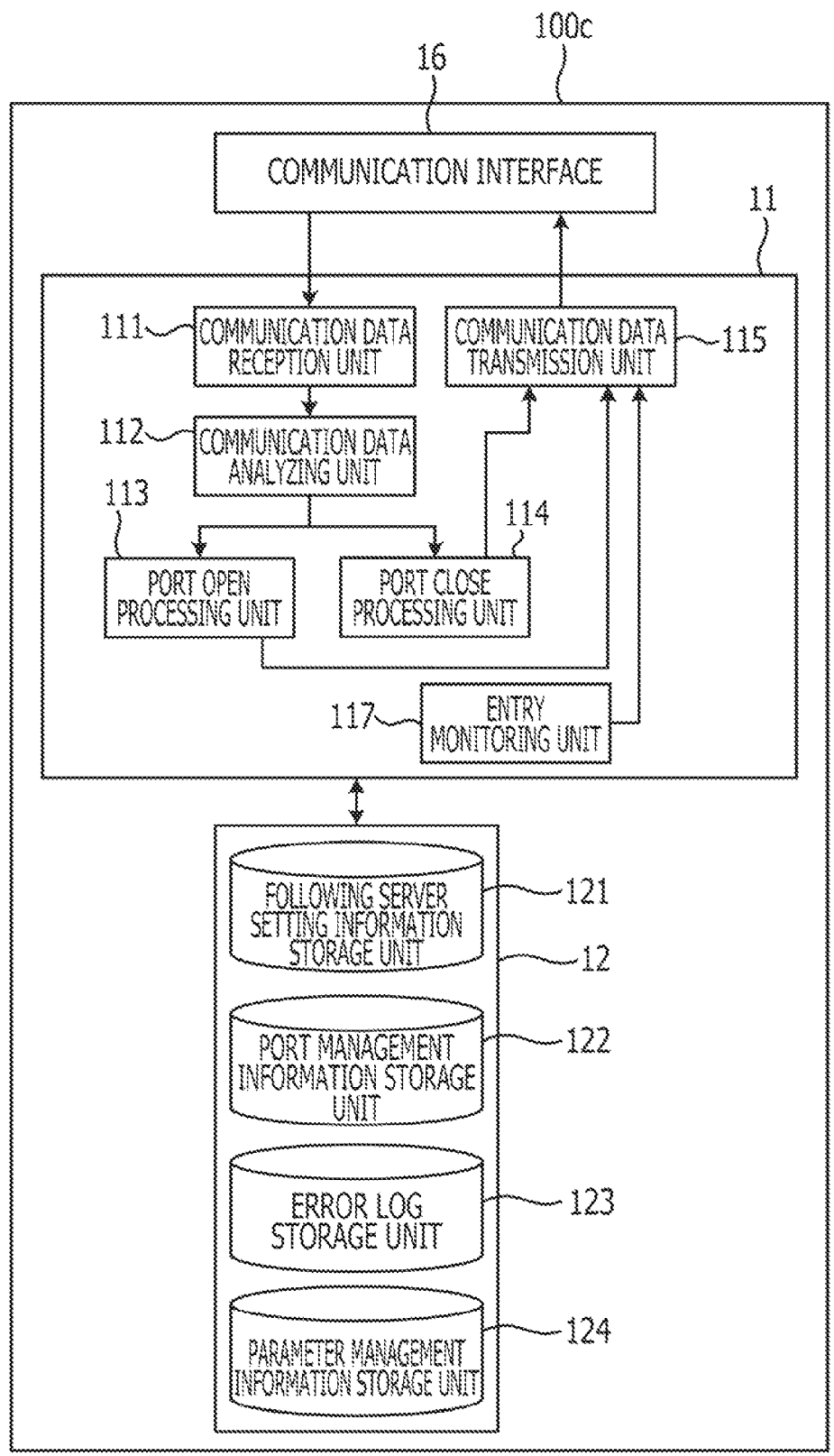
FIG. 30 is a block diagram illustrating the function of a port conversion setting server according to a fifth embodiment.

FIG. 30 is a block diagram illustrating the functions of a port conversion setting server according to the fifth embodiment.

The system according to the fifth embodiment has a function for shutting off a port in the event that after reception of a port open request, a port conversion setting server 100c has not received a port close request regarding this token even after a certain period of time.

The CPU 11 of the port conversion setting server 100c according to the fifth embodiment further includes an entry monitoring unit 117. Also, the storage unit 12 further includes a parameter management information storage unit 124.

FIG. 31 is a diagram illustrating a data structure example of a port management table according to the fifth embodiment.

With a port management table 122b, as compared to the port management table 122a, a registered point-in-time field is further provided. The point in time when this entry was registered in the port management table 122b is set to this registered point-in-time field, for example, in increments of seconds.

Description will return to FIG. 30 again.

The entry monitoring unit 117 monitors the port management table 122b in increments of entries. In the event that there is an entry which has not been deleted even after elapse of prescribed deletion time, the entry monitoring unit 117 generates data for port shutoff including the received address included in this entry. The entry monitoring unit 117 transmits the generated data for address conversion to the communication data transmission unit 115.

It is desirable for this entry monitoring unit 117 to operate in parallel with processing for receiving a port open request/port close request after activation of the port conversion setting server 100c. For example, the entry monitoring unit 117 may operate as a separate thread or separate process.

Time for determining an interval for the entry monitoring unit 117 monitoring reception of a port close request is set and stored beforehand in the parameter management information storage unit 124.

FIG. 32 is a diagram illustrating a data structure example of a parameter management table according to the fifth embodiment.

With a parameter management table 124a, the fields of a parameter and a value are provided. The pieces of information arrayed in the horizontal direction are mutually correlated.

An item to be managed as a parameter is set to a parameter field. In FIG. 32, deletion time and a table monitoring interval are set.

The deletion time is an item for managing time for deleting an entry of the port management table 122b which has not received a port close request within prescribed time.

The table monitoring interval is an item for managing the interval of time for monitoring the port management table 122b.

Time to execute an item set to a parameter field is set to a value field. In FIG. 32, 120 seconds that is time to delete an entry from the port management table 122b is set. Also, in FIG. 32, 60 seconds that is a time interval to monitor the port management table 122b is set.

That is to say, the parameter management table 124a illustrated in FIG. 32 indicates that the entry monitoring unit 117 monitors the port management table 122b with a 60-second interval. Subsequently, the parameter management table 124a indicates that in the event that the communication data reception unit 111 has not received a port close request for 120 seconds since an entry was registered, this entry is deleted.

Figure 33:
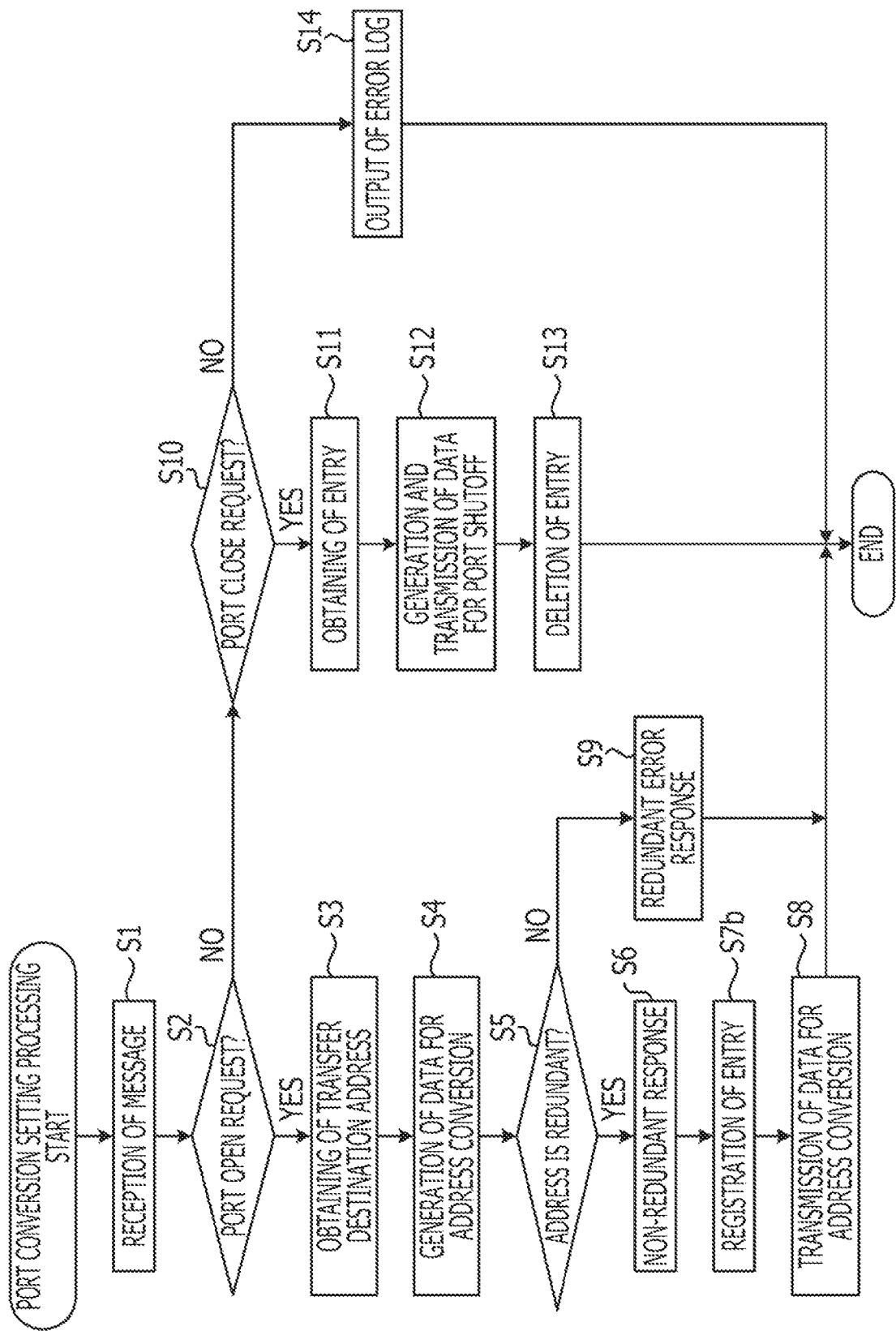
FIG. 33 is a flowchart illustrating port conversion setting processing according to the fifth embodiment.

FIG. 33 is a flowchart illustrating port conversion setting processing according to the fifth embodiment.

[Step S6] The port open processing unit 113 responds to the server which has transmitted a port open request with a message to the effect that the address is non-redundant. Subsequently, the flow proceeds to step S7b.

[Step S7b] The port open processing unit 113 stores the received address and transfer destination address included in the data for address conversion generated in step S4 in the port management table 122b in a manner correlated with the received token. At this time, the port open processing unit 113 sets the data for address conversion to the point-in-time registered in the port management table 122b in a registered point-in-time field. Subsequently, the flow proceeds to step S8.

Next, the processing of the entry monitoring unit 117 (entry monitoring processing) will be described.

Figure 34:
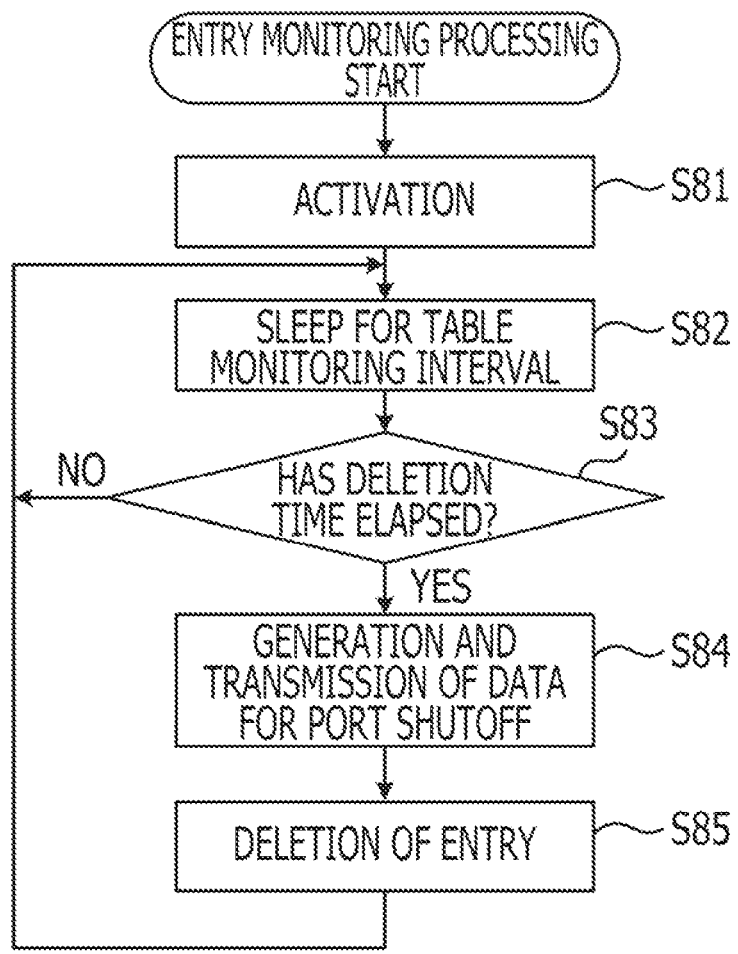
FIG. 34 is a flowchart illustrating entry monitoring processing.

FIG. 34 is a flowchart illustrating the entry monitoring processing.

[Step S81] Upon the port conversion setting server 100c being activated, the flow proceeds to step S82.

[Step S82] The entry monitoring unit 117 references the parameter management table 124a to sleep (stand by) as much as the time set to the value field of the table monitoring interval. Upon sleep time elapsing, the flow proceeds to step S83.

[Step S83] The entry monitoring unit 117 determines whether or not deletion time has elapsed for each entry. Specifically, the entry monitoring unit 117 determines whether or not time obtained by subtracting the registered point-in-time of the port management table 122b from the current point-in-time is greater than the time set to the value field of the deletion time of the parameter management table 124a. In the event that there is an entry with the time obtained by subtracting the registered point-in-time of the port management table 122b from the current point-in-time being greater than the time set to the value field of the deletion time of the parameter management table 124a (Yes in step S83), the flow proceeds to step S84. In the event that there is no entry with the time obtained by subtracting the registered point-in-time of the port management table 122b from the current point-in-time being greater than the time set to the value field of the deletion time of the parameter management table 124a (No in step S83), the flow proceeds to step S82.

[Step S84] The entry monitoring unit 117 generates data for port shutoff including the received address included in this entry. Subsequently, the entry monitoring unit 117 transmits the generated data for port shutoff to the DoS countermeasure device 30 via the communication data transmission unit 115. Subsequently, the flow proceeds to step S85.

[Step S85] The entry monitoring unit 117 deletes this entry from the port management table 122a. Subsequently, the flow proceeds to step S82.

Next, a specific example of the processing of the system according to the fifth embodiment will be described.

Note that, with the present specific example, description will primarily be made regarding different portions as to the port conversion setting processing according to the second embodiment, and description will be omitted regarding similar portions.

[Sequence Seq1] First, the client device 10 transmits a service request to the application 21.

[Sequence Seq2] The application 21 which has received the service request from the client device 10 transmits a request token request to the token server 41.

The token server 41 which has received the request token request issues a request token of the token value "RT001", and transmits this to the application 21. Subsequently, the token server 41 selects a port number whereby access from the application 21 is allowed, at random. With the present specific example, the port number is assumed to be "20001".

The token server 41 transmits a port open request to the port conversion setting server 100c with the token type "RT" and token value "RT001" of the issued token, the port number "20001", and transmission source server name "token server" as arguments, and awaits a response.

The port conversion setting server 100c which has received the port open request takes the transmission source server name "token server" and token type "RT" included in the message as keywords to search for entries of the following server setting table 121a matching the keywords. Subsequently, the port conversion setting server 100c obtains the transfer destination address "10.25.20.1:10" of a matched entry.

Next, the port conversion setting server 100c generates a received address "10.25.20.1:20001" from the obtained transfer destination address "10.25.20.1:10" and the notified port number "20001". Subsequently, the port conversion setting server 100c generates data for address conversion including the received address "10.25.20.1:20001" and the transfer destination address "10.25.20.1:10".

Subsequently, the port conversion setting server 100c references the port management table 122b to determine whether or not the generated received address is redundant with an already generated received address. The generated received address is non-redundant, so the port conversion setting server 100c transmits the data for address conversion to the DoS countermeasure device 30.

Also, the port conversion setting server 100c sets an entry in which the received address "10.25.20.1:20001" and the transfer destination address "10.25.20.1:10" are correlated with the token value "RT001", to the port management table 122b. The registered point-in-time of this entry is assumed to be "10:30:00".

Also, the port conversion setting server 100c responds to the token server 41 with "redundancy is OK".

Hereafter, the port conversion setting server 100c performs the same sequence as with the second embodiment except that registered point-in-time is set together at the time of registering an entry on the port management table 122b.

On the other hand, the entry monitoring unit 117 of the port conversion setting server 100a executes the entry monitoring processing independent from the above operation, and periodically monitors the entries of the port management table 122b. Specifically, after activation, the entry monitoring unit 117 sleeps for "60 seconds" that is the table monitoring interval of the parameter management table 124a, and subsequently calculates difference between the current point-in-time and the registered point-in-time "10:30" of the port management table. In the event that the difference thereof is greater than the deletion time "120 seconds", i.e., in the event that the current point-in-time is equal to or later than 10:32:00, the entry monitoring unit 117 generates data for port shutoff 152 including the received address "10.25.20.1:20001". Subsequently, the entry monitoring unit 117 transmits the generated data for port shutoff to the DoS countermeasure device 30. Also, the entry monitoring unit 117 deletes this entry.

With the system according to the present fifth embodiment, the same advantages as with the system 1000 according to the second embodiment are obtained.

Subsequently, with the system according to the fifth embodiment, further, increase in capacity of the port management table 122b and the address conversion table 30a due to the processing being neglected may be prevented. Note that examples of a case where the processing is neglected include a case where the client device 10 does not transmit a permission request (user does not perform the authentication processing).

Sixth Embodiment

Next, a system according to a sixth embodiment will be described.

Hereafter, with regard to the system according to the sixth embodiment, description will be made primarily regarding different points as to the above system according to the fifth embodiment, and description of items which are the same or equivalent will be omitted.

The system according to the sixth embodiment differs from the system according to the fifth embodiment in that the server within the service center 40 is monitored, and upon detecting no response from the server such as a server under suspension, or the like, the registered point-in-time of the port management table 122b with this server as the transfer destination address is set to the current point-in-time.

Figure 35:
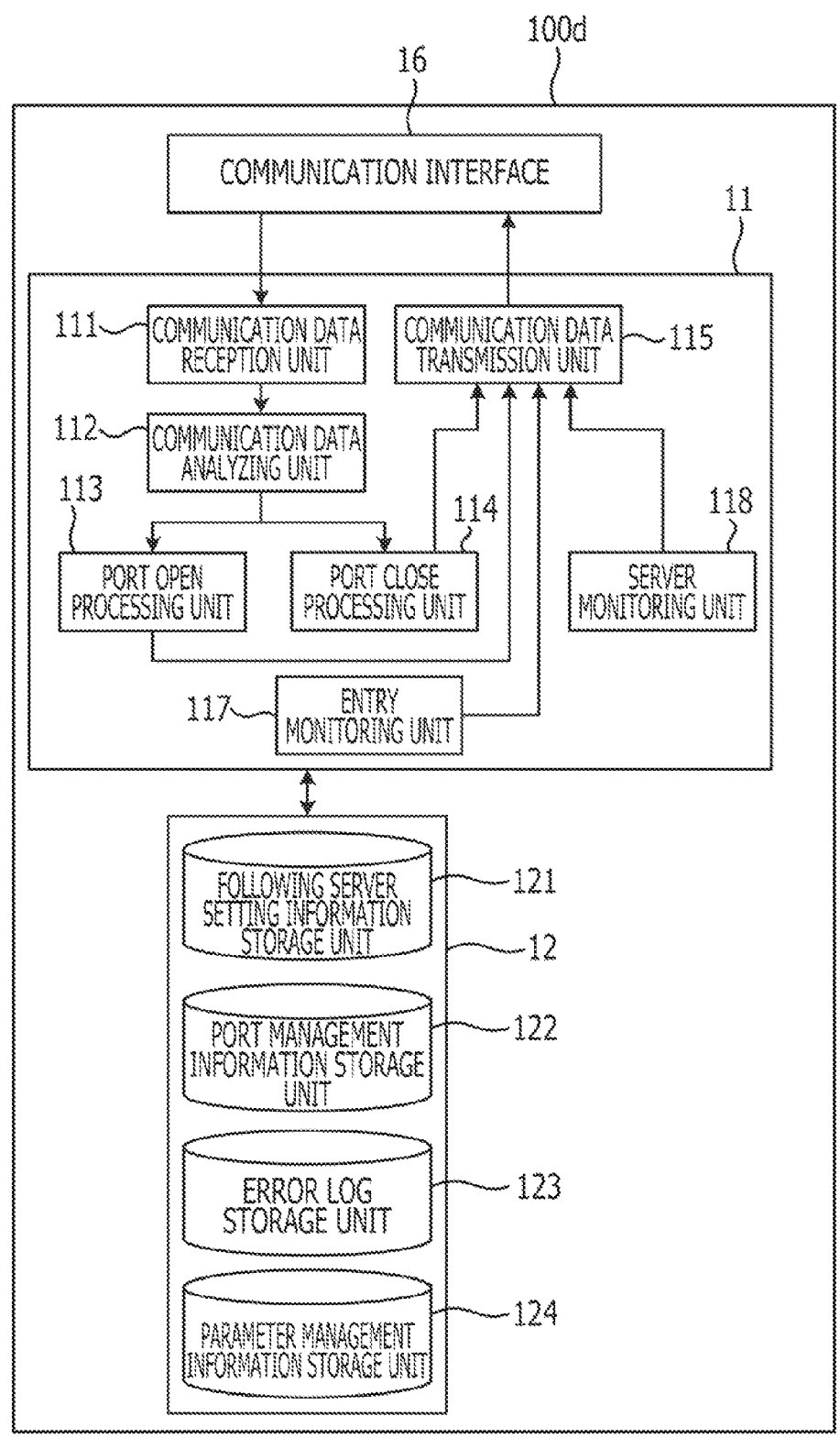
FIG. 35 is a block diagram illustrating the function of a port conversion setting server according to a sixth embodiment.

FIG. 35 is a block diagram illustrating the functions of the port conversion setting server according to the sixth embodiment.

A port conversion setting server 100d according to the sixth embodiment further includes a server monitoring unit 118.

The server monitoring unit 118 monitors a response from the server of the transfer destination address set to the transfer destination address field of the port management table 122b. This processing may be performed, for example, by ping (Packet Internet Groper) or the like.

Subsequently, in the event that there is a server without response, the point-in-time of the registered point-in-time field of an entry with the server without response as the transfer destination address is rewritten with the current point-in-time. Thus, time obtained by subtracting the registered point-in-time of the port management table 122b from the current point-in-time becomes "0". Specifically, time elapse count since a port open request was received, and registered point-in-time was registered, is reset. Therefore, with the entry monitoring processing, information for port shutoff is prevented from being generated regarding this entry due to suspension of the server.

It is desirable for this server monitoring unit 118 to operate in parallel with processing for receiving a port open request/port close request after activation of the port conversion setting server 100d. For example, the server monitoring unit 118 may operate as a separate thread or separate process.

FIG. 36 is a diagram illustrating a data structure example of a parameter management table according to the sixth embodiment.

A server monitoring interval is further set to the parameter management table 124b as an item, as compared to the parameter management table 124a.

The server monitoring interval is an item for managing a time interval for monitoring suspension of each server.

Next, the processing of the server monitoring unit 118 (server monitoring processing) will be described.

Figure 37:
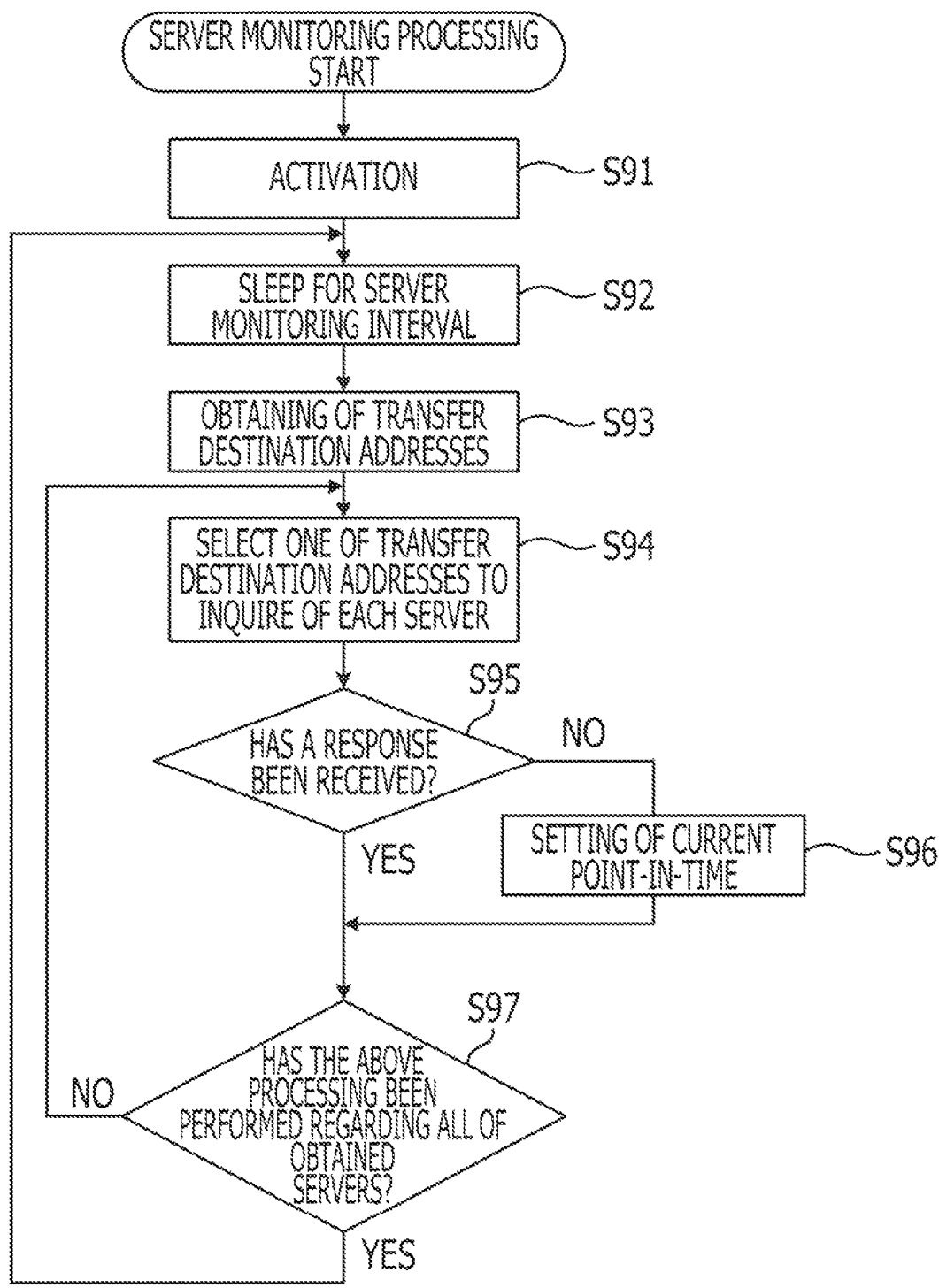
FIG. 37 is a flowchart illustrating server monitoring processing.

FIG. 37 is a flowchart illustrating the server monitoring processing.

[Step S91] Upon the port conversion setting server 100d being activated, the flow proceeds to step S92.

[Step S92] The server monitoring unit 118 references the parameter management table 124b to sleep (stand by) by the time set to the value field of the server monitoring interval. Upon sleep time elapsing, the flow proceeds to step S93.

[Step S93] The server monitoring unit 118 searches the following server setting table 121a to obtain all of the transfer destination addresses. Subsequently, the flow proceeds to step S94.

[Step S94] The server monitoring unit 118 selects one of the obtained transfer destination addresses, and subsequently inquires of the selected server whether or not there is a response.

[Step S95] The server monitoring unit 118 determines whether or not there has been a response from the asked server. In the event that there has been a response (Yes in step S95), the flow proceeds to step S97. In the event that there has been no response (No in step S95), the flow proceeds to step S96.

[Step S96] The server monitoring unit 118 sets the registered point-in-time of the entry with the asked address being matching the transfer destination address of the port management table 122b to the current point-in-time. Subsequently, the flow proceeds to step S97.

[Step S97] The server monitoring unit 118 determines whether or not all of the obtained server addresses have been asked. In the event that all of the obtained server addresses have been asked (Yes in step S97), the flow proceeds to step S92. In the event that all of the obtained server addresses have not been asked (No in step S97), the flow proceeds to step S94.

With the system according to the sixth embodiment, the same advantages as with the system according to the fifth embodiment are obtained.

Subsequently, with the system according to the sixth embodiment, for example, at the time of suspension of the token server 41 or authentication server 42, the entry monitoring unit 117 may be prevented from deleting an entry of the port management table 122b. Accordingly, transfer processing may be prevented from failing due to suspension of the server during the access privilege transfer processing.

Seventh Embodiment

Next, a system according to a seventh embodiment will be described.

Hereafter, with regard to the system according to the seventh embodiment, description will be primarily be made regarding different points as to the above system according to the second embodiment, and description of items which are the same or equivalent will be omitted.

The system according to the seventh embodiment differs from the system according to the second embodiment in that a port conversion setting server causes the DoS countermeasure device 30 to pass only the IP address of the client device 10 first arrived, through a port subjected to address conversion setting.

FIG. 38 is a diagram illustrating a data structure example of an address conversion table according to the seventh embodiment.

The fields of a reception-side Src address, a received address, and a transfer destination address are provided to an address conversion table 30b, and pieces of information arrayed in the horizontal direction of each field are mutually correlated.

The IP address of a device first accessed to a received address set to a received address field is set to a received-side Src address field. In the event that the received address has not been accessed yet, "Null" is set to the received-side Src address field. For example, the address conversion table 30b illustrated in FIG. 37 indicates that the received address of the entry of the first row has not been accessed from a device yet. Also, the address conversion table 30b indicates that the received address of the entry of the second row has been accessed from the device of an IP address "133.10.45.10".

The same information as the address conversion table 30a is set to the fields of a received address and a transfer destination address.

Next, packet processing of the DoS countermeasure device 30 according to the seventh embodiment will be described.

Figure 39:
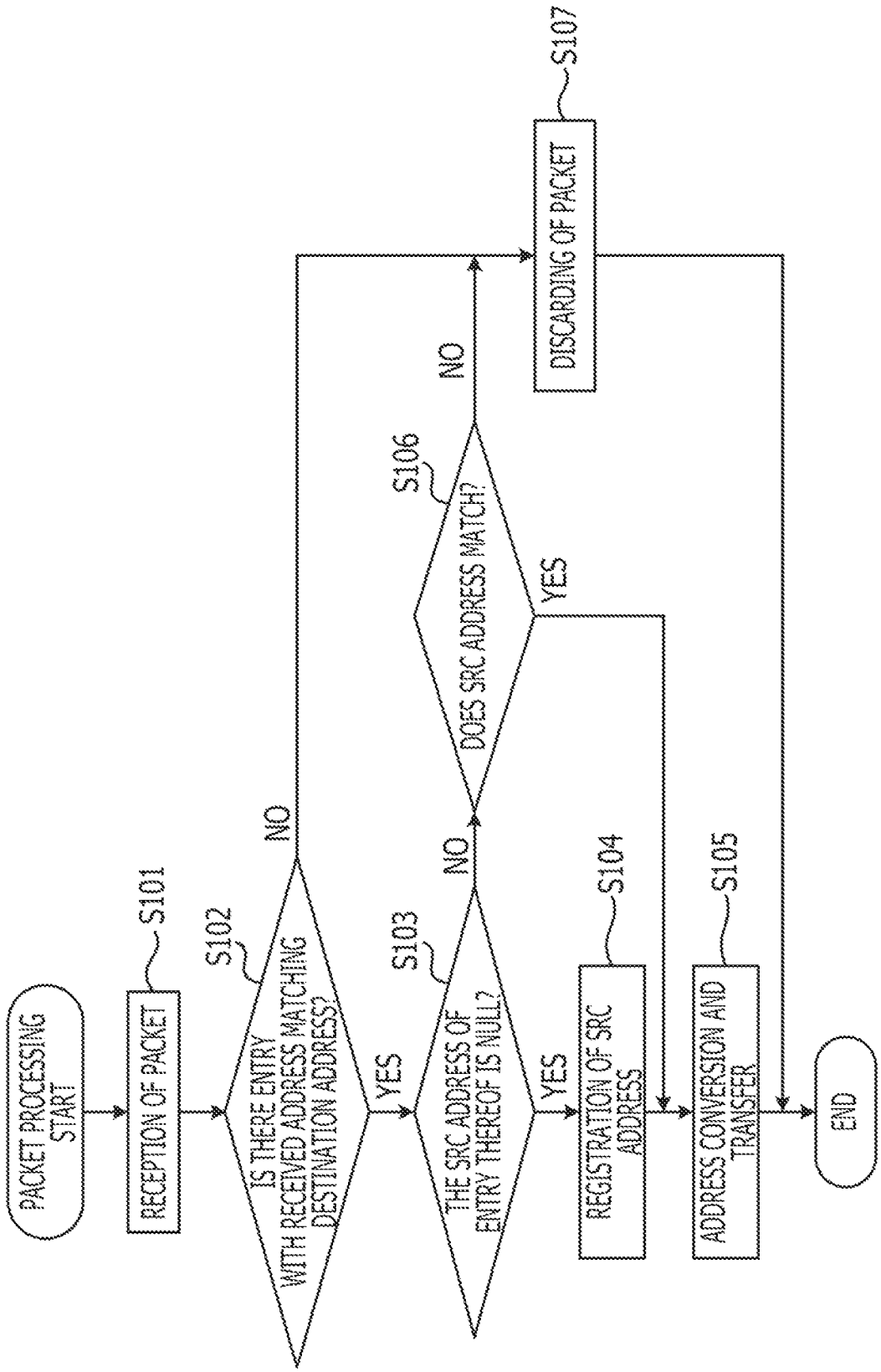
FIG. 39 is a flowchart illustrating packet processing of a DoS countermeasure device according to the seventh embodiment.

FIG. 39 is a flowchart illustrating the packet processing of the DoS countermeasure device 30 according to the seventh embodiment.

[Step S101] Upon the DoS countermeasure device 30 receiving a packet, the flow proceeds to step S102.

[Step S102] The DoS countermeasure device 30 determines whether or not an entry having the received address matching the destination address included in the received packet is included in the address conversion table 30b. In the event that an entry having the matched received address is included in the address conversion table 30b (Yes in step S102), the flow proceeds to step S103. In the event that an entry having the matched received address is not included in the address conversion table 30b (No in step S102), the flow proceeds to step S107.

[Step S103] The DoS countermeasure device 30 determines whether or not the reception-side Src address field of the entry having the matched received address is set to Null. In the event that the reception-side Src address field is set to Null (Yes in step S103), the flow proceeds to step S104. In the event that the reception-side Src address field is not set to Null (No in step S103), the flow proceeds to step S106.

[Step S104] The DoS countermeasure device 30 sets the IP address of the device which has transmitted the received packet to the reception-side Src address field of the entry having the matched received address, and overwrites the address conversion table 30b. Subsequently, the flow proceeds to step S105.

[Step S105] The DoS countermeasure device 30 converts the destination address of the packet into the transfer destination address, and subsequently transfers the packet thereof to the transfer destination address. Subsequently, the packet processing is ended.

[Step S106] The DoS countermeasure device 30 determines whether or not the reception-side Src address of the entry having the matched received address matches the IP address of the device which has transmitted the packet. In the event that the addresses are matched (Yes in step S106), the flow proceeds to step S105. In the event that the addresses are not matched (No in step S106), the flow proceeds to step S107.

[Step S107] The DoS countermeasure device 30 discards the received packet. Subsequently, the packet processing is ended.

Next, a specific example of the system according to the seventh embodiment will be described using the address conversion table 30b illustrated in FIG. 37. With the present specific example, the IP address of the client device 10 is assumed to be an IP address "133.10.45.5".

Note that, with the present specific example, description will be primarily be made regarding different portions as to the port conversion setting processing according to the second embodiment, and with regard to similar portions, description thereof will be omitted.

[Sequence Seq5] The client device 10 transmits, for the sake of access permission setting, a packet storing the token value "RT001" and user ID and user password of the request token to the specified port number "20001".

The DoS countermeasure device 30 which has received this packet confirms whether or not an entry having a received address matches the packet destination address "10.25.20.1: 20001" is included in the address conversion table 30b. With the present specific example, the first entry of the first row is included in the address conversion table 30b, so the DoS countermeasure device 30 confirms whether or not the reception-side Src address of the entry thereof is Null.

With the present specific example, the reception-side Src address of the entry thereof is Null, so the DoS countermeasure device 30 registers the IP address "133.10.45.5" of the client device 10 on the reception-side Src address of the address conversion table 30b field.

Next, the DoS countermeasure device 30 converts the destination address of the packet into the transfer destination address "10.25.20.1:10" of the entry thereof, and transmits this. As a result thereof, the packet received at "10.25.20.1: 20001" is converted into "10.25.20.1:10", transferred, and received at the authentication server 42.

According to such processing, in the event that after the IP address "133.10.45.5" of the client device 10 is registered, a packet addressed to this received address is received from a device other than the client device 10, the DoS countermeasure device 30 discards the packet thereof. Accordingly, a packet other than a packet accessed to an opened port first may be prevented from being transferred to the service center 40.

Note that, with the present embodiment, the IP address of the device which has transmitted a packet accessed first is set to the reception-side Src address field. However, the number of times of access is not restricted to this, the IP address of this device may be set to the reception-side Src address field at the time of multiple times of access from the same device.

Eighth Embodiment

Next, a system according to an eighth embodiment will be described.

Hereafter, with regard to the system according to the eighth embodiment, description will primarily be made regarding different points as to the above system according to the seventh embodiment, and description of items which are the same or equivalent will be omitted.

Figure 40:
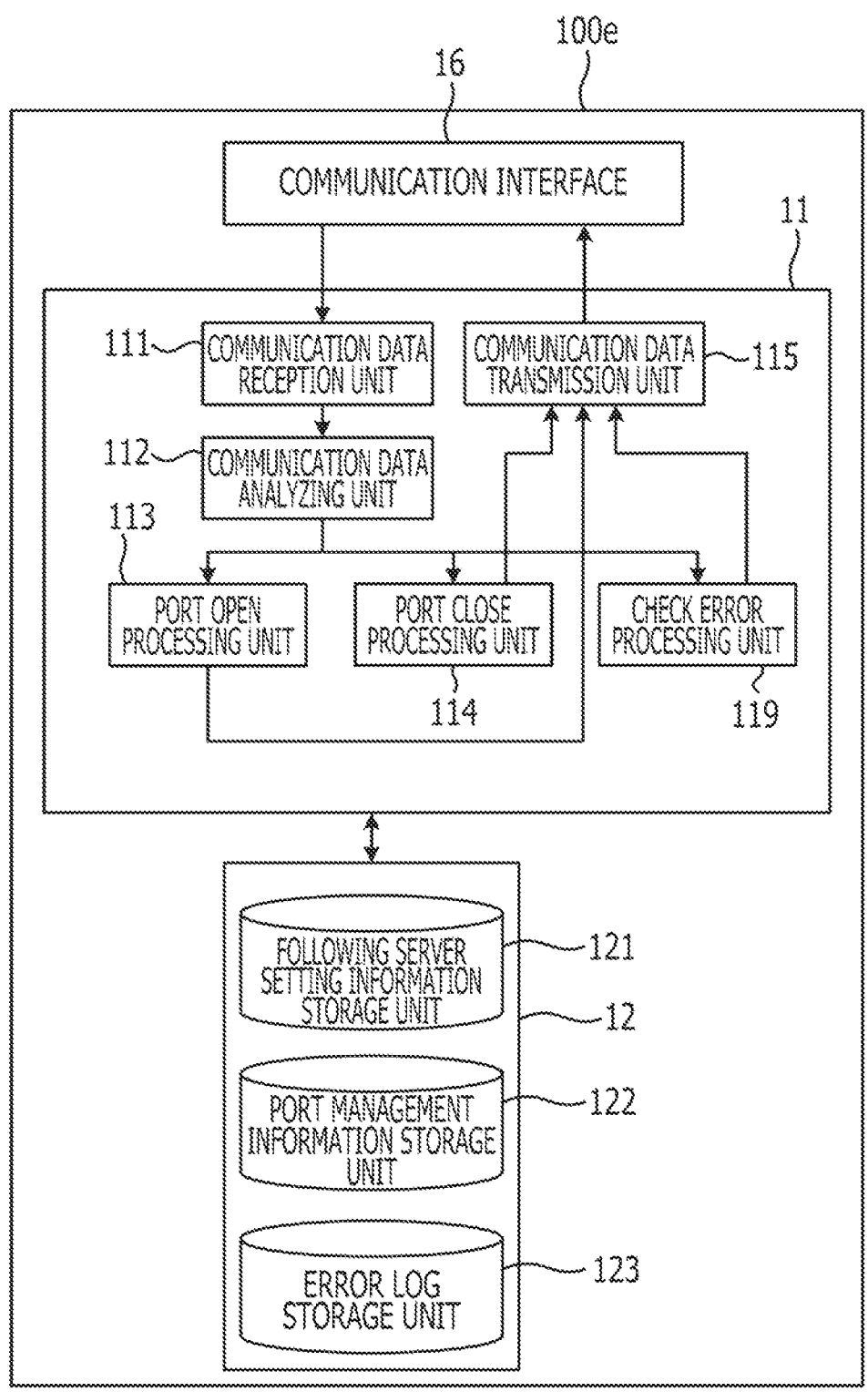
FIG. 40 is a block diagram illustrating the function of a port conversion setting server according to an eighth embodiment.

FIG. 40 is a block diagram illustrating the functions of a port conversion setting server according to the eight embodiment.

With the system according to the eighth embodiment, when receiving an unauthorized request at the token server 41 or authentication server 42, a port conversion setting server 100e deletes the IP address set to the reception-side Src address of the address conversion table 30b.

Note that examples of unauthorized requests include a request to which an invalid token or a token of which the access privilege has not been set is appended, and an authentication request wherein one or both of the user ID and user password is incorrect.

The port conversion setting server 100e further includes a check error processing unit 119.

The communication data analyzing unit 112 analyzes a request included a message received at the communication data reception unit 111. Subsequently, in the event that this request is a check error notified by the token server 41 or authentication server 42, the communication data analyzing unit 112 checks error processing from the check error processing unit 119.

Upon receiving a check error processing request from the communication data analyzing unit 112, the check error processing unit 119 takes the address of a server included in the message as a keyword to obtain the entry of the port management table 122a matching the keyword.

Subsequently, the check error processing unit 119 transmits an instruction for setting the reception-side Src address field of the address conversion table 30b regarding the matched entry to "Null", to the DoS countermeasure device 30.

Next, port conversion setting processing according to the eighth embodiment will be described.

Figure 41:
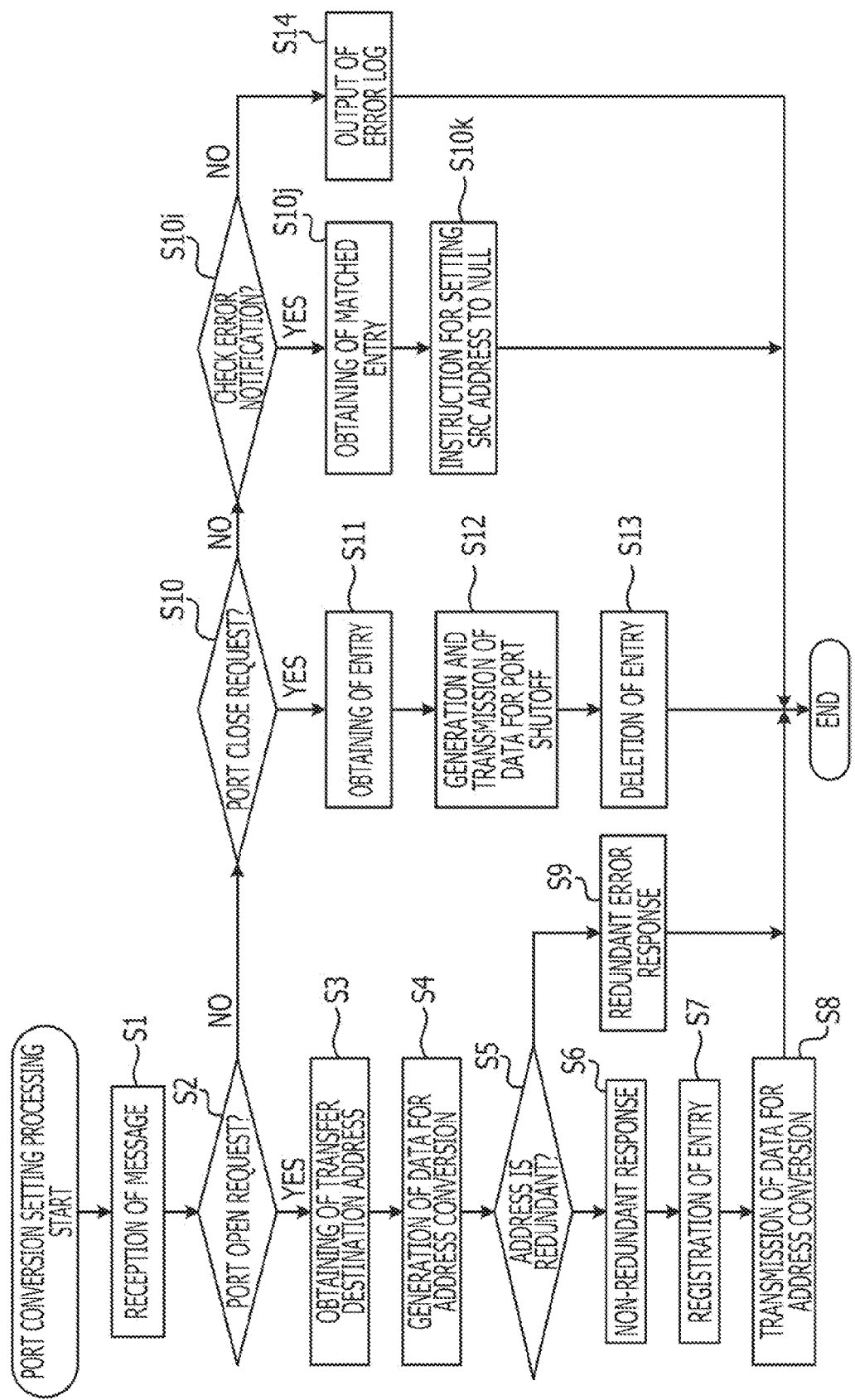
FIG. 41 is a flowchart illustrating port conversion setting processing according to the eighth embodiment.

FIG. 41 is a flowchart illustrating the port conversion setting processing according to the eighth embodiment.

[Step S10] The communication data analyzing unit 112 determines whether or not the received message is a port close request. In the event that the received message is a port close request (Yes in step S10), the flow proceeds to step S11. In the event that the received message is not a port close request (No in step S10), the flow proceeds to step S10i.

[Step S10i] The communication data analyzing unit 112 determines whether or not the received message is check error notification. In the event that the received message is check error notification (Yes in step S10i), the flow proceeds to step S10j. In the event that the received message is not check error notification (No in step S10i), the flow proceeds to step S14.

[Step S10j] The check error processing unit 119 takes the address of the server included in the check error notification as a keyword to search for the transfer destination address of the port management table 122a matching the keyword. Subsequently, the check error processing unit 119 obtains a matched entry. There may be multiple relevant entries. Subsequently, the flow proceeds to step S10k.

[Step S10k] The check error processing unit 119 transmits an instruction for setting the reception-side Src address of the entry of the address conversion table 30b matching the received address and transfer destination address of the obtained entry to "Null", to the DoS countermeasure device 30. Subsequently, the port conversion setting processing is ended.

Next, authentication processing according to the eighth embodiment will be described.

Figure 42:
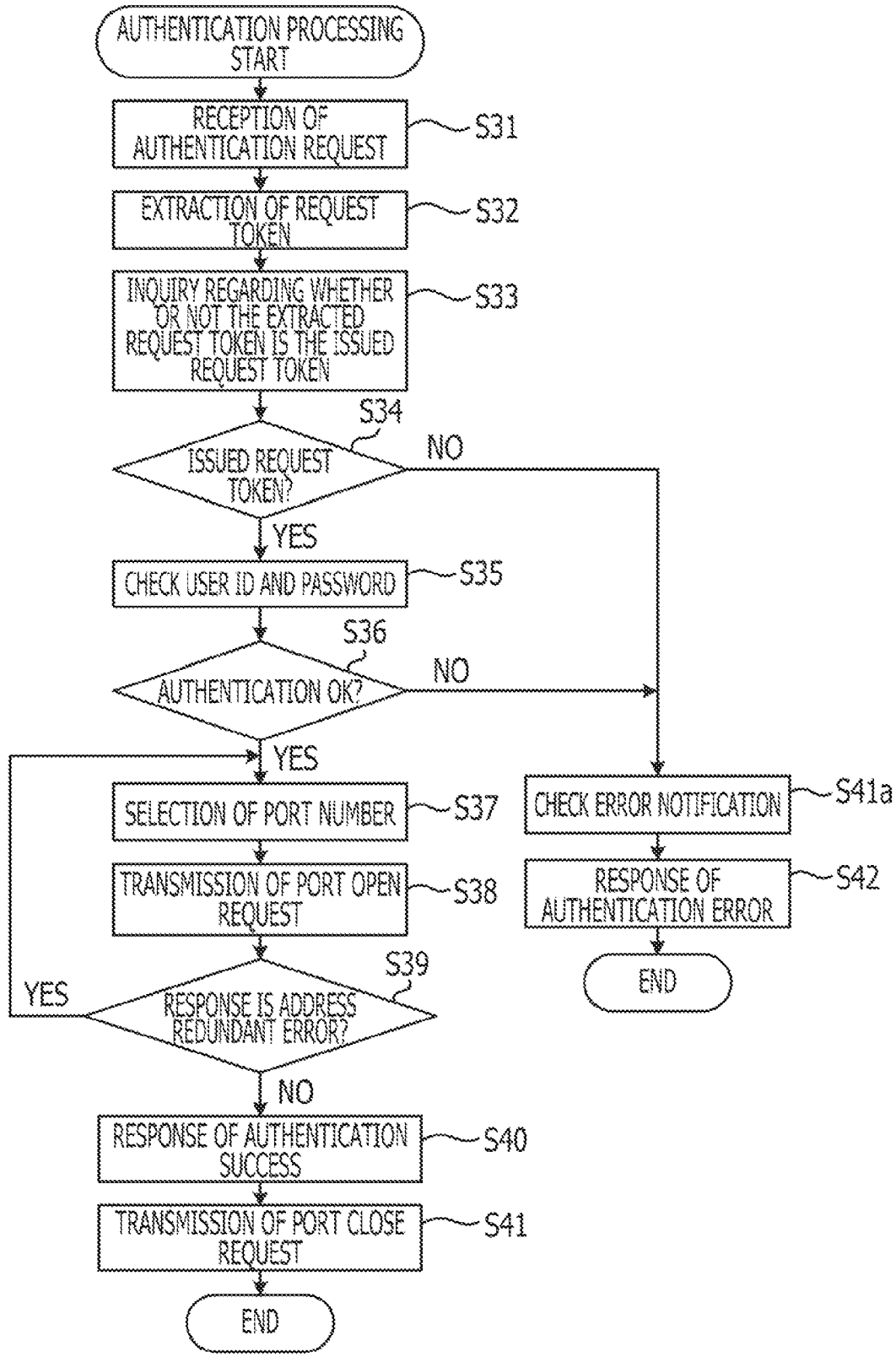
FIG. 42 is a flowchart illustrating authentication processing according to the eighth embodiment.

FIG. 42 is a flowchart illustrating the authentication processing according to the eighth embodiment.

[Step S34] The authentication server 42 determines according to a response from the token server 41 whether or not the extracted request token is the request token issued by the token server 41. In the event that the extracted request token is the request token issued by the token server 41 (Yes in step S34), the flow proceeds to step S35. In the event that the extracted request token is not the request token issued by the token server 41 (No in step S34), the flow proceeds to step S41a.

[Step S36] As the authentication result by the authentication server 42, in the event that the user ID and user password is an authorized user ID and user password (Yes in step S36), the flow proceeds to step S37. In the event that the user ID and user password is an unauthorized user ID and user password (No in step S36), the flow proceeds to step S41a.

[Step S41a] The authentication server 42 transmits check error notification to the port conversion setting server 100d with the address of this authentication server 42 as an argument. Subsequently, the flow proceeds to step S42.

Next, access token issuing processing according to the eighth embodiment will be described.

Figure 43:
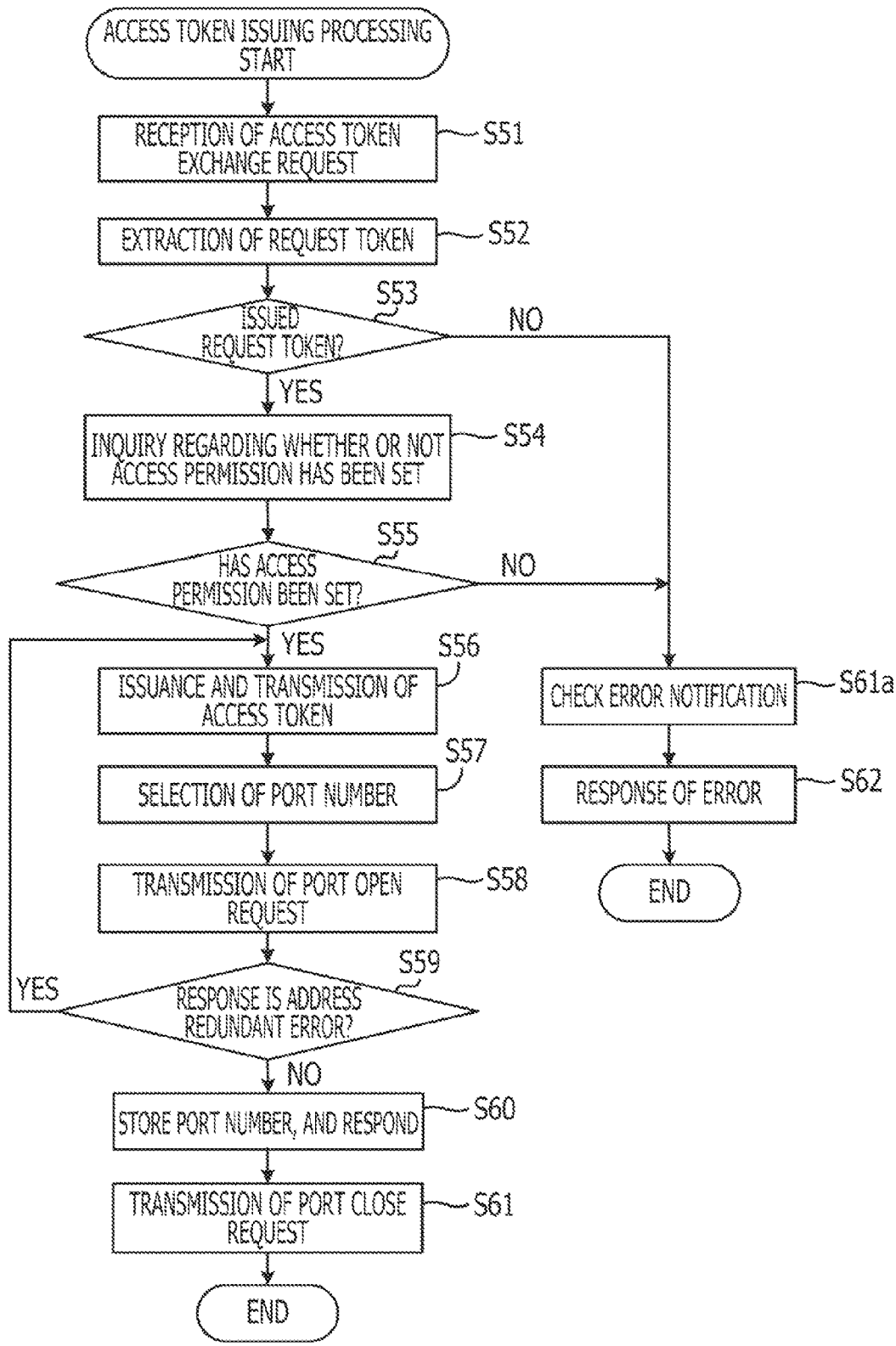
FIG. 43 is a flowchart illustrating access token issuing processing according to the eighth embodiment.

FIG. 43 is a flowchart illustrating the access token issuing processing according to the eighth embodiment.

[Step S53] The token server 41 determines whether or not the extracted request token is the request token issued by the token server 41. In the event that the extracted request token is the request token issued by the token server 41 (Yes in step S53), the flow proceeds to step S54. In the event that the extracted request token is not the request token issued by the token server 41 (No in step S53), the flow proceeds to step S61a.

[Step S55] As the inquiry result by the token server 41, in the event of receiving notification to the effect that the user has set access permission (Yes in step S55), the flow proceeds to step S56. In the event of receiving notification to the effect that the user has not set access permission (No in step S55), the flow proceeds to step S61a.

[Step S61a] The token server 41 transmits check error notification to the port conversion setting server 100d with the address of this token server 41 as an argument. Subsequently, the flow proceeds to step S62.

Next, a specific example of the system according to the eighth embodiment will be described using the address conversion table 30b illustrated in FIG. 38. With the present specific example, description will be made regarding processing in the event that there has been access from a user other than the user who operates the client device 10 (unauthorized user).

Note that, with the present specific example, description will primarily be made regarding different portions as to the port conversion setting processing according to the second embodiment, and description will be omitted regarding similar portions.

Hereafter, the IP address of a client device which an authorized user operates (referred to as "third-party client device") is assumed to be an IP address "133.10.45.99".

[Sequence Seq5] The third-party client device transmits, for the sake of setting access permission, a packet storing the token value "RT001" and user ID and user password of the request token to the port number "20001".

The DoS countermeasure device 30 which has received this packet determines whether or not an entry of the received address matches the destination address "10.25.20.1:20001" of the packet is included in the address conversion table 30*b*. With the present specific example, such an entry is included in the address conversion table 30*b*, so the DoS countermeasure device 30 determines whether or not the reception-side Src address of the entry thereof is "Null".

With the present specific example, the reception-side Src address is "Null", so the IP address "133.10.45.99" of the third-party client device is registered in the reception-side Src address field of this entry of the address conversion table 30*b*.

Next, the DoS countermeasure device 30 converts the destination address of the packet into the transfer destination address "10.25.20.1:10" of the entry thereof, and transmits this. As a result thereof, the packet received at "10.25.20.1:20001" is converted into "10.25.20.1:10", transferred, and received at the authentication server 42.

Next, the authentication server 42 extracts the token value "RT001" of the request token from a request message, and inquires of the token server 41 whether or not the extracted request token is the request token issued by the token server 41. With the present specific example, the extracted request token is the request token issued by the token server 41, so the sequence proceeds to the next.

Next, the authentication server 42 performs authentication check of the user ID and user password. With the present specific example, authentication is not performed due to an unauthorized user. The authentication server 42 transmits a check error notification to the port conversion setting server 100*e* with the address "10.25.20.1:10" of the authentication server 42 as an argument. Also, the authentication server 42 responds to the third-party client device with an authentication error, and awaits a response.

The port conversion setting server 100*e* which has received the check error notification takes the address "10.25.20.1:10" of the authentication server 42 included in the notification as a keyword to search for the transfer destination address of the port management table 122*a* matching the keyword. Subsequently, the port conversion setting server 100*e* obtains a matched entry. In the event of the port management table 122*a* illustrated in FIG. 7, the port conversion setting server 100*e* obtains an entry including the received address "10.25.20.1:20001".

Next, the port conversion setting server 100*e* transmits an instruction for setting the reception-side Src address of the entry of the address conversion table 30*b* matching the received address and transfer destination address of the obtained entry to "Null", to the DoS countermeasure device 30. Thus, the DoS countermeasure device 30 sets the reception-side Src address of the entry of the address conversion table 30*b* matching the received address and transfer destination address of the obtained entry to "Null". Thus, the DoS countermeasure device 30 may accept access to the received address "10.25.20.1:20001" again.

With the system according to the eighth embodiment, the same advantages as with the system according to the seventh embodiment are obtained.

Subsequently, with the system according to the eighth embodiment, when receiving an unauthorized request at the token server 41 or authentication server 42, the port conversion setting server 100*e* deletes the IP address set to the reception-side Src address of the address conversion table 30*b*. Thus, for example, in the event that a request from a malicious application has been received first, the reception-side Src address may be set to "Null". Accordingly, access from the authorized client device 10 or application 21 may be accepted again.

Description has thus been made regarding the access control program, access control method, and access control device according to the present invention based on the embodiments in the drawings, but the present invention is not restricted to these, and the configuration of each unit may be replaced with a unit having an optional configuration having the same function. For example, with the above each embodiment, the port conversion setting server has been described as an independent device, but the present invention is not restricted to this, and for example, the function of the port conversion setting server may be built into the DoS countermeasure device 30.

Figure 44:
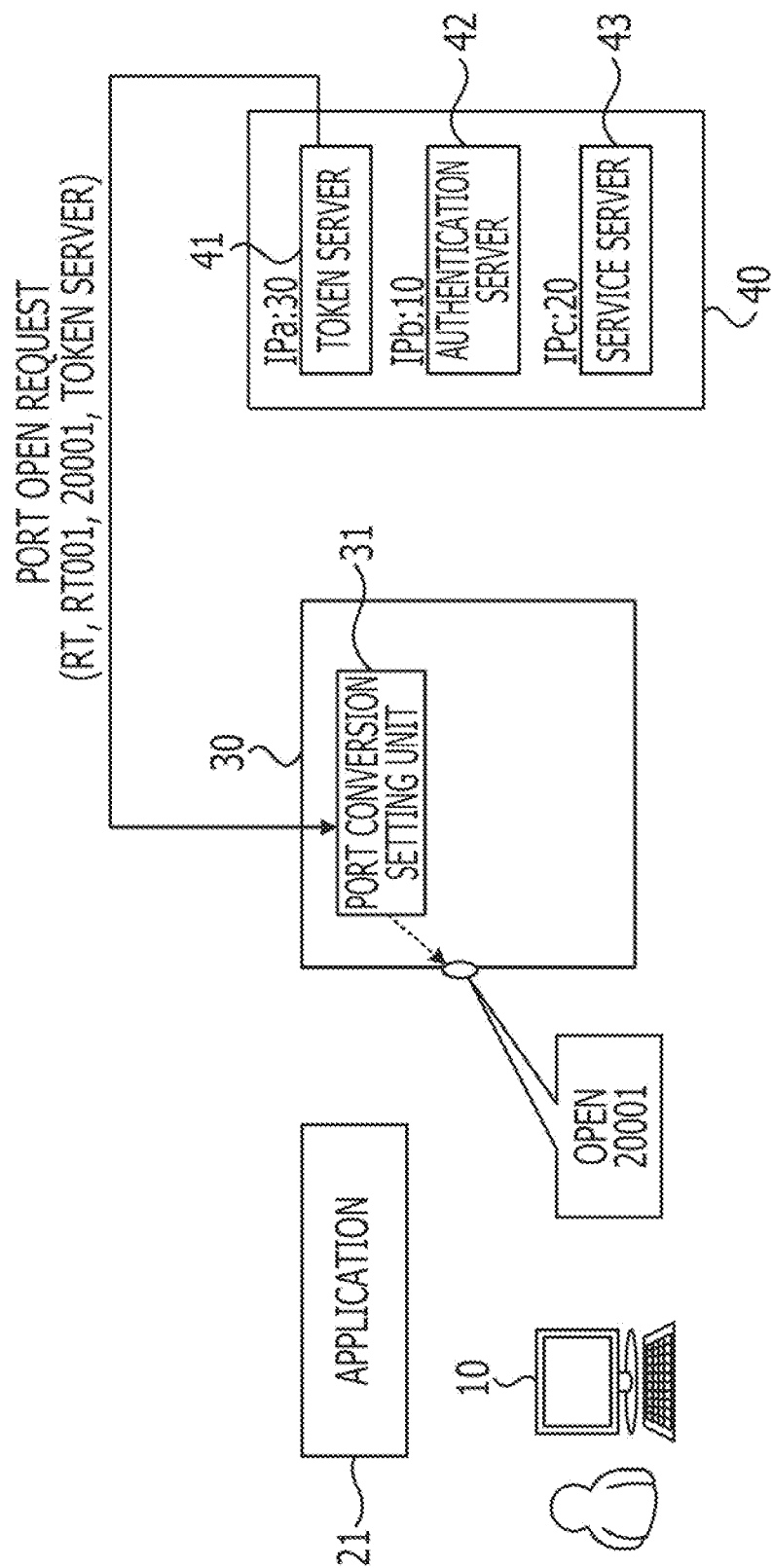
FIG. 44 is a diagram illustrating an example wherein a port conversion function is provided to the DoS countermeasure device.

FIG. 44 is a diagram illustrating an example wherein the port conversion function is provided to the DoS countermeasure device.

The port conversion setting unit 31 illustrated in FIG. 44 has the same function as the function of the port conversion setting server 100, and executes the above port conversion setting processing and so forth. With a system according to such a configuration as well, the same advantages as with the system 1000 are obtained.

Also, another arbitrary component or process may be added to the present invention.

Also, the present invention may be a combination of arbitrary two or more configurations (features) of the above each embodiment.

Note that the above processing functions may be realized by a computer. In this case, a program in which the processing contents of the functions of the port conversion setting servers 100, 100*a*, 100*b*, 100*c*, 100*d*, and 100*e* are described is provided. The program thereof is executed on the computer, whereby the above processing functions are realized on the computer. The program in which the processing contents are described may be recorded in a computer-readable, non-transitory medium. Examples of the computer-readable, non-transitory medium include magnetic recording devices, optical discs, magneto-optical recording media, and semiconductor memory. Examples of magnetic recording devices include hard disks (HDD), flexible disks (FD), and magnetic tapes. Examples of optical discs include DVD (Digital Versatile Disc), DVD-RAM (Random Access Memory), CD-ROM (Compact Disc Read Only Memory), and CD-R (Recordable)/RW (ReWritable). Examples of magneto-optical recording media include MO (Magneto-Optical disk).

In the event of distributing a program, for example, a transportable recoding medium such as DVD, CD-ROM, or the like in which the program thereof is recorded, is distributed. Alternatively, an arrangement may be made wherein the program is stored in a storage device of a server computer, and then the program is transferred from the server computer to another computer via a network.

A computer which executes an access control program stores, for example, a program recorded in a transportable recording medium, or a program transferred from a server computer, in the own storage device. Subsequently, the computer reads the program from the own storage device to execute processing in accordance with the program. Note that the computer may also directly read the program from the transportable recording medium to execute processing in accordance with the program thereof. Alternatively, each time a program is transferred from the server computer, the computer may also execute processing in accordance with the received program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A computer-readable, non-transitory medium storing therein an access control program that causes a computer to execute a procedure, with the computer causing an information processing device to execute access control between a client device and two or more server devices, the procedure comprising:
   receiving an open request for causing the information processing device to open the port of a port number that is a port number to be transmitted to the client device according to completion of one process of a plurality of processes to be executed on a first server device which is one of the two or more server devices;
   generating information for data transfer for opening the port of the port number based on information for identifying the first server device which transmitted the open request, which is included in the received open request; and
   transmitting the generated information for data transfer to the information processing device.

2. The computer-readable, non-transitory medium according to claim 1, wherein the information for data transfer includes the port number of a second server device which is one of the server devices to be accessed next to the first server device.

3. The computer-readable, non-transitory medium according to claim 2, wherein the generating information determines the port number of the second server device based on information for identifying the first server device which transmitted the open request.

4. The computer-readable, non-transitory medium according to claim 2, wherein the generating information determines the port number of the second server device based on information for identifying series of processes included in the open request in addition to information for identifying the first server device which transmitted the open request.

5. The computer-readable, non-transitory medium according to claim 4, the procedure further comprising:
   receiving a shutoff request of the opened port;
   determining the opened port based on information for identifying the series of processes included in the shutoff request, and information for identifying the series of processes included in the open request to generate information for port shutoff for shutting off the determined port; and
   transmitting the generated information for port shutoff to the information processing device.

6. The computer-readable, non-transitory medium according to claim 5, wherein, when the shutoff request includes information for identifying the second server device which transmits the shutoff request, and the port number of the second server device, the procedure for generating the information for port shutoff determines the port opened based on information for identifying the second server device determined at the time of opening a port, and the port number of the second server device.

7. The computer-readable, non-transitory medium according to claim 6, the procedure further comprising:
   storing management information that correlates information for identifying the determined second server device, and the port number of the second server device, the opened port number, and information for identifying the series of processes;
   wherein the procedure for generating the information for port shutoff determines the opened port based on information for identifying the second server device which transmits the shutoff request, the port number of the second server device, information for identifying the series of processes, and the management information to generate the information for port shutoff.

8. The computer-readable, non-transitory medium according to claim 4, the procedure further comprising:
   storing setting information that correlates information for identifying the first server device which transmits the open request, information for identifying the series of processes, information for identifying the second server device, and the port number of the second server device;
   wherein the generating information determines the port of the second server device with reference to the setting information.

9. The computer-readable, non-transitory medium according to claim 3, the procedure further comprising:
   receiving a shutoff request of the opened port;
   determining the opened port based on information for identifying the second server device which transmits the shutoff request, and the port number of the second server device, included in the shutoff request to generate information for port shutoff for shutting off the determined port; and
   transmitting the generated information for port shutoff to the information processing device.

10. The computer-readable, non-transitory medium according to claim 9, the procedure further comprising:
    storing management information that correlates the determined second server device, the port of the second server device, and information for identifying the opened port number;
    wherein the procedure for generating the information for port shutoff determines the opened port based on information for identifying the second server device which transmits the shutoff request, the port number of the second server device, and the management information to generate the information for port shutoff.

11. The computer-readable, non-transitory medium according to claim 5, wherein the shutoff request is output at the time of completion of the processes by the second server device which has completed the series of processes.

12. The computer-readable, non-transitory medium according to claim 5, the procedure further comprising:
    generating information for port shutoff for shutting off the port opened by the open request even if the shutoff request has not been received in the event that the shutoff request of the port opened by the open request has not been received until prescribed time elapse since point in time of reception of the open request;
    wherein the transmitting procedure transmits the generated information for port shutoff to the information processing device.

13. The computer-readable, non-transitory medium according to claim 12, the procedure further comprising:
  monitoring a response of the second server device, and when detecting that there is no response from the second server device, resetting count of time elapse since point in time of receiving the open request.

14. The computer-readable, non-transitory medium according to claim 1, the procedure further comprising:
  determining the port number to inform to the first server device which transmits the open request.

15. The computer-readable, non-transitory medium according to claim 1, wherein the generating procedure determines all of the server devices scheduled for access of the plurality of processes based on reception of the open request, and opens the ports of all of the determined server devices beforehand.

16. The computer-readable, non-transitory medium according to claim 1, the procedure further comprising:
  outputting an instruction for canceling registration of an IP address according to error notification to be received from the second server device in response to reception of an unauthorized request;
  wherein the information processing device registers the IP address of a device which has accessed an opened port, and refuses access from other than the registered IP addresses.

17. An access control method causing an information processing device to execute access control between a client device and two or more server devices, the method executed by a computer comprising:
  receiving an open request for causing the information processing device to open the port of a port number that is a port number to be transmitted to the client device according to completion of one process of a plurality of processes to be executed on a first server device which is one of the two or more server devices;
  generating information for data transfer for opening the port of the port number based on information for identifying the first server device which transmitted the open request, which is included in the received open request; and
  transmitting the generated information for data transfer to the information processing device.

18. An access control device causing an information processing device to execute access control between a client device and two or more server devices, the device comprising:
  a processor configured to execute a procedure, the procedure comprising:
    receiving an open request for causing the information processing device to open the port of a port number that is a port number to be transmitted to the client device according to completion of one process of a plurality of processes to be executed on a first server device which is one of the two or more server devices;
    generating information for data transfer for opening the port of the port number based on information for identifying the first server device which transmitted the open request, which is included in the received open request; and
    transmitting the generated information for data transfer to the information processing device.

* * * * *

UNITED STATES PATENT AND TRADEMARK OFFICE
CERTIFICATE OF CORRECTION

| | | |
|---|---|---|
| PATENT NO. | : 8,549,112 B2 | Page 1 of 1 |
| APPLICATION NO. | : 13/011302 | |
| DATED | : October 1, 2013 | |
| INVENTOR(S) | : Hitoshi Ueno et al. | |

It is certified that error appears in the above-identified patent and that said Letters Patent is hereby corrected as shown below:

On the Title Page, the Foreign Application Priority Data should read:

-- Item (30) Foreign Application Priority Data

Jan. 28, 2010    (JP) ...............................2010-16270 --

Signed and Sealed this
Fifteenth Day of April, 2014

Michelle K. Lee
*Deputy Director of the United States Patent and Trademark Office*